United States Patent
Someya et al.

(10) Patent No.: US 10,829,662 B2
(45) Date of Patent: *Nov. 10, 2020

(54) CURABLE COMPOSITION, CURED PRODUCT, CURED FILM, DISPLAY PANEL, AND METHOD FOR PRODUCING CURED PRODUCT

(71) Applicant: TOKYO OHKA KOGYO CO., LTD., Kawasaki (JP)

(72) Inventors: Kazuya Someya, Kawasaki (JP); Hiroki Chisaka, Kawasaki (JP); Naozumi Matsumoto, Kawasaki (JP); Koichi Misumi, Kawasaki (JP); Dai Shiota, Kawasaki (JP)

(73) Assignee: TOKYO OHKA KOGYO CO., LTD., Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,191

(22) Filed: May 8, 2018

(65) Prior Publication Data

US 2018/0334586 A1 Nov. 22, 2018

(30) Foreign Application Priority Data

May 17, 2017 (JP) ................................. 2017-098575

(51) Int. Cl.
| | | |
|---|---|---|
| C08F 2/46 | (2006.01) | |
| C08F 2/50 | (2006.01) | |
| C09D 163/00 | (2006.01) | |
| C08G 59/40 | (2006.01) | |
| C09D 7/62 | (2018.01) | |
| C08G 59/24 | (2006.01) | |
| C08G 59/68 | (2006.01) | |
| C08L 63/00 | (2006.01) | |
| C08K 9/04 | (2006.01) | |
| C08K 3/22 | (2006.01) | |

(52) U.S. Cl.
CPC ......... C09D 163/00 (2013.01); C08G 59/245 (2013.01); C08G 59/4078 (2013.01); C08G 59/687 (2013.01); C08L 63/00 (2013.01); C09D 7/62 (2018.01); C08K 9/04 (2013.01); C08K 2003/2244 (2013.01)

(58) Field of Classification Search
CPC ...... C09D 163/00; C09D 7/62; C08G 59/687; C08G 59/248; C08G 59/4078; C08L 63/00; C08K 2003/2244; C08K 9/04
USPC ................. 522/31, 6, 71, 189, 184, 1; 520/1
See application file for complete search history.

(56) References Cited

U.S. PATENT DOCUMENTS

| | | | |
|---|---|---|---|
| 6,166,233 A | 12/2000 | Neckers et al. | |
| 9,914,687 B2* | 3/2018 | Shiota | ...................... C07C 69/54 |
| 2006/0199099 A1 | 9/2006 | Aroa et al. | |
| 2009/0076180 A1 | 3/2009 | Iwaya | |
| 2010/0104858 A1* | 4/2010 | Horio | ....................... C08J 7/047 |
| | | | 428/331 |
| 2010/0256313 A1* | 10/2010 | Nakamura | .............. C08L 63/00 |
| | | | 525/476 |
| 2014/0231729 A1* | 8/2014 | Shiota | ..................... G03F 7/032 |
| | | | 252/586 |
| 2015/0042931 A1 | 2/2015 | Hsu | |
| 2016/0046552 A1* | 2/2016 | Shiota | ..................... C08F 16/12 |
| | | | 430/288.1 |
| 2017/0260132 A1 | 9/2017 | Kunimoto et al. | |
| 2018/0334533 A1* | 11/2018 | Someya | ............... C08G 59/686 |
| 2019/0031818 A1* | 1/2019 | Someya | ............... C08G 59/306 |

FOREIGN PATENT DOCUMENTS

| | | | | |
|---|---|---|---|---|
| JP | H08-101501 A | | 4/1996 | |
| JP | 2005-283905 A | | 10/2005 | |
| JP | 2013-124338 | * | 6/2013 | ............. C08G 75/08 |
| JP | 2014-156522 A | | 8/2014 | |

OTHER PUBLICATIONS

Koichi et al., machine English translation of JP 2013-124338 (Year: 2013).*
Office Action issued in U.S. Appl. No. 15/974,036, dated Oct. 1, 2019.
Office Action issued in U.S. Appl. No. 16/047,508, dated Oct. 3, 2019.
Office Action issued in U.S. Appl. No. 16/047,508, dated Jan. 10, 2020.
Final Office Action issued in U.S. Appl. No. 16/047,508, dated Aug. 7, 2020.
Notification of Reasons for Refusal issued in related Japanese Patent Application No. 2017-098574, dated Sep. 8, 2020.

* cited by examiner

*Primary Examiner* — Jessica Whiteley
(74) *Attorney, Agent, or Firm* — Knobbe Martens Olson & Bear LLP

(57) ABSTRACT

A curable composition capable of forming a cured product having high refractive index and excellent bending resistance, a cured product of the curable composition, a cured film made of the cured product, a display panel provided with the cured film, and a method for producing a cured product using the above-mentioned curable composition. The curable composition includes a curable compound and a curing agent. The curable compound contains a curable compound including, as a main skeleton, a fused ring in which three or more rings including an aromatic ring are fused, followed by mixing a metal oxide in which a capping agent is covalently bonded to a surface thereof.

15 Claims, No Drawings

CURABLE COMPOSITION, CURED PRODUCT, CURED FILM, DISPLAY PANEL, AND METHOD FOR PRODUCING CURED PRODUCT

This application claims priority to Japanese Patent Application No. 2017-098575, filed May 17, 2017, the entire content of which is incorporated herein by reference.

BACKGROUND OF THE INVENTION

Field of the Invention

The present invention relates to a curable composition, a cured product of the curable composition, a cured film made of the cured product, a display panel provided with the cured film for an image display device, and a method for producing a cured product using the above-mentioned curable composition.

Related Art

Heretofore, a curable composition containing, as a curable component, a cationic polymerizable compound such as an epoxy compound and a radical polymerizable compound having a (meth)acryloyl group has been used in various application.

There has been known, as a cationic polymerizable curable composition, a curable composition containing fluorene derivatives having a specific structure as a photocationic polymerizable compound (see Patent Document 1). Use of the curable composition mentioned in Patent Document 1 enables formation of a cured product having high refractive index.

Patent Document 1: Japanese Unexamined Patent Application, Publication No. 2005-283905

SUMMARY OF THE INVENTION

As mentioned above, use of the curable composition mentioned in Patent Document 1 enables formation of a cured product having high refractive index. However, a material having high refractive index is required to achieve higher refractive index. For example, it can be expected that higher refractive index of a cured product is achieved by mixing an inorganic filler used for achieving high refractive index in the curable composition mentioned in Patent Document 1. However, in this case, the cured product of the curable composition easily causes cracking due to bending, leading to significant deterioration of the bending resistance of the cured product.

In light of the above problems, the present invention has been made and an object thereof is to provide a curable composition capable of forming a cured product having high refractive index and excellent bending resistance, a cured product of the curable composition, a cured film made of the cured product, a display panel provided with the cured film, and a method for producing a cured product using the above-mentioned curable composition.

The present inventors have found that the above problems can be solved by allowing a curable compound (A) to contain a curable compound containing, as a main skeleton, a fused ring in which three or more rings including an aromatic ring are fused, and mixing a metal oxide (B) in which a capping agent is covalently bonded to a surface thereof, in the curable composition containing the curable compound (A) and a curing agent (C). Thus, the present invention has been completed. Specifically, the present invention provides the followings.

A first aspect of the present invention is directed to a curable composition comprising: (A) a curable compound, (B) a metal oxide, and (C) a curing agent,
wherein the curable compound (A) comprises a compound represented by the following formula (a1), and
a capping agent is covalently bonded to a surface of the metal oxide (B):

[Chem. 1]

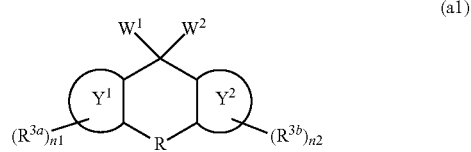
(a1)

wherein, in the formula (a1), $W^1$ and $W^2$ each independently represent a group represented by the following formula (a2):

[Chem. 2]

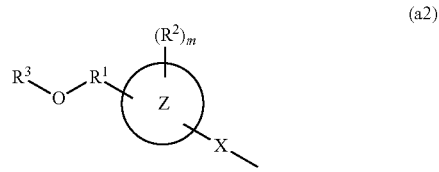
(a2)

wherein, in the formula (a2), a ring Z represents an aromatic hydrocarbon ring, X represents a single bond or a group represented by —S—, $R^1$ represents a single bond, an alkylene group having 1 to 4 carbon atoms, or an alkyleneoxy group having 1 or more and 4 or less carbon atoms, and when $R^1$ is an alkyleneoxy group, the oxygen atom in the alkyleneoxy group is bonded with a ring Z, $R^2$ represents a monovalent hydrocarbon group, a hydroxyl group, a group represented by —OR$^{4a}$, a group represented by —SR$^{4b}$, an acyl group, an alkoxycarbonyl group, a halogen atom, a nitro group, a cyano group, a mercapto group, a carboxy group, an amino group, a carbamoyl group, a group represented by —NHR$^{4c}$, a group represented by —N(R$^{4d}$)$_2$, a sulfo group, or a group in which at least a part of hydrogen atoms bonded to the carbon atom included in a monovalent hydrocarbon group, a group represented by —OR$^{4a}$, a group represented by —SR$^{4b}$, an acyl group, an alkoxycarbonyl group, a group represented by —NHR$^{4c}$, or a group represented by —N(R$^{4d}$)$_2$ is/are substituted with a monovalent hydrocarbon group, a hydroxyl group, a group represented by —OR$^{4a}$, a group represented by —SR$^{4b}$, an acyl group, an alkoxycarbonyl group, a halogen atom, a nitro group, a cyano group, a mercapto group, a carboxyl group, an amino group, a carbamoyl group, a group represented by —NHR$^{4c}$, a group represented by —N(R$^{4d}$)$_2$, a mesyloxy group, or a sulfo group, $R^{4a}$ to $R^{4d}$ independently represent a monovalent hydrocarbon group, m represents an integer of 0 or more, $R^3$ represents a hydrogen atom, a vinyl group, a thiiran-2-ylmethyl group, a glycidyl group, or a (meth)acryloyl group, both $W^1$ and $W^2$ do not have a hydrogen atom as $R^3$, a ring $Y^1$ and a ring $Y^2$ represent the same or different aromatic hydrocarbon ring, R represents a single bond, an optionally substituted methylene group, an ethylene group which is optionally substituent and contain a heteroatom between two carbon atoms, a group represented by —O—, a group represented by —NH—, or a group represented by —S—, $R^{3a}$ and $R^{3b}$ independently represent a cyano group, a halogen atom, or a monovalent hydrocarbon group, and n1 and n2 independently represent an integer of 0 to 4.

A second aspect of the present invention is directed to a cured product obtained by curing the curable composition according to the first aspect.

A third aspect of the present invention is directed to a cured film comprising the cured product according to the second aspect.

A fourth aspect of the present invention is directed to a display panel for an image display device, provided with the cured film according to the third aspect.

A fifth aspect of the present invention is directed to a method for producing a cured product, which comprises: forming the curable composition according to the first aspect into a predetermined shape, and subjecting the thus formed curable composition to at least one of light exposure and heating.

According to the present invention, it is possible to provide a curable composition capable of forming a cured product having high refractive index and excellent bending resistance, a cured product of the curable composition, a cured film made of the cured product, a display panel provided with the cured film, and a method for producing a cured product using the above-mentioned curable composition.

DETAILED DESCRIPTION OF THE INVENTION

<<Curable Composition>>

A curable composition includes: (A) a curable compound, (B) a metal oxide, and (C) a curing agent. The curable compound (A) is a compound represented by the formula (a1) mentioned later and has a fused polycyclic skeleton containing an aromatic ring as main skeleton, and also has a polymerizable group. A capping agent is covalently bonded to a surface of the metal oxide (B). Use of the curable compound (A) in combination with the metal oxide (B) enables formation of a cured product having satisfactory flexibility, regardless of high refractive index.

Essential or optional components contained in the curable composition will be described below.

<(A) Curable Compound>

The curable compound (A) contains a compound represented by the following formula (a1). Use of the curable compound (A) represented by the following formula (a1) in combination with the metal oxide (B) mentioned later enables formation of a cured product having satisfactory flexibility, regardless of high refractive index:

[Chem. 3]

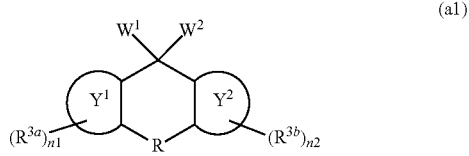

(a1)

wherein, in the formula (a1), $W^1$ and $W^2$ each independently represent a group represented by the following formula (a2):

[Chem. 4]

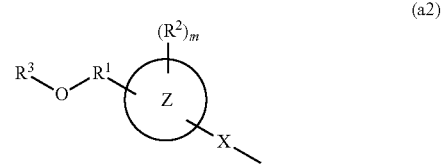

(a2)

wherein, in the formula (a2), a ring Z represents an aromatic hydrocarbon ring, X represents a single bond or a group represented by —S—, $R^1$ represents a single bond, an alkylene group having 1 or more and 4 or less carbon atoms, or an alkyleneoxy group having 1 or more and 4 or less carbon atoms, and when $R^1$ is an alkyleneoxy group, the oxygen atom in the alkyleneoxy group is bonded with a ring Z, $R^2$ represents a monovalent hydrocarbon group, a hydroxyl group, a group represented by —$OR^{4a}$, a group represented by —$SR^{4b}$, an acyl group, an alkoxycarbonyl group, a halogen atom, a nitro group, a cyano group, a mercapto group, a carboxy group, an amino group, a carbamoyl group, a group represented by —$NHR^{4c}$, a group represented by —$N(R^{4d})_2$, a sulfo group, or a group in which at least a part of hydrogen atoms bonded to the carbon atom included in a monovalent hydrocarbon group, a group represented by —$OR^{4a}$, a group represented by —$SR^{4b}$, an acyl group, an alkoxycarbonyl group, a group represented by —$NHR^{4c}$, or a group represented by —$N(R^{4d})_2$ is/are substituted with a monovalent hydrocarbon group, a hydroxyl group, a group represented by —$OR^{4a}$, a group represented by —$SR^{4b}$, an acyl group, an alkoxycarbonyl group, a halogen atom, a nitro group, a cyano group, a mercapto group, a carboxyl group, an amino group, a carbamoyl group, a group represented by —$NHR^{4c}$, a group represented by —$N(R^{4d})_2$, a mesyloxy group, or a sulfo group, $R^{4a}$ to $R^{4d}$ independently represent a monovalent hydrocarbon group, m represents an integer of 0 or more, $R^3$ represents a hydrogen atom, a vinyl group, a thiiran-2-ylmethyl group, a glycidyl group, or a (meth)acryloyl group, both $W^1$ and $W^2$ do not have a hydrogen atom as $R^3$, a ring $Y^1$ and a ring $Y^2$ represent the same or different aromatic hydrocarbon ring, R represents a single bond, an optionally substituted methylene group, an ethylene group which is optionally substituent and contain a heteroatom between two carbon atoms, a group represented by —O—, a group represented by —NH—, or a group represented by —S—, $R^{3a}$ and $R^{3b}$ independently represent a cyano group, a halogen atom, or a monovalent hydrocarbon group, and n1 and n2 independently represent an integer of 0 or more and 4 or less.

In the formula (a2), examples of the ring Z include a benzene ring, a fused polycyclic aromatic hydrocarbon ring [for example, a fused di- to tetracyclic aromatic hydrocarbon ring, such as a fused dicyclic hydrocarbon ring (e.g., a $C_{8-20}$ fused dicyclic hydrocarbon ring such as a naphthalene ring, and preferably a $C_{10-16}$ fused dicyclic hydrocarbon ring) or a fused tricyclic aromatic hydrocarbon ring (e.g., an anthracene ring, a phenanthrene ring, etc.)], and the like. The ring Z is preferably a benzene ring or a naphthalene ring, and more preferably a naphthalene ring. $W^1$ and $W^2$ in the formula (a1) each independently represent a group represented by the following formula (a2), so that $W^1$ and $W^2$ each contain a ring Z. The ring Z contained in $W^1$ and the ring Z contained in $W^2$ may be the same or different and, for example, one ring may be a benzene ring and the other ring may be a naphthalene ring, and any of rings is particularly preferably a naphthalene ring.

There is no particular limitation on the substitution position of the ring Z bonded to the carbon atoms, to which both $W^1$ and $W^2$ are directly bonded, via X. For example, when the ring Z is a naphthalene ring, the group corresponding to the ring Z bonded to the carbon atom may be a 1-naphthyl group, a 2-naphthyl group, or the like.

In the formula (a2), X independently represents a single bond, or a group represented by —S—, and typically a single bond.

In the formula (a2), $R^1$ includes, for example, a single bond; an alkylene group having 1 or more and 4 or less carbon atoms, such as a methylene group, an ethylene group, a trimethylene group, a propylene group, or a butane-1,2-diyl group; and a alkyleneoxy group having 1 or more and 4 or less carbon atoms, such as a methyleneoxy group, an ethyleneoxy group, or a propyleneoxy group; and is preferably a single bond; a $C_{2-4}$ alkylene group (particularly, a $C_{2-3}$ alkylene group such as an ethylene group or a propylene group); a $C_{2-4}$ alkyleneoxy group (particularly, a $C_{2-3}$ alkylene group such as an ethyleneoxy group or a propyleneoxy group), and more preferably a single bond. When $R^1$ is an alkyleneoxy group, the oxygen atom in the alkyleneoxy group is bonded with the ring Z. $W^1$ and $W^2$ in the formula (a1) each independently represent a group represented by the following formula (a2), so that $W^1$ and $W^2$ each contain $R^1$ as a divalent group. $R^1$ contained in $W^1$ and $R^1$ contained in $W^2$ may be the same or different.

In the formula (a2), an examples of $R^2$ include a monovalent hydrocarbon group such as an alkyl group (e.g., a $C_{1-12}$ alkyl group such as a methyl group, an ethyl group, a propyl group, an isopropyl group, or a butyl group, preferably a $C_{1-8}$ alkyl group, and more preferably a $C_{1-6}$ alkyl group), an cycloalkyl group (a $C_{5-10}$ cycloalkyl group such as a cyclohexyl group, preferably a $C_{5-8}$ cycloalkyl group, and more preferably a $C_{5-6}$ cycloalkyl group), an aryl group (e.g., a $C_{6-14}$ aryl group such as a phenyl group, a tolyl group, a xylyl group, or a naphthyl group, preferably a $C_{6-10}$ aryl group, and more preferably a $C_{6-8}$ aryl group), and an aralkyl group (a $C_{6-10}$ aryl-$C_{1-4}$ alkyl group such as a benzyl group or an phenethyl group); a hydroxyl group; a group represented by —$OR^{4a}$ [wherein $R^{4a}$ represents a monovalent hydrocarbon group (the above-mentioned monovalent hydrocarbon group, etc.)] such as an alkoxy group (a $C_{1-12}$ alkoxy group such as a methoxy group, an ethoxy group, a propoxy group, or a butoxy group, preferably a $C_{1-8}$ alkoxy group, and more preferably a $C_{1-6}$ alkoxy group), a cycloalkoxy group (a $C_{5-10}$ cycloalkoxy group such as a cyclohexyloxy group), an aryloxy group (a $C_{6-10}$ aryloxy group such as a phenoxy group), or an aralkyloxy group (e.g., a $C_{6-10}$ aryl-$C_{1-4}$ alkyloxy group such as a benzyloxy group); a group represented by —$SR^{4b}$ [wherein $R^{4b}$ represents a monovalent hydrocarbon group (the above-mentioned monovalent hydrocarbon group, etc.)] such as an alkylthio group (a $C_{1-12}$ alkylthio group such as a methylthio group, an ethylthio group, a propylthio group, or a butylthio group, preferably a $C_{1-8}$ alkylthio group, and more preferably a $C_{1-6}$ alkylthio group), a cycloalkylthio group (a $C_{5-10}$ cycloalkylthio group such as a cyclohexylthio group), an arylthio group (a $C_{6-10}$ arylthio group such as a phenylthio group), an aralkylthio group (e.g., a $C_{6-10}$ aryl-$C_{1-4}$ alkylthio group such as a benzylthio group); an acyl group (a $C_{1-6}$ acyl group such as an acetyl group); an alkoxycarbonyl group (a $C_{1-4}$ alkoxy-carbonyl group such as a methoxycarbonyl group); a halogen atom (a fluorine atom, a chlorine atom, a bromine atom, an iodine atom, etc.); a nitro group; a cyano group; a mercapto group; a carboxyl group; an amino group; a carbamoyl group; a group represented by —$NHR^{4c}$ [wherein $R^{4c}$ represents a monovalent hydrocarbon group (the above-mentioned monovalent hydrocarbon group)] such as an alkylamino group (a $C_{1-12}$ alkylamino group such as a methylamino group, an ethylamino group, a propylamino group, or a butylamino group, preferably a $C_{1-8}$ alkylamino group, and more preferably a $C_{1-6}$ alkylamino group), an cycloalkylamino group (a $C_{5-10}$ cycloalkylamino group such as a cyclohexylamino group), an arylamino group (a $C_{6-10}$ arylamino group such as a phenylamino group), or an aralkylamino group (e.g., a $C_{6-10}$ aryl-$C_{1-4}$ alkylamino group such as a benzylamino group); a group represented by —$N(R^{4d})_2$ [wherein $R^{4d}$ independently represents a monovalent hydrocarbon group (the above-mentioned monovalent hydrocarbon group, etc.)] such as a dialkylamino group (a di($C_{1-12}$ alkyl)amino group such as a dimethylamino group, a diethylamino group, a dipropylamino group, or a dibutylamino group, preferably a di($C_{1-8}$ alkyl)amino group, and more preferably a di($C_{1-6}$ alkyl) amino group), a dicycloalkylamino group (a di($C_{5-10}$ cycloalkyl)amino group such as a dicyclohexylamino group), a diarylamino group (a di($C_{6-10}$ aryl)amino group such as a diphenylamino group), or a diaralkylamino group (e.g., a di($C_{6-10}$ aryl-$C_{1-4}$ alkyl)amino group such as a dibenzylamino group); a (meth)acryloyloxy group; a sulfo group; and a group in which at least a part of hydrogen atoms bonded to the carbon atom included in the monovalent hydrocarbon group, a group represented by —$OR^{4a}$, a group represented by —$SR^{4b}$, an acyl group, an alkoxycarbonyl group, a group represented by —$NHR^{4c}$, or a group represented by —$N(R^{4d})_2$ is/are substituted with the monovalent hydrocarbon group, a hydroxyl group, a group represented by —$OR^{4a}$, a group represented by —$SR^{4b}$, an acyl group, an alkoxycarbonyl group, a halogen atom, a nitro group, a cyano group, a mercapto group, a carboxyl group, an amino group, a carbamoyl group, a group represented by —$NHR^{4c}$, a group represented by —$N(R^{4d})_2$, a (meth)acryloyloxy group, a mesyloxy group, or a sulfo group [for example, an alkoxyaryl group (e.g., a $C_{1-4}$ alkoxy $C_{6-10}$ aryl group such as a methoxyphenyl group), an alkoxycarbonylaryl group (e.g., a $C_{1-4}$ alkoxy-carbonyl $C_{6-10}$ aryl group such as a methoxycarbonylphenyl group or an ethoxycarbonylphenyl group)], and the like.

Of these, $R^2$ may be typically a monovalent hydrocarbon group, a group represented by —$OR^{4a}$, a group represented by —$SR^{4b}$, an acyl group, an alkoxycarbonyl group, a halogen atom, a nitro group, a cyano group, a group represented by —$NHR^{4c}$, a group represented by —$N(R^{4d})_2$, or the like.

Examples of preferred $R^2$ include a monovalent hydrocarbon group [for example, an alkyl group (e.g., a $C_{1-6}$ alkyl group), a cycloalkyl group (e.g., a $C_{5-8}$ cycloalkyl group), an aryl group (e.g., a $C_{6-10}$ aryl group), an aralkyl group (e.g., a $C_{6-8}$ aryl-$C_{1-2}$ alkyl group), etc.], an alkoxy group (a $C_{1-4}$ alkoxy group, etc.), and the like. Particularly, $R^{2a}$ and $R^{2b}$ are preferably a monovalent hydrocarbon group (particularly, an alkyl group), such as an alkyl group [a $C_{1-4}$ alkyl group (particularly, a methyl group)], or an aryl group [e.g., a $C_{6-10}$ aryl group (particularly, a phenyl group)].

When m is an integer of 2 or more, plural $R^2$(s) may be different or may be the same. $R^2$ contained in $W^1$ and $R^2$ contained in $W^2$ may be the same or different.

In the formula (a2), the number m of $R^2$ can be selected according to types of the ring Z and may be, for example, 0 or more and 4 or less, preferably 0 or more and 3 or less, and more preferably 0 or more and 2 or less.

m in $W^1$ and m in $W^2$ may be the same or different.

In the formula (a3), $R^3$ is a hydrogen atom, a vinyl group, a thiiran-2-ylmethyl group, a glycidyl group, or a (meth) acryloyl group. Both $W^1$ and $W^2$ do not contain a hydrogen atom as $R^3$. Any of a vinyloxy group, a thiiran-2-ylmethyl group, and a glycidyl group is a cationic polymerizable functional group. Therefore, the compound, which is represented by the formula (a1) and has, as $R^3$, a vinyl group, a thiiran-2-ylmethyl group, or a glycidyl group, is a cationic polymerizable compound. Meanwhile, the compound, which is represented by the formula (a1) and has, as $R^3$, a (meth)acryloyl group, is a radical polymerizable compound.

$R^3$ contained in $W^1$ and $R^3$ contained in $W^2$ may be the same or different as long as both $R^3$(s) are not hydrogen atoms. Both $R^3$ contained in $W^1$ and $R^3$ contained in $W^2$ are preferably a vinyl group, a thiiran-2-ylmethyl group, or a glycidyl group, and more preferably the same group selected from the group consisting of a vinyl group, a thiiran-2-ylmethyl group, and a glycidyl group. Both $R^3$ contained in $W^1$ and $R^3$ contained in $W^2$ are also preferably (meth) acryloyl groups.

$R^3$ is preferably a vinyl group, a glycidyl group, or a (meth)acryloyl group since it is easy to synthesize and obtain the compound represented by the formula (a1). Since it is possible to decrease types of the component contained in the curable composition, the compound represented by the formula (a1) preferably has only a group selected from a vinyl group, a thiiran-2-ylmethyl group, and a glycidyl group as a reactive group, or only a (meth)acryloyl group as a reactive group.

In the formula (a1), examples of the rings $Y^1$ and $Y^2$ includes a benzene ring and a fused polycyclic aromatic hydrocarbon ring [for example, a fused di- to tetracyclic aromatic hydrocarbon ring, such as a fused dicyclic hydrocarbon ring (e.g., a $C_{8-20}$ fused dicyclic hydrocarbon ring such as a naphthalene ring, and preferably a $C_{10-16}$ fused dicyclic hydrocarbon ring), and a fused tricyclic aromatic hydrocarbon ring (e.g., an anthracene ring, a phenanthrene ring, etc.). The rings $Y^1$ and $Y^2$ are preferably a benzene ring or a naphthalene ring, and more preferably a benzene ring. The rings $Y^1$ ring $Y^2$ may be the same or different and, for example, one ring may be a benzene ring and the other ring may be a naphthalene ring.

In the formula (a1), R represents a single bond, an optionally substituted methylene group, an ethylene group which is optionally substituted and may contain a heteroatom between two carbon atoms, a group represented by —O—, a group represented by —NH—, or a group represented by —S—, and typically a single bond. Examples of the substituent include a cyano group, a halogen atom (a fluorine atom, a chlorine atom, a bromine atom, etc.), a monovalent hydrocarbon group [e.g., an alkyl group (a $C_{1-6}$ alkyl group such as a methyl group, an ethyl group, a propyl group, an isopropyl group, a butyl group, a t-butyl group, etc.), an aryl group (a $C_{6-10}$ aryl group such as a phenyl group), etc.], and the like; and examples of the heteroatom include an oxygen atom, a nitrogen atom, a sulfur atom, a silicon atom, and the like.

In the formula (a1), $R^{3a}$ and $R^{3b}$ usually include non-reactive substituents, for example, a cyano group, a halogen atom (fluorine atom, chlorine atom, bromine atom, etc.), a monovalent hydrocarbon group [e.g., an alkyl group, an aryl group (a $C_{6-10}$ aryl group such as a phenyl group), etc.] and the like, and are preferably a cyano group or an alkyl group, and particularly preferably an alkyl group. Examples of the alkyl group include $C_{1-6}$ alkyl groups (e.g., a $C_{1-4}$ alkyl group, particularly a methyl group) such as a methyl group, an ethyl group, a propyl group, an isopropyl group, a butyl group, and a t-butyl group. When n1 is an integer of 2 or more, $R^{3a}$ may be different or may be the same. When n2 is an integer of 2 or more, $R^{3b}$ may be different or may be the same. $R^{3a}$ and $R^{3b}$ may be the same or different. There is no particular limitation on the bonding position (substitution position) of $R^{3a}$ and $R^{3b}$ on the rings $Y^1$ and $Y^2$. The substitution number n1 and n2 is preferably 0 or 1, and particularly 0.

n1 and n2 may be the same or different with each other.

The compound represented by the formula (a1) has a cationic polymerizable functional group while maintaining excellent optical properties and thermal properties, and therefore has high reactivity. Particularly, when the rings $Y^1$ and $Y^2$ are benzene rings and R is a single bond, the compound represented by the formula (a1) has a fluorene skeleton and is more excellent in optical properties and thermal properties. The compound represented by the formula (a1) gives a cured product having high hardness and is preferably as a base material component in the composition.

Of the compounds represented by the formula (a1), particularly preferred specific examples include epoxy group-containing fluorene compounds such as 9,9-bis[4-[2-(glycidyloxy)ethoxy]phenyl]-9H-fluorene, 9,9-bis[4-[2-(glycidyloxy)ethyl]phenyl]-9H-fluorene, 9,9-bis[4-(glycidyloxy)-3-methylphenyl]-9H-fluorene, 9,9-bis[4-(glycidyloxy)-3,5-dimethylphenyl]-9H-fluorene, 9,9-bis(6-glycidyloxynaphthalen-1-dimethyl)-9H-fluorene, and 9,9-bis(5-glycidyloxynaphthalen-2-yl)-9H-fluorene; and compounds represented by the following formulas.

[Chem. 5]

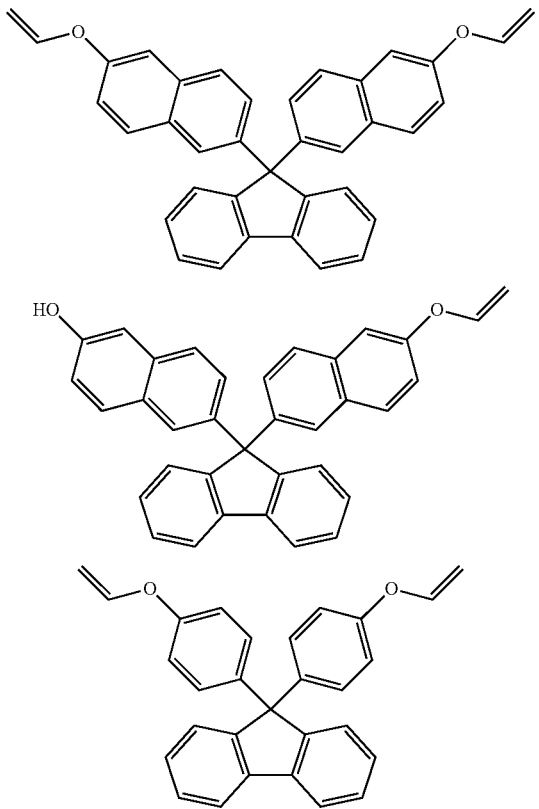

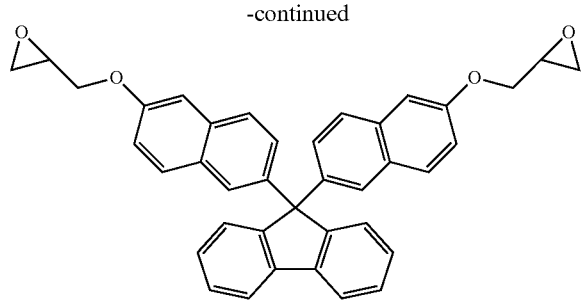
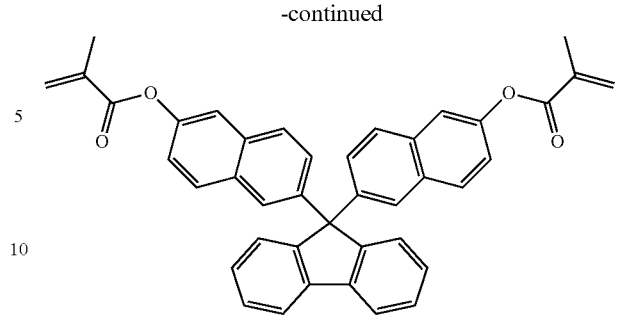
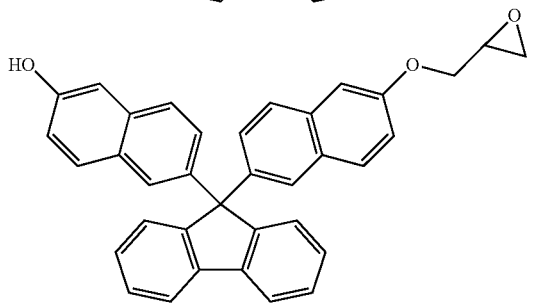
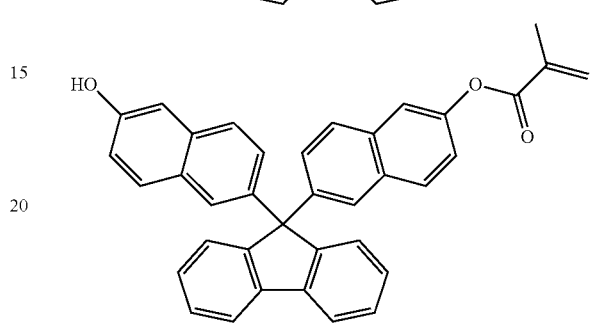
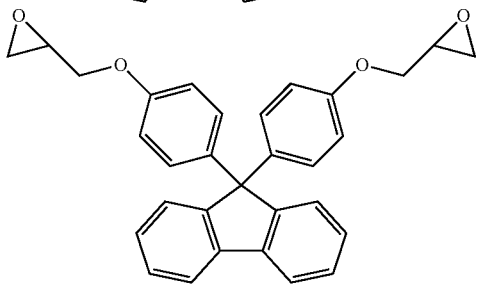
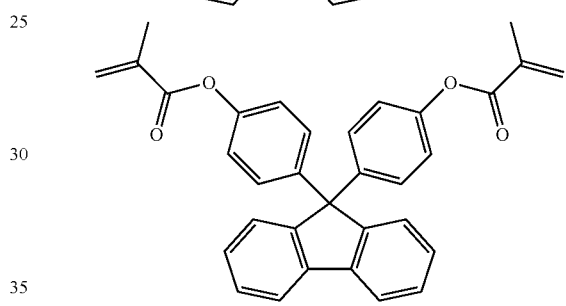
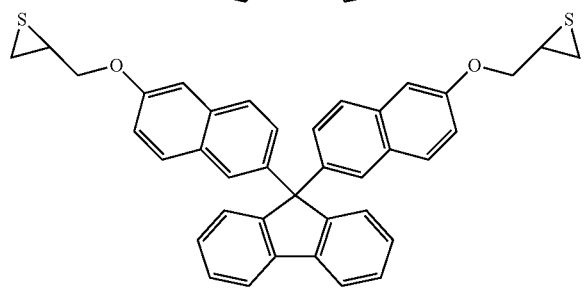
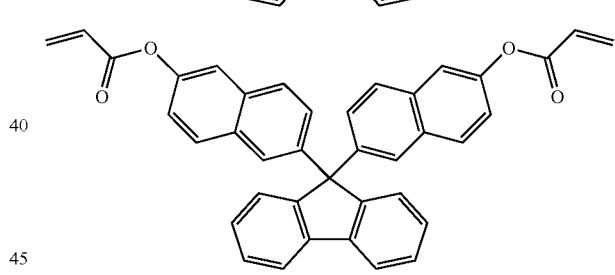
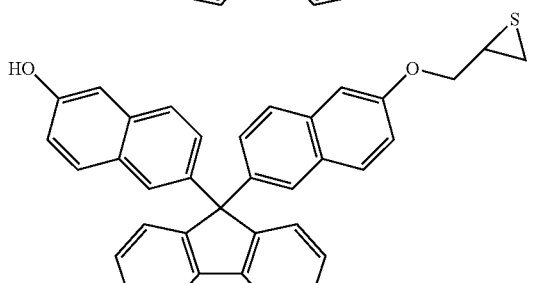
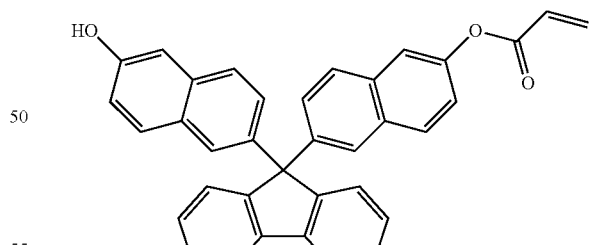
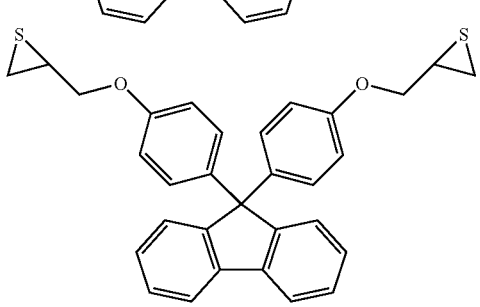
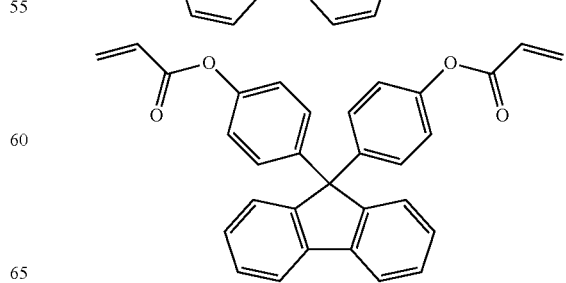

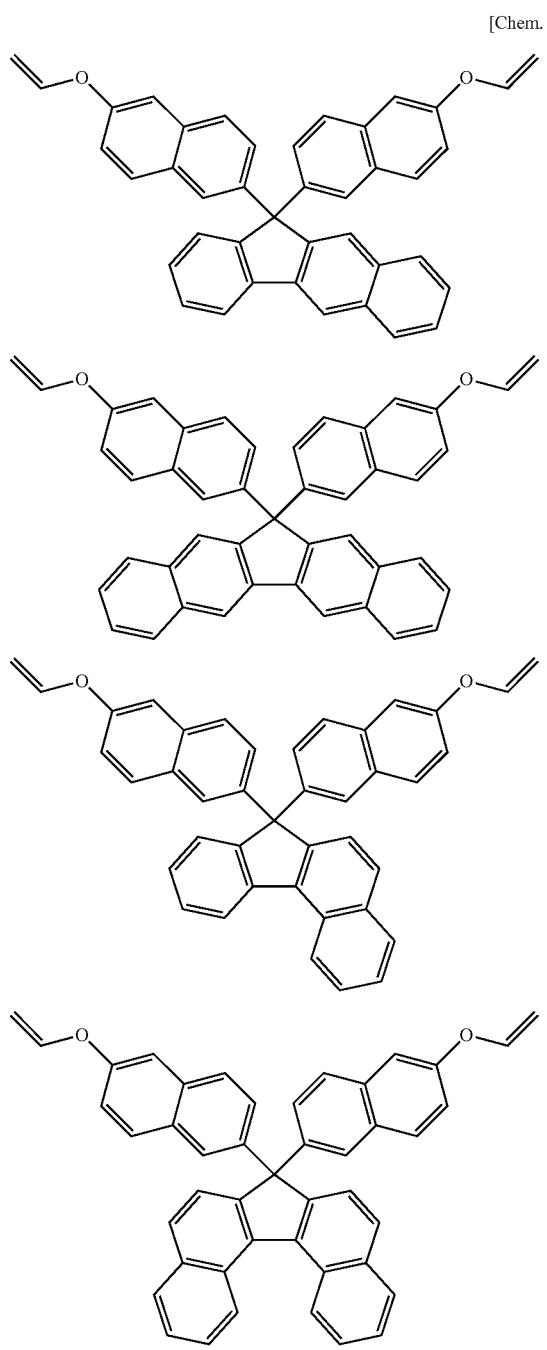
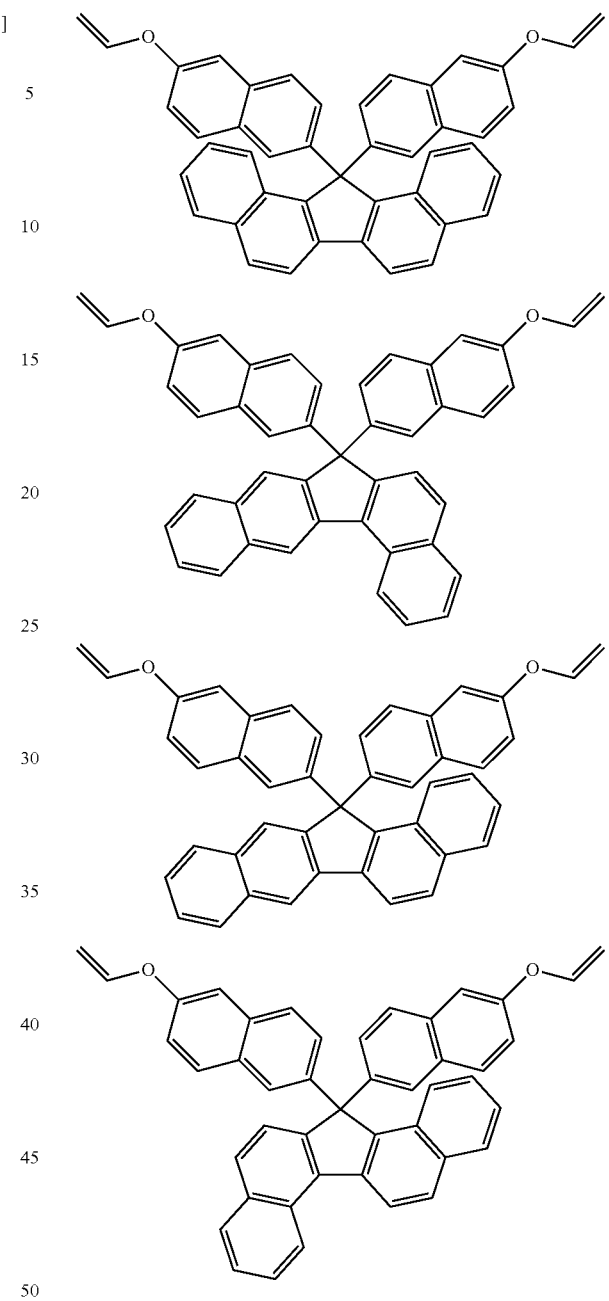
[Chem. 6]
[Chem. 7]
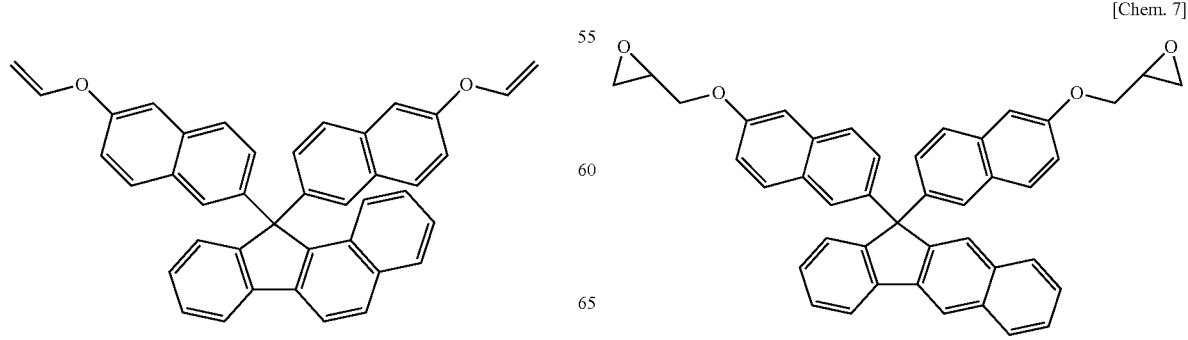

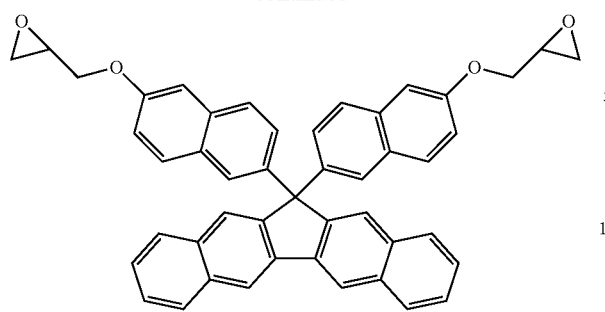
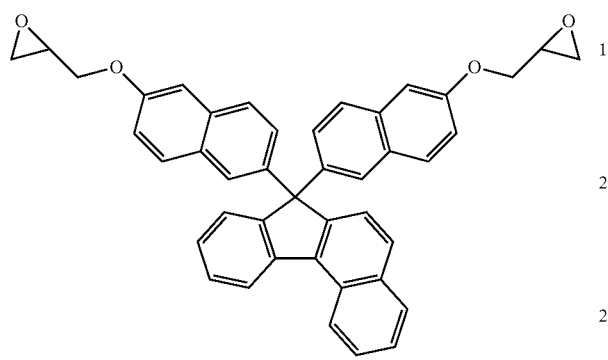
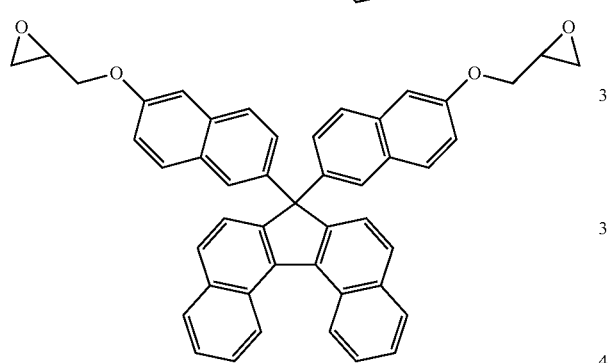
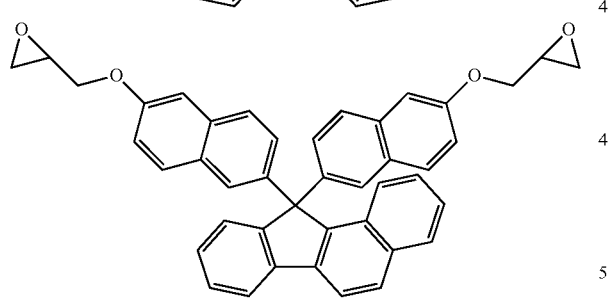
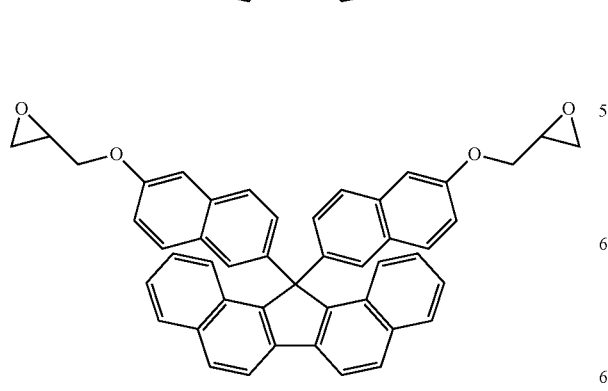
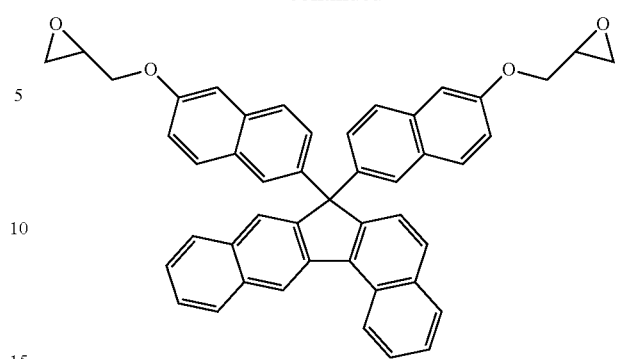
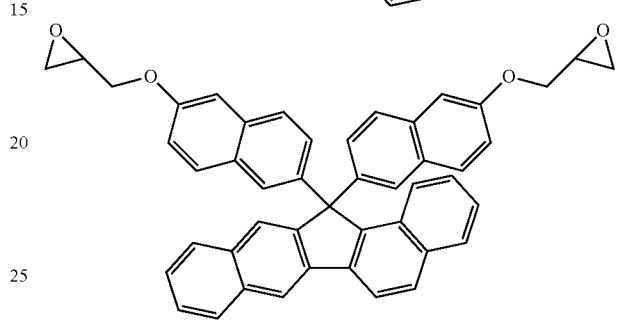
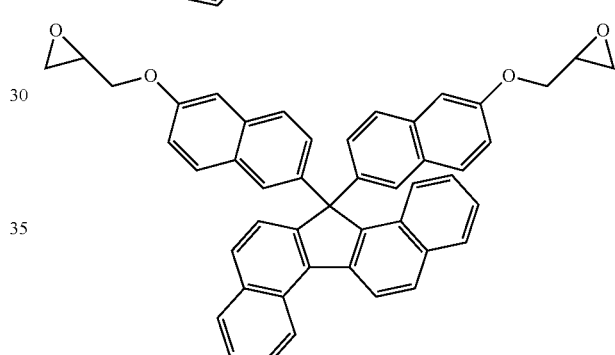
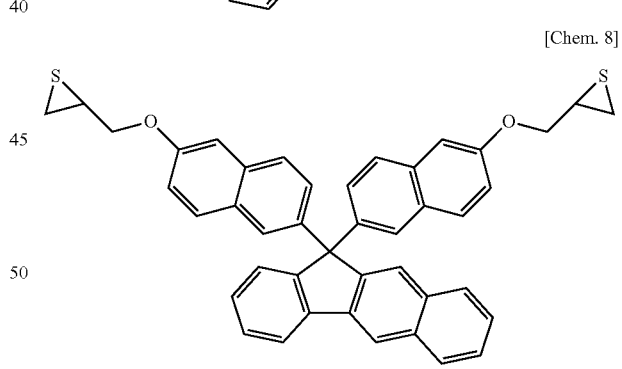
[Chem. 8]
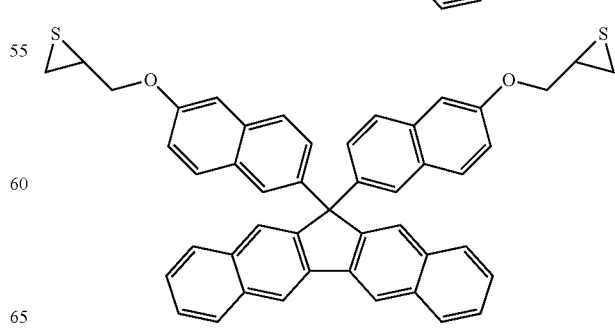

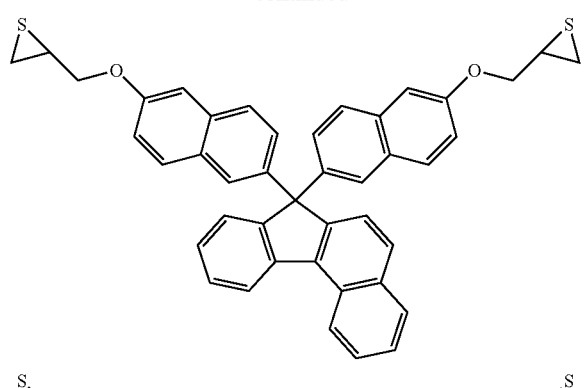
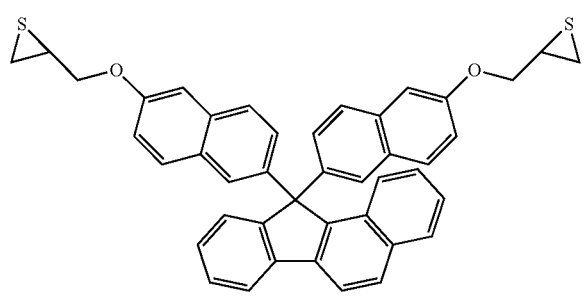
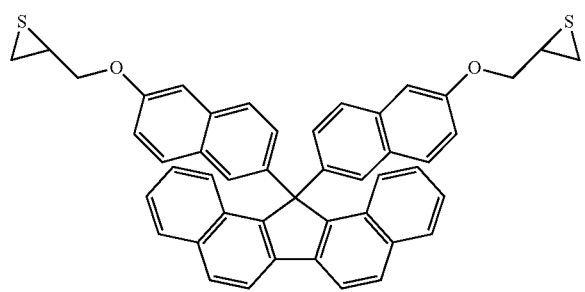
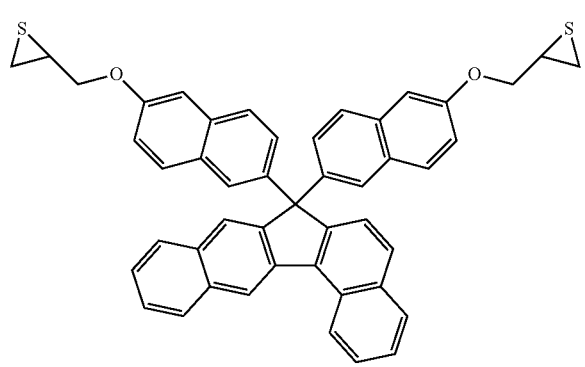
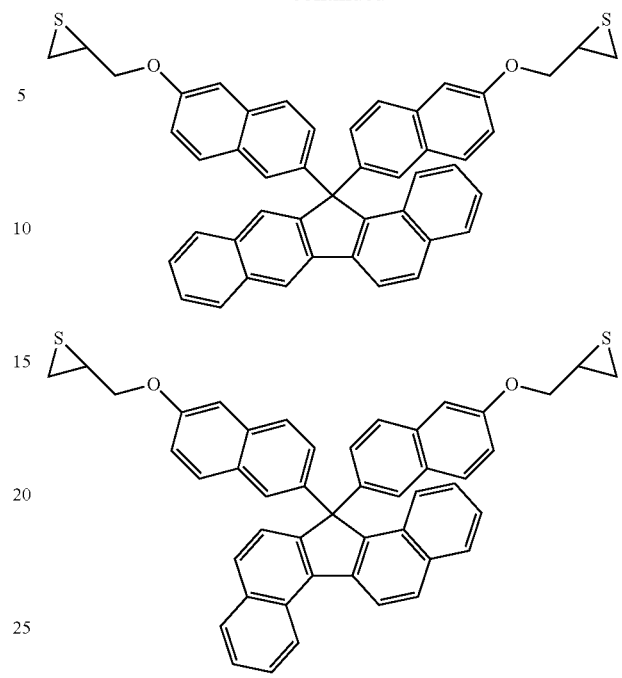
[Chem. 9]
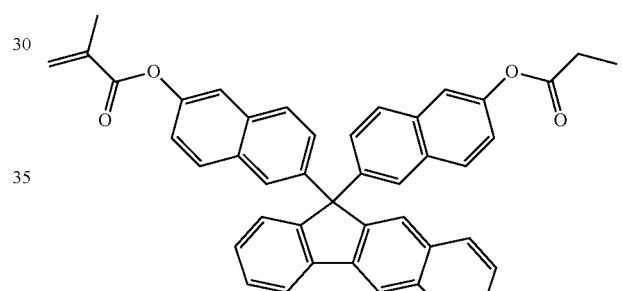
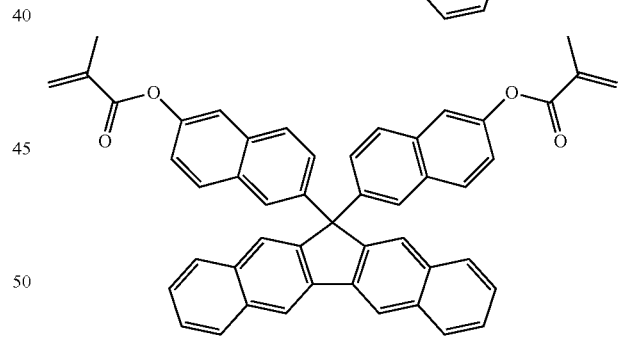
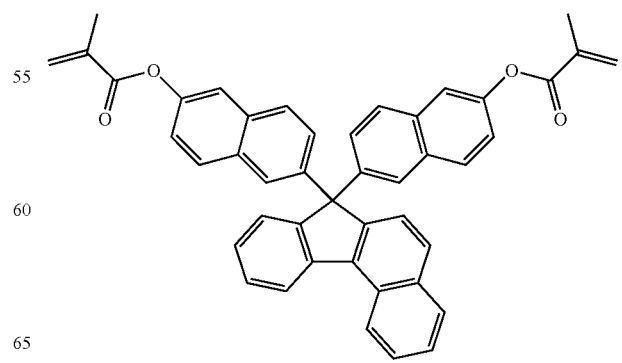

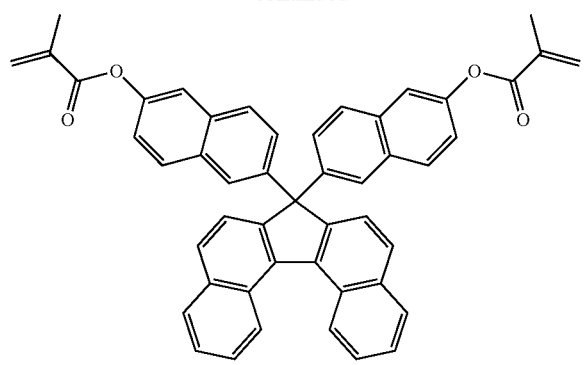
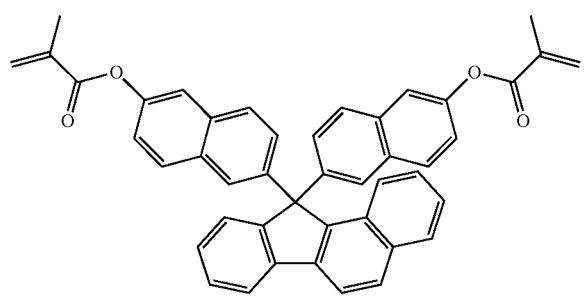
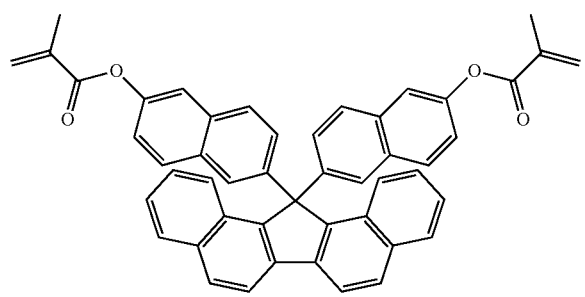
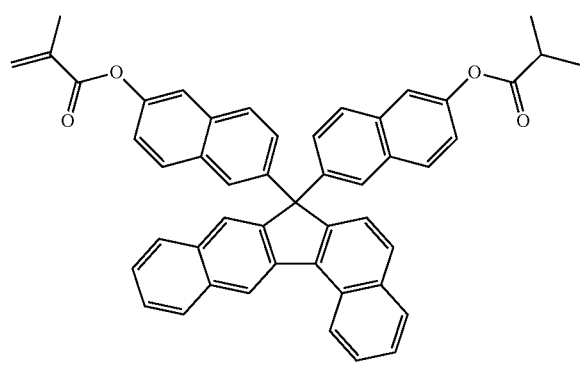
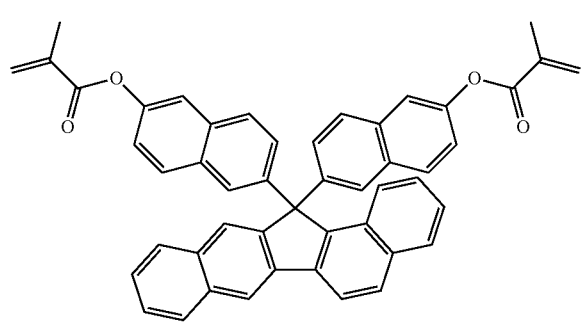
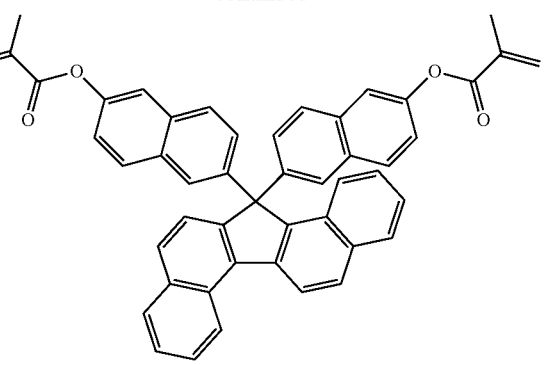
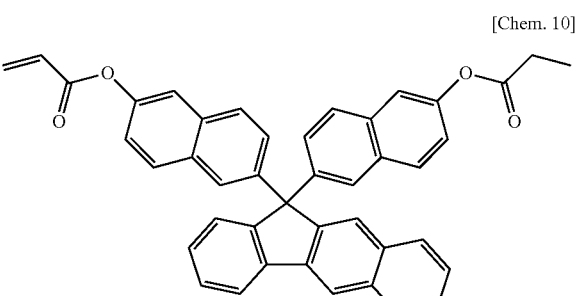
[Chem. 10]
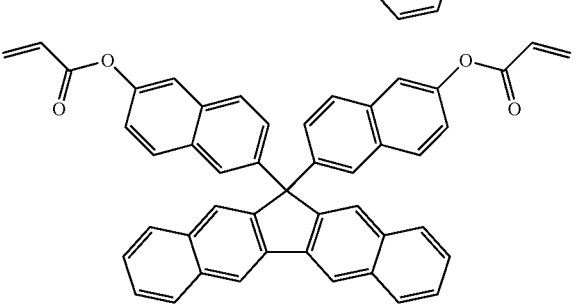
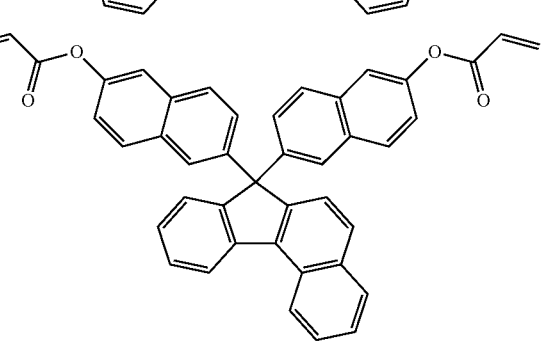
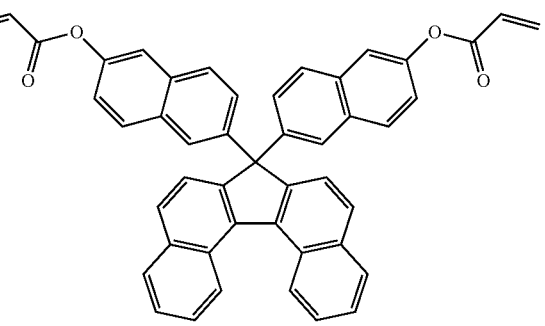

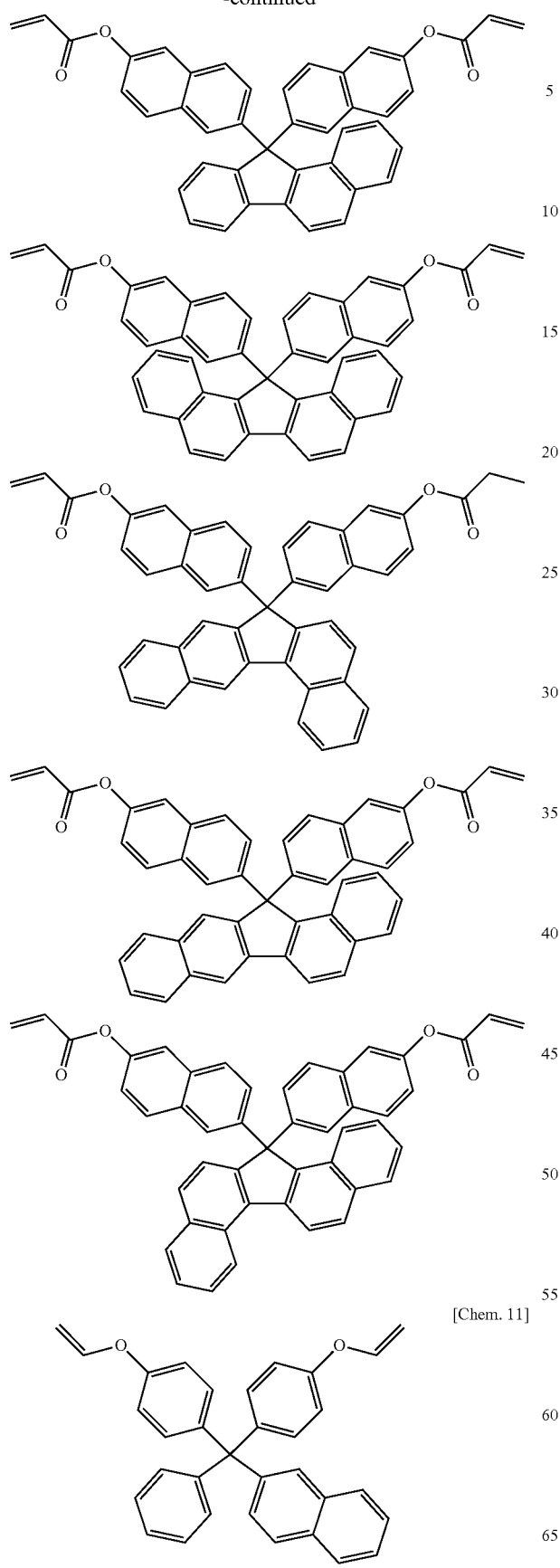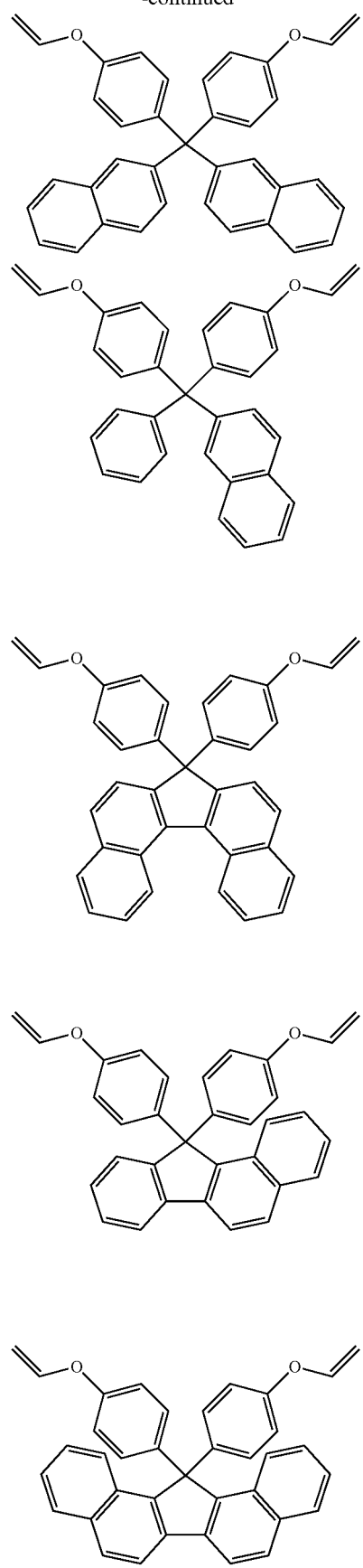

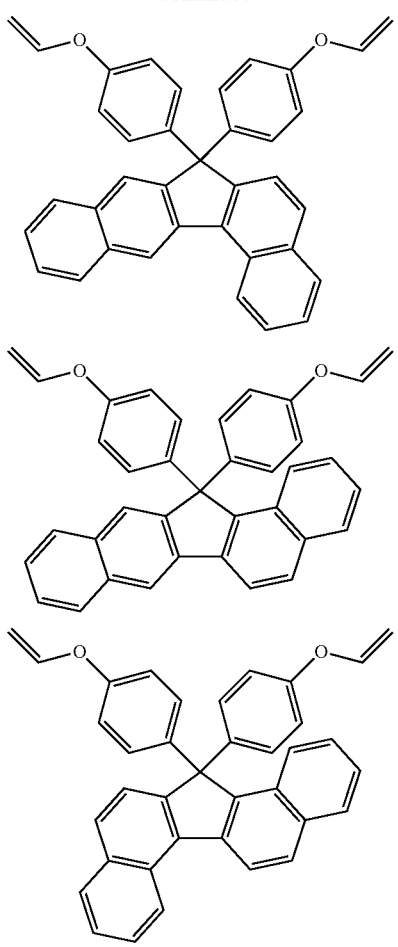
[Chem. 12]
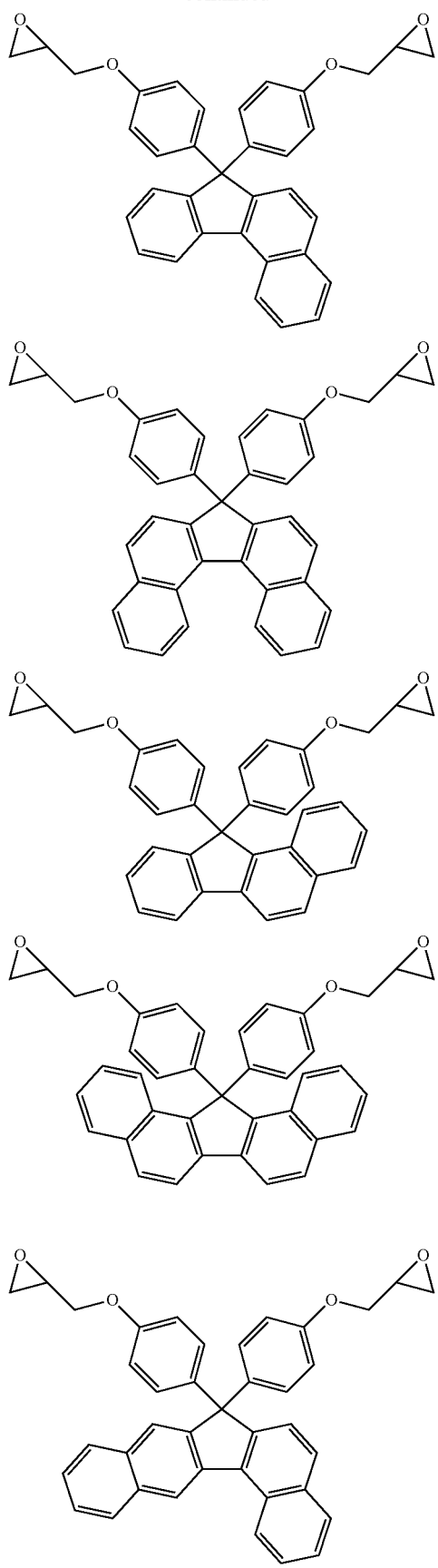

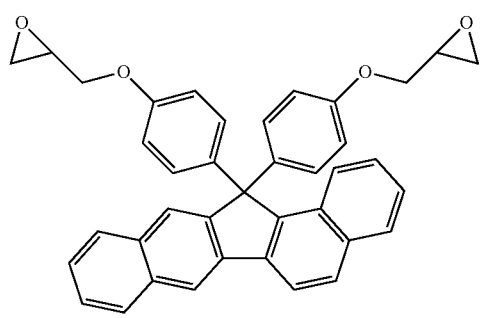
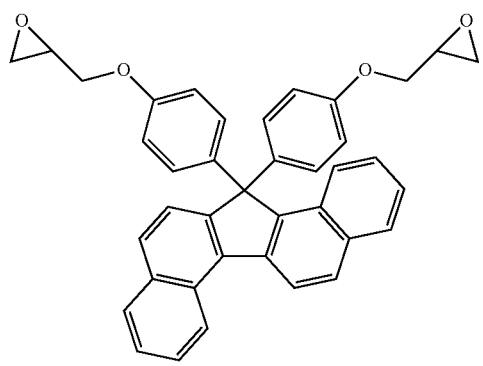
[Chem. 13]
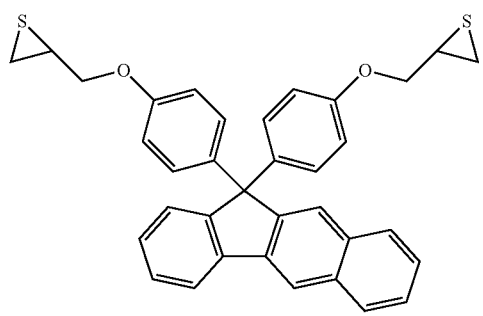
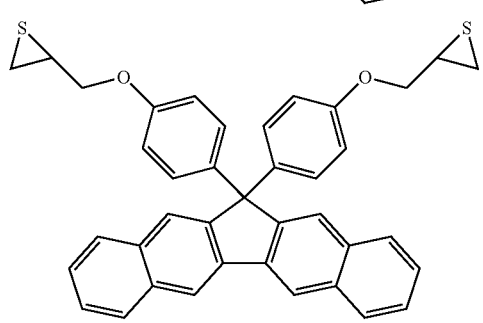
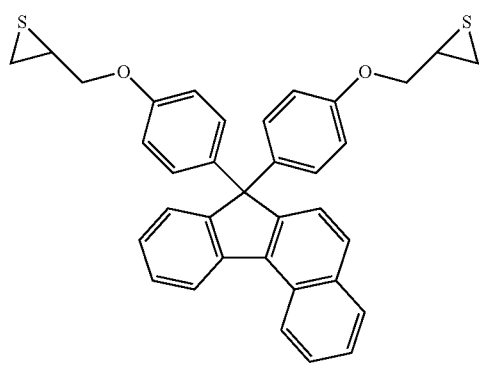
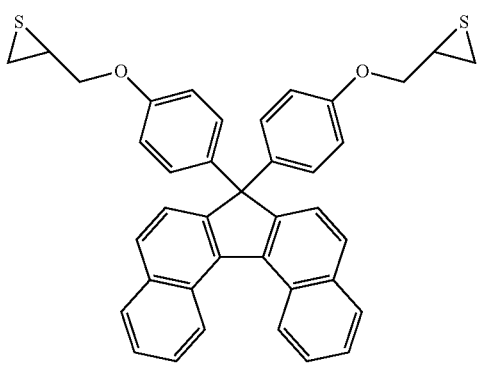
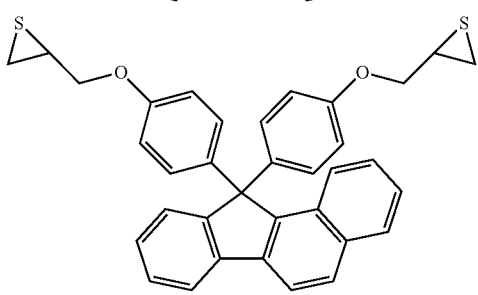
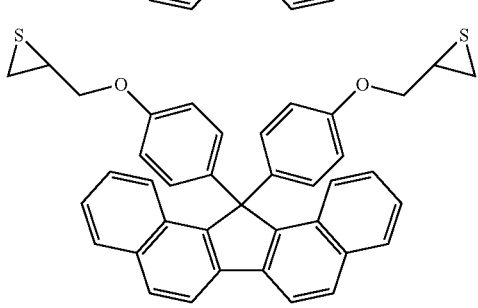
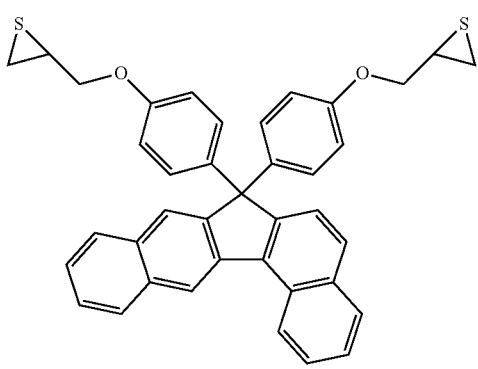
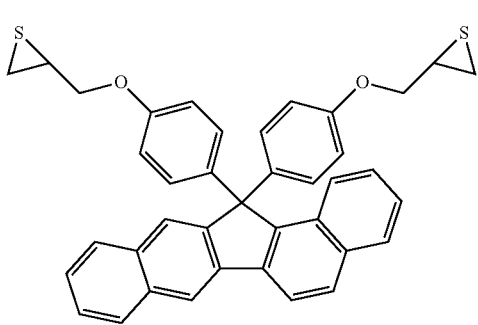

-continued
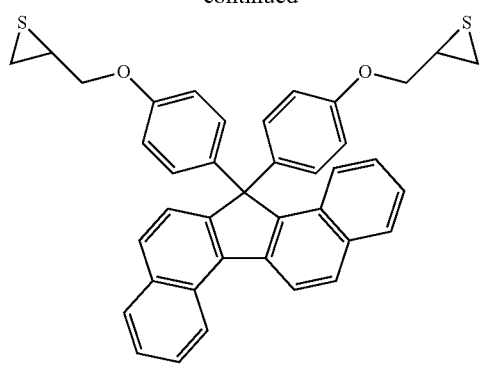
[Chem. 14]
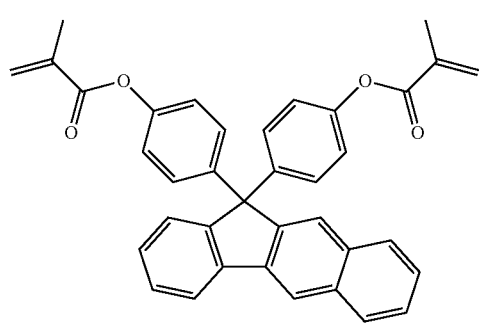
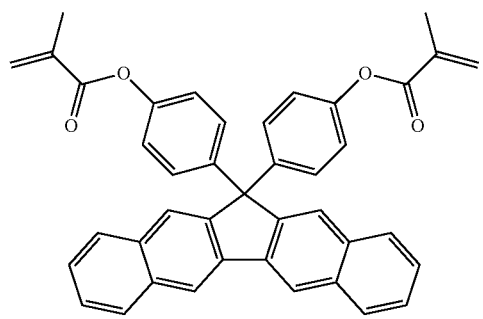
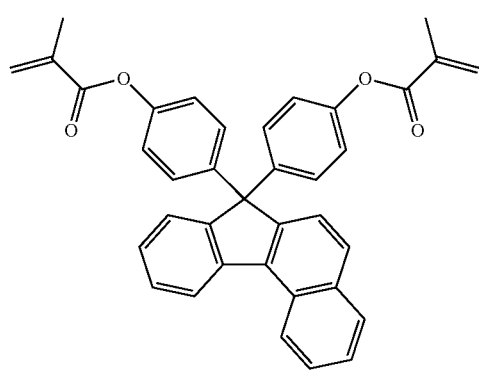
-continued
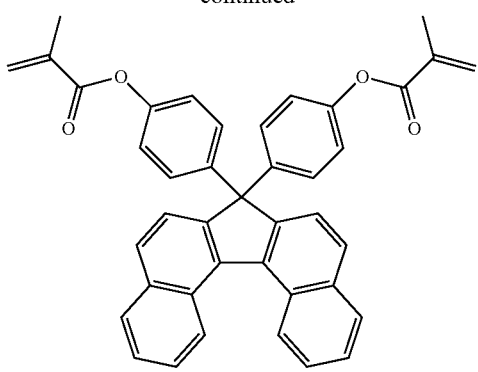
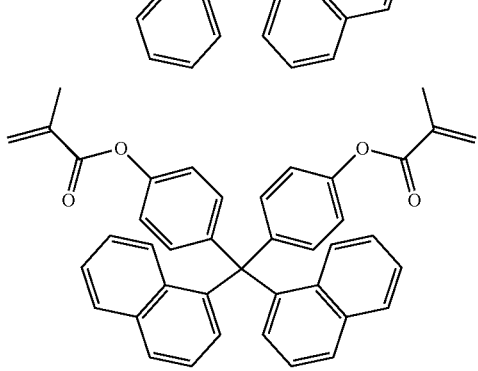
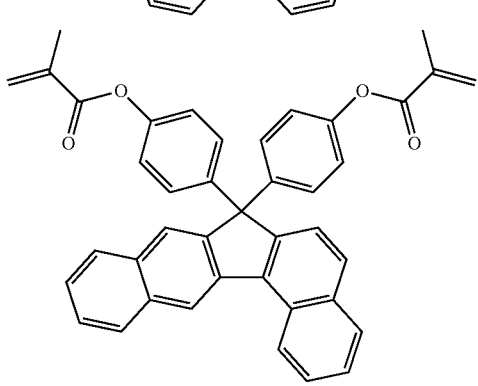
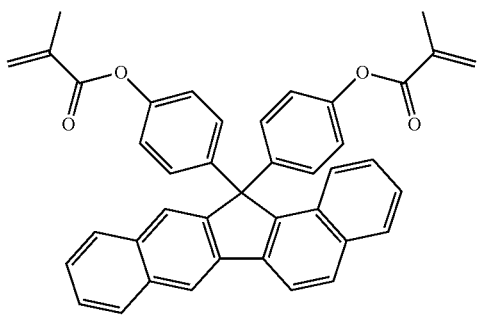

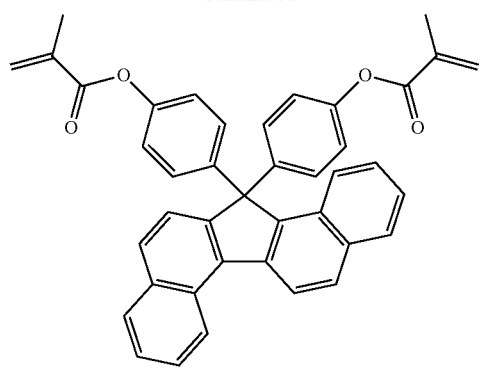
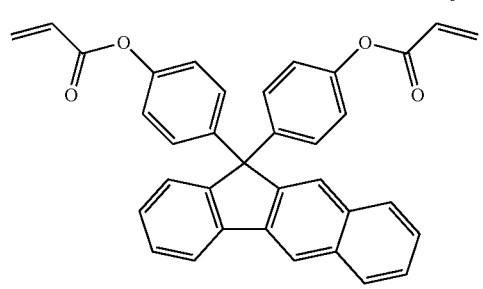
[Chem. 15]
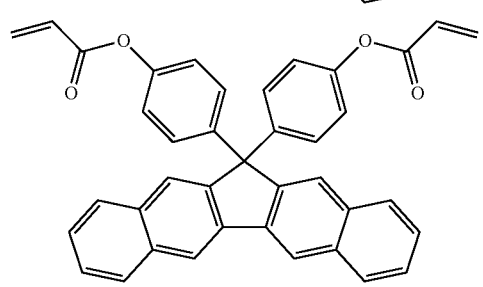
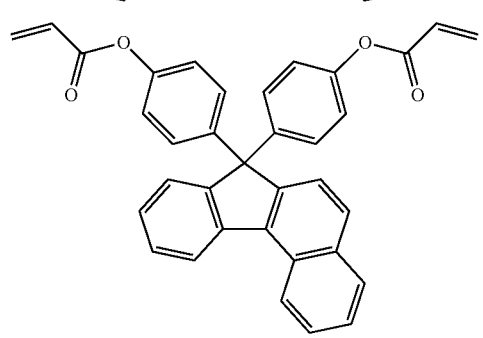
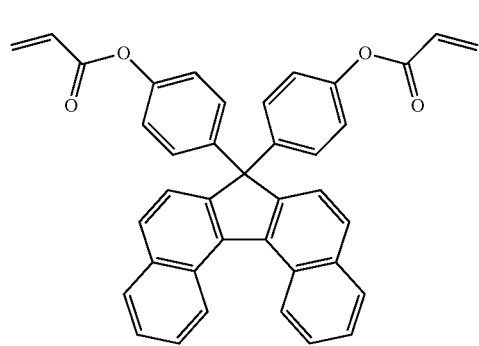
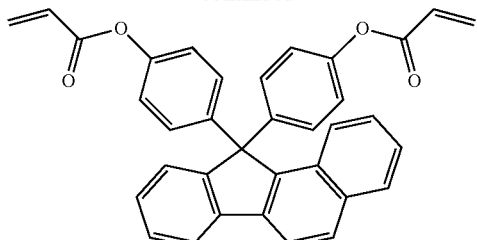
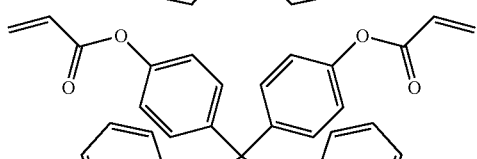
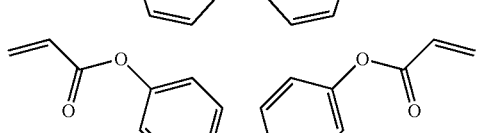
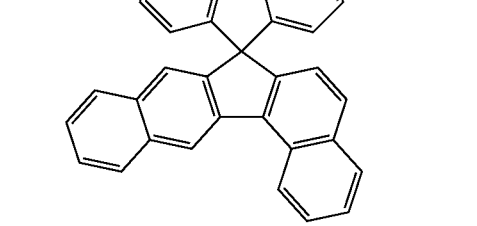
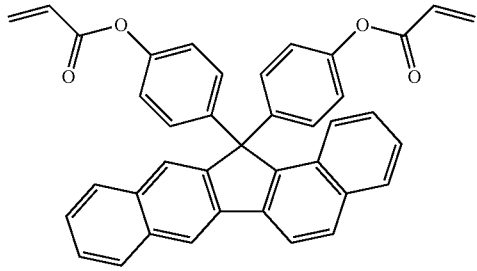
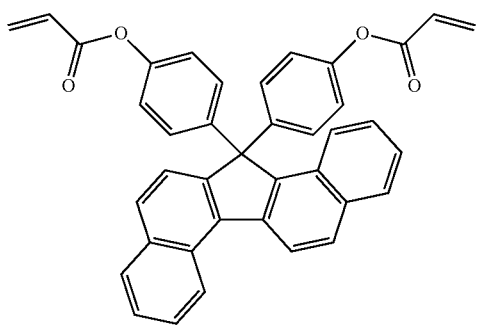
[Chem. 16]
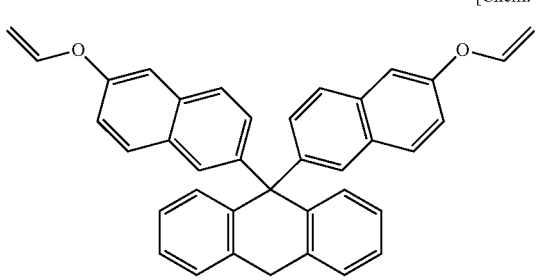

-continued
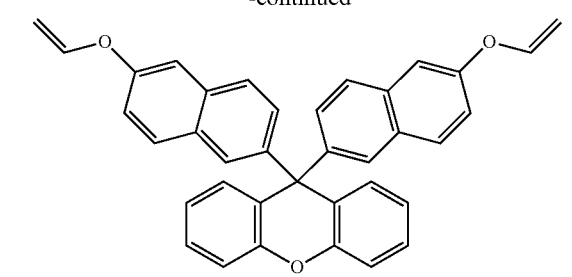
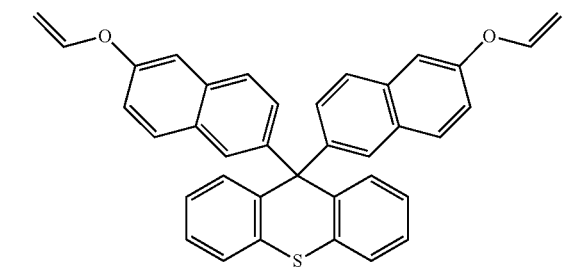
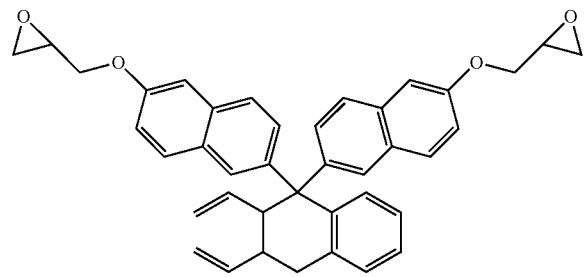
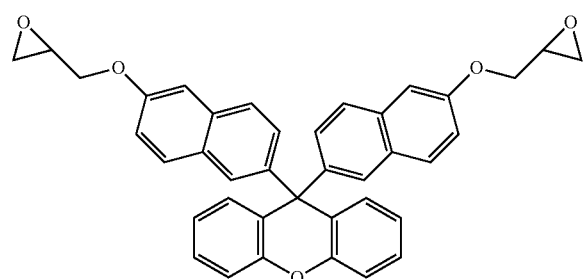
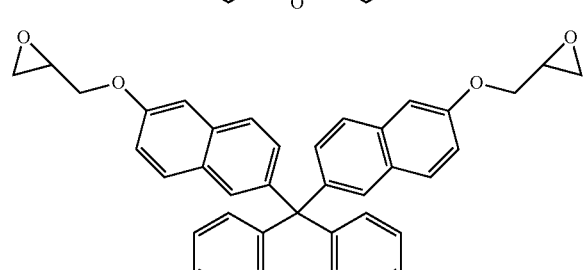
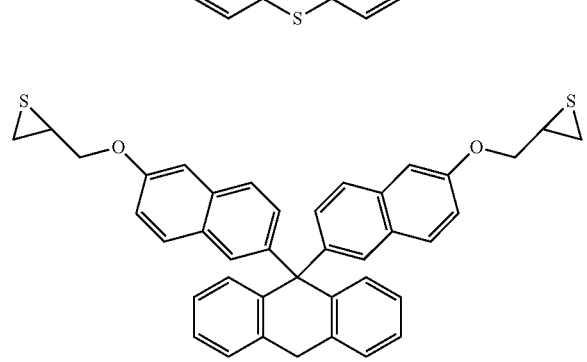
-continued
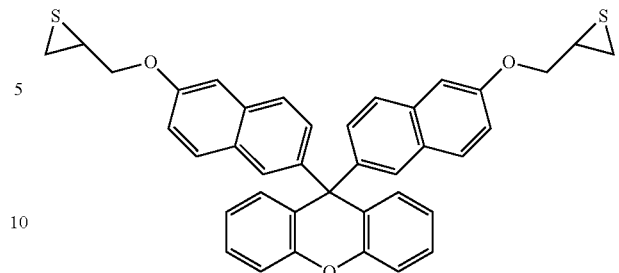
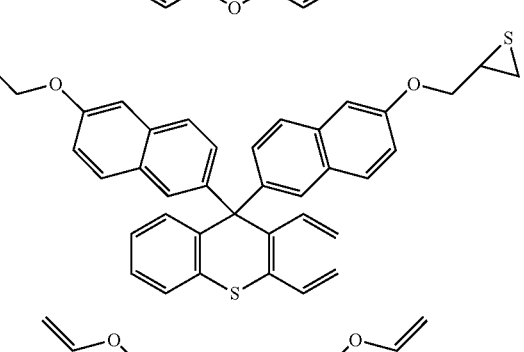
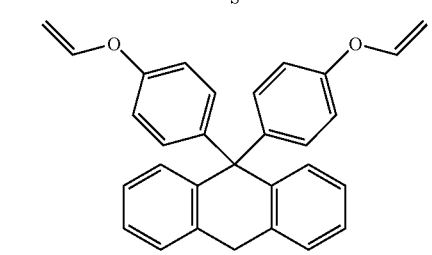
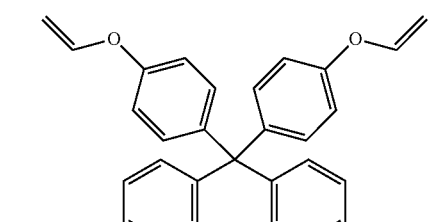
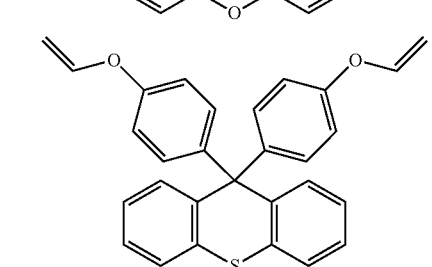
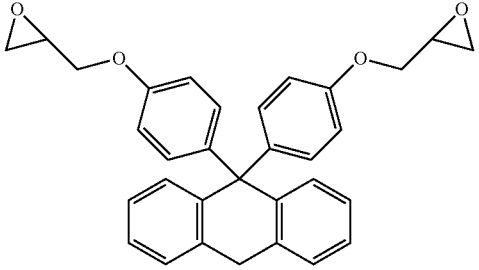

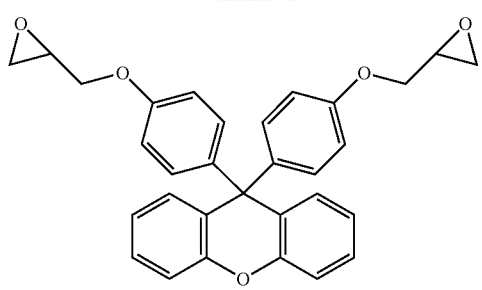
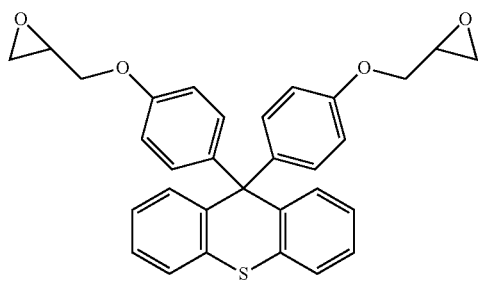
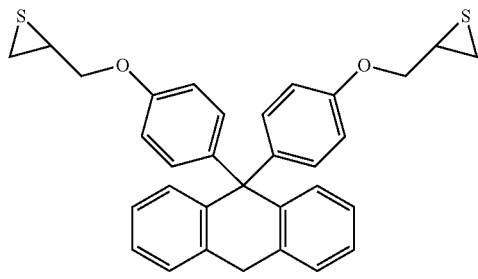
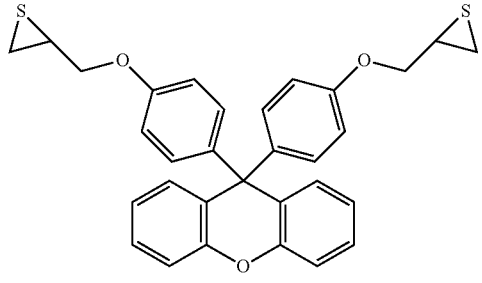
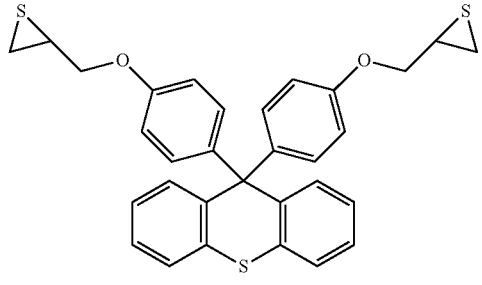
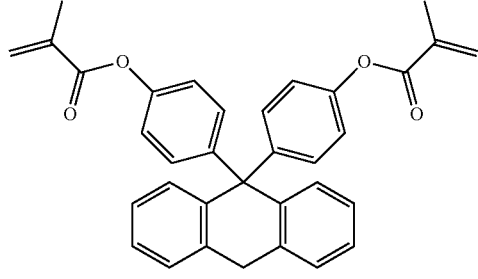
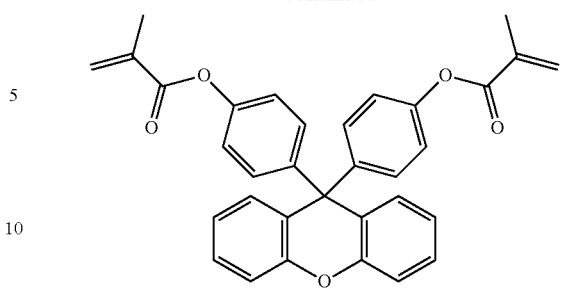
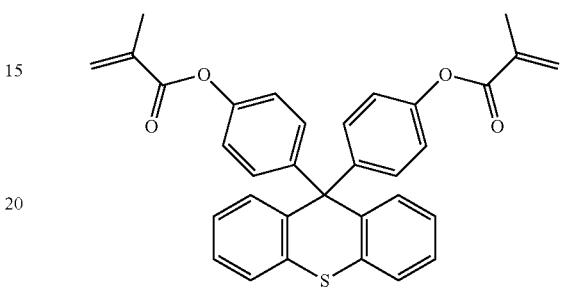
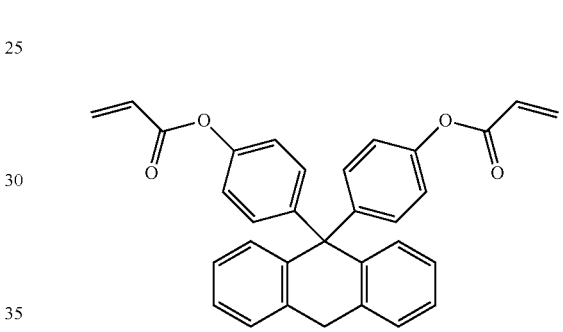
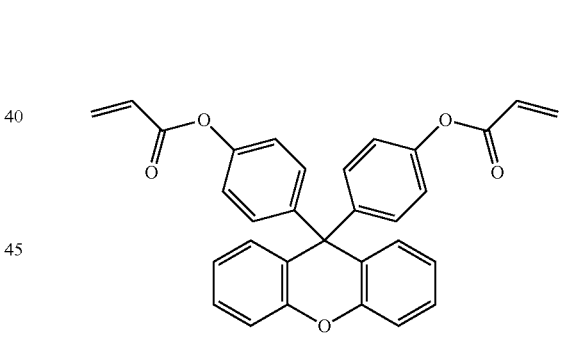
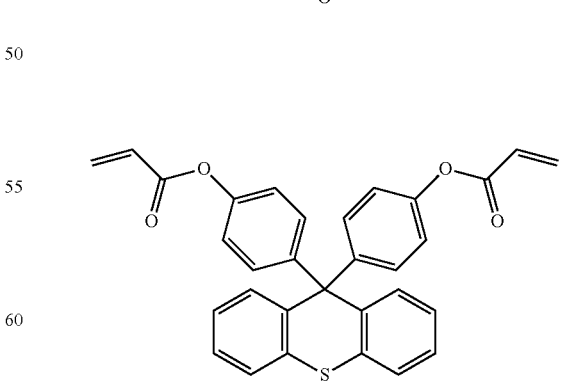
Of the compounds represented by the formula (a1) described above, the following compounds are particularly preferable.

[Chem. 17]

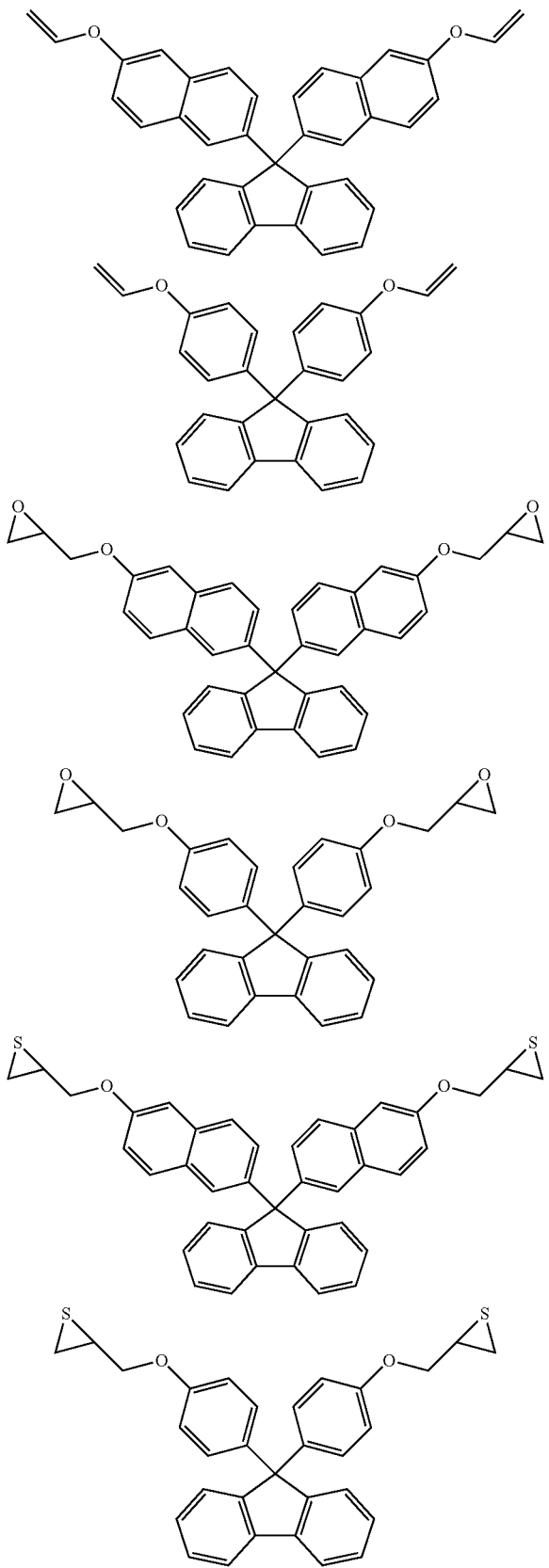

The curable compound (A) may contain a cationic polymerizable compound other than the compound represented by the formula (a1). The amount of the compound represented by the formula (a1) in the curable compound (A) is preferably 50% by mass or more, more preferably 70% by mass or more, still more preferably 80% by mass or more, particularly preferably 90% by mass or more, and most preferably 100% by mass.

The curable compound (A) may contain a cationic polymerizable compound other than the compound represented by the formula (a1), and examples thereof include a vinyl ether compound having a vinyloxy group, an epoxy compound having an epoxy group, an episulfide compound having an episulfide group, and a radical polymerizable compound having a radical polymerizable unsaturated double bond. For the purpose of adjusting the refractive index of the cured product, it is possible to use in combination with a compound in which both $W^1$ and $W^2$ of the compound represented by the formula (a1) have a hydrogen atom as $R^3$. The ring Z, X, $R^1$, $R^2$, and m in the formula (a2) of the compound are the same as in the compound represented by the formula (a1). Description will be made of a vinyl ether compound, an epoxy compound, an episulfide compound, and a radical polymerizable compound.

(Vinyl Ether Compound)

The vinyl ether compound to be used together with the compound represented by the formula (a1) is not particularly limited as long as it has a vinyloxy group and is a cationic polymerizable compound. The vinyl ether compound to be used in combination with the compound represented by the formula (a1) may have an aromatic group or not. In view of the transparency of the cured product, the vinyl ether compound to be used in combination with the compound represented by the formula (a1) is preferably an aliphatic vinyl ether compound having no aromatic group. In view of satisfactory pyrolysis resistance of the cured product, the vinyl ether compound to be used in combination with the compound represented by the formula (a1) is preferably a compound having a vinyloxy group to be bonded to an aromatic group.

Suitable specific examples of the vinyl ether compound usable together with the compound represented by the formula (a1) include aliphatic vinyl ether compounds such as ethyl vinyl ether, isobutyl vinyl ether, hydroxybutyl vinyl ether, butanediol divinyl ether, cyclohexylvinyl ether, N-butyl vinyl ether, tert-butyl vinyl ether, triethylene glycol divinyl ether octadecyl vinyl ether, cyclohexane dimethanol divinyl ether, diethylene glycol divinyl ether, and cyclohexane dimethanol monovinyl ether vinyl phenyl ether; aromatic monovinyl ether compounds such as 4-vinyloxytoluene, 3-vinyloxytoluene, 2-vinyloxytoluene, 1-vinyloxy-4-chlorobenzene, 1-vinyloxy-3-chlorobenzene, 1-vinyloxy-2-chlorobenzene, 1-vinyloxy-2,3-dimethylbenzene, 1-vinyloxy-2,4-dimethylbenzene, 1-vinyloxy-2,5-dimethylbenzene, 1-vinyloxy-2,6-dimethylbenzene, 1-vinyloxy-3,4-dimethylbenzene, 1-vinyloxy-3,5-dimethylbenzene, 1-vinyloxynaphthalene, 2-vinyloxynaphthalene, 2-vinyloxyfluorene, 3-vinyloxyfluorene, 4-vinyloxy-1,1'-biphenyl, 3-vinyloxy-1,1'-biphenyl, 2-vinyloxy-1,1'-biphenyl, 6-vinyloxytetralin, and 5-vinyloxytetralin; and aromatic divinyl ether compounds such as 1,4-divinyloxybenzene, 1,3-divinyloxybenzene, 1,2-divinyloxybenzene, 1,4-divinyloxynaphthalene, 1,3-divinyloxynaphthalene, 1,2-divinyloxynaphthalene, 1,5-divinyloxynaphthalene, 1,6-divinyloxynaphthalene, 1,7-divinyloxynaphthalene, 1,8-divinyloxynaphthalene, 2,3-divinyloxynaphthalene, 2,6-divinyloxynaphthalene, 2,7-divinyloxynaphthalene, 1,2- divinyloxyfluorene, 3,4-divinyloxyfluorene, 2,7-divinyloxyfluorene, 4,4'-divinyloxybiphenyl, 3,3'-divinyloxybiphenyl, 2,2'-divinyloxybiphenyl, 3,4'-divinyloxybiphenyl, 2,3'-divinyloxybiphenyl, 2,4'-divinyloxybiphenyl, and bisphenol A divinyl ether. These vinyl ether compounds can be used in combination of two or more types thereof.

(Epoxy Compound)

Examples of the epoxy compound usable together with the compound represented by the formula (a1) include difunctional epoxy resins such as a bisphenol A type epoxy resin, a bisphenol F type epoxy resin, a bisphenol S type epoxy resin, a bisphenol AD type epoxy resin, a naphthalene type epoxy resin, and a biphenyl type epoxy resin; novolak epoxy resins such as a phenol novolak type epoxy resin, a brominated phenol novolak type epoxy resin, an ortho-cresol novolak type epoxy resin, a bisphenol A novolak type epoxy resin, and a bisphenol AD novolak type epoxy resin; cyclic aliphatic epoxy resins such as an epoxidized product of a dicyclopentadiene type phenol resin; aromatic epoxy resins such as an epoxidized product of a naphthalene type phenol resin; glycidyl ester type epoxy resins such as a dimer acid glycidyl ester and triglycidyl ester; glycidylamine type epoxy resins such as tetraglycidylaminodiphenylmethane, triglycidyl-p-aminophenol, tetraglycidylmetaxylenediamine, and tetraglycidyl bisaminomethylcyclohexane; heterocyclic epoxy resins such as triglycidyl isocyanurate; trifunctional epoxy resins such as phloroglucinol triglycidyl ether, trihydroxybiphenyl triglycidyl ether, trihydroxyphenylmethane triglycidyl ether, glycerin triglycidyl ether, 2-[4-(2,3-epoxypropoxy)phenyl]-2-[4-[1,1-bis[4-(2,3-epoxypropoxy)phenyl]ethyl]phenyl] propane, and 1,3-bis[4-[1-[4-(2,3-epoxypropoxy)phenyl]-1-[4-[1-[4-(2,3-epoxypropoxy)phenyl]-1-methylethyl]phenyl] ethyl]phenoxy]-2-propanol; tetrafunctional epoxy resins such as tetrahydroxyphenylethane tetraglycidyl ether, tetraglycidylbenzophenone, bisresorcinol tetraglycidyl ether, and tetraglycidoxybiphenyl; and a 1,2-epoxy-4-(2-oxyranyl)cyclohexane adduct of 2,2-bis(hydroxymethyl)-1-butanol. The 1,2-epoxy-4-(2-oxiranyl)cyclohexene adduct of 2,2-bis(hydroxymethyl)-1 butanol is commercially available as EHPE-3150 (manufactured by Daicel Corporation).

The oligomer or polymer type polyfunctional epoxy compound may also be used as the curable compound (A). Typical examples thereof include a phenol novolak type epoxy compound, a brominated phenol novolak type epoxy compound, an ortho-cresol novolak type epoxy compound, a xylenol novolak type epoxy compound, a naphthol novolak type epoxy compound, a bisphenol A novolak type epoxy compound, a bisphenol AD novolak type epoxy compound, an epoxidized product of a dicyclopentadiene type phenol resin, an epoxidized product of a naphthalene type phenol resin, and the like.

Other examples of the epoxy compound usable in combination with the compound represented by the formula (a1) include a polyfunctional alicyclic epoxy compound having an alicyclic epoxy group. When the curable compound (A) contains an alicyclic epoxy compound, it is easy to form a cured product having excellent transparency using a curable composition.

Specific examples of such alicyclic epoxy compound include 2-(3,4-epoxycyclohexyl-5,5-spiro-3,4-epoxy)cyclohexane-meta-dioxane, bis(3,4-epoxycyclohexylmethyl)adipate, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexanecarboxylate, trimethylcaprolactone-modified 3,4-epoxycyclohexylmethyl-3',4'-epoxycyclohexanecarboxylate, β-methyl-δ-valerolactone-modified 3,4-epoxycyclohexylmethyl-3',4'-epoxycyclohexane carboxylate, methylenebis(3,4-epoxycyclohexane), di(3,4-epoxycyclohexylmethyl)ether of ethylene glycol, ethylenebis(3,4-epoxycyclohexane carboxylate), and a polyfunctional epoxy compound having a tricyclodecene oxide group and compounds represented by the following formulas (a1-1) to (a1-5). These alicyclic epoxy compounds can be used alone or in combination of two or more types thereof.

[Chem. 18]

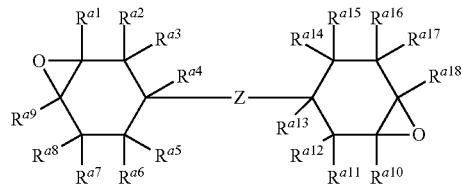

(a1-1)

In the formula (a1-1), Z represents a single bond or a linking group (divalent group having one or more atoms. $R^{a1}$ to $R^{a18}$ each independently represent a group selected from the group consisting of a hydrogen atom, a halogen atom, and an organic group.

Examples of the linking group Z include a divalent hydrocarbon group, a divalent group selected from the group consisting of —O—, —O—CO—, —S—, —SO—, —SO$_2$—, —CBr$_2$—, —C(CBr$_3$)$_2$—, —C(CF$_3$)$_2$—, and —$R^{a19}$—O—CO—, and a group in which plural these groups are bonded.

Examples of the divalent hydrocarbon group as the linking group Z include a linear or branched alkylene group having 1 or more and 18 or less carbon atoms, a divalent alicyclic hydrocarbon group, and the like. Examples of the linear or branched alkylene group having 1 or more and 18 or less carbon atoms include a methylene group, a methylmethylene group, a dimethylmethylene group, a dimethylene group, a trimethylene group, and the like. Examples of the divalent alicyclic hydrocarbon group include cycloalkylene groups (including a cycloalkylidene group) such as a 1,2-cyclopentylene group, a 1,3-cyclopentylene group, a cyclopentylidene group, a 1,2-cyclohexylene group, a 1,3-cyclohexylene group, a 1,4-cyclohexylene group, a cyclohexylidene group, and the like.

$R^{a19}$ is an alkylene group having 1 or more and 8 or less carbon atoms, and preferably a methylene group or an ethylene group.

[Chem. 19]

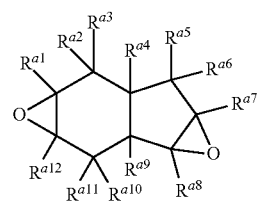

(a1-2)

In the formula (a1-2), $R^{a1}$ to $R^{a12}$ are groups selected from the group consisting of a hydrogen atom, a halogen atom, and an organic group.

[Chem. 20]

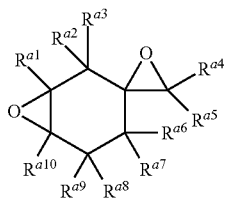

(a1-3)

In the formula (a1-3), $R^{a1}$ to $R^{a10}$ are groups selected from the group consisting of a hydrogen atom, a halogen atom, and an organic group. $R^{a2}$ and $R^{a8}$ may be combined with each other.

[Chem. 21]

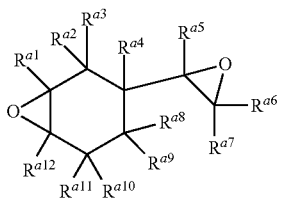

(a1-4)

In the formula (a1-4), $R^{a1}$ to $R^{a12}$ are groups selected from the group consisting of a hydrogen atom, a halogen atom, and an organic group. $R^{a2}$ and $R^{a10}$ may be combined with each other.

[Chem. 22]

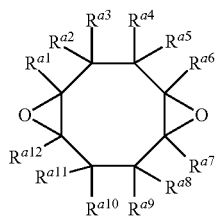

(a1-5)

In the formula (a1-5), $R^{a1}$ to $R^{a12}$ are groups selected from the group consisting of a hydrogen atom, a halogen atom, and an organic group.

In the formulas (a1-1) to (a1-5), when $R^{a1}$ to $R^{a18}$ are organic groups, the organic group is not particularly limited as long as the object of the present invention is not impaired, and may be a hydrocarbon group, a group composed of a carbon atom and a halogen atom, or a group containing heteroatoms such as a halogen atom, an oxygen atom, a sulfur atom, a nitrogen atom, and a silicon atom, together with a carbon atom and a hydrogen atom. Examples of the halogen atom include a chlorine atom, a bromine atom, an iodine atom, and a fluorine atom.

The organic group is preferably a group composed of a hydrocarbon group and a carbon atom, a hydrogen atom, and an oxygen atom, a group composed of a halogenated hydrocarbon group and a carbon atom, an oxygen atom, and a halogen atom, and a group composed of a carbon atom, a hydrogen atom, an oxygen atom, and a halogen atom. When the organic group is a hydrocarbon group, the hydrocarbon group may be an aromatic hydrocarbon group, or an aliphatic hydrocarbon group, or a group including an aromatic skeleton and an aliphatic skeleton. The number of carbon atoms of the organic group is preferably 1 or more and 20 or less, more preferably 1 or more and 10 or less, and particularly preferably 1 or more and 5 or less.

Specific examples of the hydrocarbon group include chain alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, an n-decyl group, an n-undecyl group, an n-tridecyl group, an n-tetradecyl group, an n-pentadecyl group, an n-hexadecyl group, an n-heptadecyl group, an n-octadecyl group, an n-nonadecyl group, and an n-icosyl group; chain alkenyl groups such as a vinyl group, a 1-propenyl group, a 2-n-propenyl group (allyl group), a 1-n-butenyl group, a 2-n-butenyl group, and a 3-n-butenyl group; cycloalkyl groups such as a cyclopropyl group, a cyclobutyl group, a cyclopentyl group, a cyclohexyl group, and a cycloheptyl group; aryl groups such as a phenyl group, an o-tolyl group, a m-tolyl group, a p-tolyl group, an α-naphthyl group, a β-naphthyl group, a biphenyl-4-yl group, a biphenyl-3-yl group, a biphenyl-2-yl group, an anthryl group, and a phenanthryl group; and aralkyl groups such as a benzyl group, a phenethyl group, an α-naphthylmethyl group, a β-naphthylmethyl group, an α-naphthylethyl group, and a β-naphthylethyl group.

Specific examples of the halogenated hydrocarbon group include halogenated chain alkyl groups such as a chloromethyl group, a dichloromethyl group, a trichloromethyl group, a bromomethyl group, a dibromomethyl group, a tribromomethyl group, a fluoromethyl group, a difluoromethyl group, a trifluoromethyl group, a 2,2,2-trifluoroethyl group, a pentafluoroethyl group, a heptafluoropropyl group, a perfluorobutyl group, a perfluoropentyl group, a perfluorohexyl group, a perfluoroheptyl group, a perfluorooctyl group, a perfluorononyl group, and a perfluorodecyl group; halogenated cycloalkyl groups such as a 2-chlorocyclohexyl group, a 3-chlorocyclohexyl group, a 4-chlorocyclohexyl group, a 2,4-dichlorocyclohexyl group, a 2-bromocyclohexyl group, a 3-bromocyclohexyl group, and a 4-bromocyclohexyl group; halogenated aryl groups such as a 2-chlorophenyl group, a 3-chlorophenyl group, a 4-chlorophenyl group, a 2,3-dichlorophenyl group, a 2,4-dichlorophenyl group, a 2,5-dichlorophenyl group, a 2,6-dichlorophenyl group, a 3,4-dichlorophenyl group, a 3,5-dichlorophenyl group, a 2-bromophenyl group, a 3-bromophenyl group, a 4-bromophenyl group, a 2-fluorophenyl group, a 3-fluorophenyl group, and a 4-fluorophenyl group; and halogenated aralkyl groups such as a 2-chlorophenylmethyl group, a 3-chlorophenylmethyl group, a 4-chlorophenylmethyl group, a 2-bromophenylmethyl group, a 3-bromophenylmethyl group, a 4-bromophenylmethyl group, a 2-fluorophenylmethyl group, a 3-fluorophenylmethyl group, and a 4-fluorophenylmethyl group.

Specific examples of the group composed of a carbon atom, a hydrogen atom, and an oxygen atom include hydroxy chain alkyl groups such as a hydroxymethyl group, a 2-hydroxyethyl group, a 3-hydroxy-n-propyl group, and a 4-hydroxy-n-butyl group; halogenated cycloalkyl groups such as a 2-hydroxycyclohexyl group, a 3-hydroxycyclohexyl group, and a 4-hydroxycyclohexyl group; hydroxyaryl groups such as a 2-hydroxyphenyl group, a 3-hydroxyphenyl group, a 4-hydroxyphenyl group, a 2,3-dihydroxyphenyl group, a 2,4-dihydroxyphenyl group, a 2,5-dihydroxyphenyl group, a 2,6-dihydroxyphenyl group, a 3,4-dihydroxyphenyl group, and a 3,5-dihydroxyphenyl group; hydroxyaralkyl groups such as a 2-hydroxyphenylmethyl group, a 3-hydroxyphenylmethyl group, and a 4-hydroxyphenylmethyl group; chain alkoxy groups such as a methoxy group, an ethoxy group, an n-propoxy group, an isopropoxy group, an n-butyloxy group, an isobutyloxy group, a sec-butyloxy group, a tert-butyloxy group, an n-pentyloxy group, an n-hexyloxy group, an n-heptyloxy group, an n-octyloxy group, a 2-ethylhexyloxy group, an n-nonyloxy group, an n-decyloxy group, an n-undecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group, and an n-icosyloxy group; chain alkenyloxy groups such as a vinyloxy group, a 1-propenyloxy group, a 2-n-propenyloxy group (allyloxy group), a 1-n-butenyloxy group, a 2-n-butenyloxy group, and a 3-n-butenyloxy group; aryloxy groups such as a phenoxy group, an o-tolyloxy group, a m-tolyloxy group, a p-tolyloxy group, an α-naphthyloxy group, a β-naphthyloxy group, a biphenyl-4-yloxy group, a biphenyl-3-yloxy group, a biphenyl-2-yloxy group, an anthryloxy group, and a phenanthryloxy group; aralkyloxy groups such as a benzyloxy group, a phenethyloxy group, an α-naphthylmethyloxy group, a β-naphthylmethyloxy group, an α-naphthylethyloxy group, and a β-naphthylethyloxy group; alkoxyalkyl groups such as a methoxymethyl group, an ethoxymethyl group, an n-propoxymethyl group, a 2-methoxyethyl group, a 2-ethoxyethyl group, a 2-n-propoxyethyl group, a 3-methoxy-n-propyl group, a 3-ethoxy-n-propyl group, a 3-n-propoxy-n-propyl group, a 4-methoxy-n-butyl group, a 4-ethoxy-n-butyl group, and a 4-n-propoxy-n-butyl group; alkoxyalkoxy groups such as a methoxymethoxy group, an ethoxymethoxy group, an n-propoxymethoxy group, a 2-methoxyethoxy group, a 2-ethoxyethoxy group, a 2-n-propoxyethoxy group, a 3-methoxy-n-propoxy group, a 3-ethoxy-n-propoxy group, a 3-n-propoxy-n-propoxy group, a 4-methoxy-n-butyloxy group, a 4-ethoxy-n-butyloxy group, and a 4-n-propoxy-n-butyloxy group; alkoxyaryl groups such as a 2-methoxyphenyl group, a 3-methoxyphenyl group, and a 4-methoxyphenyl group; alkoxyaryloxy groups such as a 2-methoxyphenoxy group, a 3-methoxyphenoxy group, and a 4-methoxyphenoxy group; aliphatic acyl groups such as a formyl group, an acetyl group, a propionyl group, a butanoyl group, a pentanoyl group, a hexanoyl group, a heptanoyl group, an octanoyl group, a nonanoyl group, and a decanoyl group; aromatic acyl groups such as a benzoyl group, an α-naphthoyl group, and a β-naphthoyl group; chain alkyloxycarbonyl groups such as a methoxycarbonyl group, an ethoxycarbonyl group, an n-propoxycarbonyl group, an n-butyloxycarbonyl group, an n-pentyloxycarbonyl group, an n-hexylcarbonyl group, an n-heptyloxycarbonyl group, an n-octyloxycarbonyl group, an n-nonyloxycarbonyl group, and an n-decyloxycarbonyl group; aryloxycarbonyl groups such as a phenoxycarbonyl group, an α-naphthoxycarbonyl group, and a β-naphthoxycarbonyl group; aliphatic acyloxy groups such as a formyloxy group, an acetyloxy group, a propionyloxy group, a butanoyloxy group, a pentanoyloxy group, a hexanoyloxy group, a heptanoyloxy group, an octanoyloxy group, a nonanoyloxy group, and a decanoy-loxy group; and aromatic acyloxy groups such as a benzoyloxy group, an α-naphthoyl oxy group, and a β-naphthoyl oxy group.

$R^{a1}$ to $R^{a18}$ each independently is preferably a group selected from the group consisting of a hydrogen atom, a halogen atom, an alkyl group having 1 or more and 5 or less carbon atoms, and an alkoxy group having 1 or more and 5 or less carbon atoms. All $R^{a1}$ to $R^{a18}$ are more preferably hydrogen atoms since it is easy to form a cured film having particularly excellent mechanical properties.

In the formulas (a1-2) to (a1-5), $R^{a1}$ to $R^{a12}$ are the same as $R^{a1}$ to $R^{a12}$ in the formula (a1-1). In the formulas (a1-2) and formula (a1-4), when $R^{a2}$ and $R^{a10}$ are combined with each other, a divalent group thus formed includes, for example, —$CH_2$— and —$C(CH_3)_2$—. In the formula (a1-3), when $R^{a2}$ and $R^{a8}$ are combined with each other, a divalent group thus formed includes, for example, —$CH_2$— and —$C(CH_3)_2$—.

Of the alicyclic epoxy compounds represented by the formula (a1-1), specific examples of suitable compound include alicyclic epoxy compounds represented by the following formula (a1-1a), formula (a1-1b), and formula (a1-1c), 2,2-bis(3,4-epoxycyclohexan-1-yl)propane[=2,2-bis(3,4-epoxycyclohexyl)propane], and the like.

[Chem. 23]

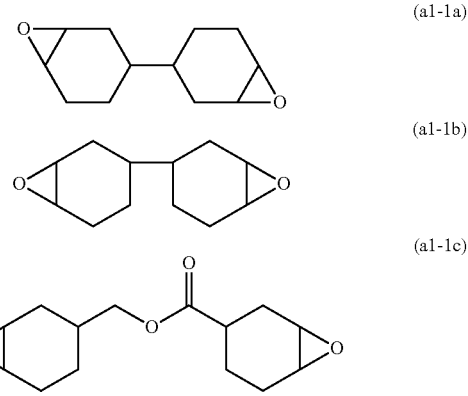

Of the alicyclic epoxy compounds represented by the formula (a1-2), specific examples of suitable compound include bicyclononadiene diepoxide represented by the following formula (a1-2a), or dicyclononadiene diepoxide.

[Chem. 24]

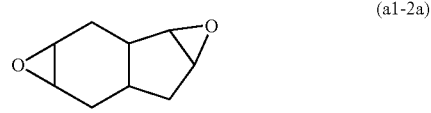

Among the alicyclic epoxy compounds represented by the formula (a1-3), specific examples of suitable compound include S spiro[3-oxatricyclo[3.2.1.0$^{2,4}$]octane-6,2'-oxirane], and the like.

Among the alicyclic epoxy compounds represented by the formula (a1-4), specific examples of suitable compound include 4-vinylcyclohexene dioxide, dipentene dioxide, limonene dioxide, 1-methyl-4-(3-methyloxiran-2-yl)-7-oxabicyclo[4.1.0]heptane, and the like.

Among the alicyclic epoxy compounds represented by the formula (a1-5), specific examples of suitable compound include 1,2,5,6-diepoxycyclooctane, and the like.

It is also possible to suitably use, as curable compound (A), a compound represented by the following formula (a1-I).

[Chem. 25]

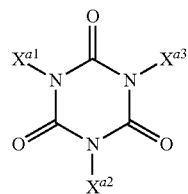

(a1-I)

In the formula (a1-I), $X^{a1}$, $X^{a2}$, and $X^{a3}$ each independently represent a hydrogen atom, or an organic group optionally having an epoxy group, and the total number of epoxy groups possessed by $X^{a1}$, $X^{a2}$, and $X^{a3}$ is 2 or more.

The compound represented by the formula (a1-I) is preferably a compound represented by the following formula (a1-II).

[Chem. 26]

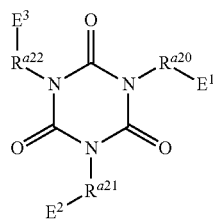

(a1-II)

In the formula (a1-II), $R^{a20}$ to $R^{a22}$ represent a linear, branched, or cyclic alkylene group, an arylene group, —O—, —C(=O)—, —NH—, and a combination thereof, and each may be the same or different. $E^1$ to $E^3$ represent at least one substituent or hydrogen atom selected from the group consisting of an epoxy group, an oxetanyl group, an ethylenically unsaturated group, an alkoxysilyl group, an isocyanate group, a blocked isocyanate group, a thiol group, a carboxy group, a hydroxyl group, and a succinic anhydride group. Provided that, at least two of $E^1$ to $E^3$ represent at least one selected from the group consisting of an epoxy group and an oxetanyl group.

In the formula (a1-II), each of at least two of a group represented by $R^{a20}$ and $E^1$, $R^{a21}$ and $E^2$, and $R^{a22}$ and $E^3$ is preferably groups represented by the following formula (a1-IIa), and all the groups are more preferably groups represented by the following formula (a1-IIa). A group represented by plural formulas (a1-IIa) bonded to one compound is preferably the same group.

-L-$C^{\alpha}$ (a1-IIa)

In the formula (a1-IIa), L is a linear, branched, or cyclic alkylene group, an arylene group, —O—, —C(=O)—, —NH—, and a combination thereof, and $C^{\alpha}$ is an epoxy group. In the formula (a1-IIa), L and $C^{\alpha}$ may be combined to form a cyclic structure.

In the formula (a1-IIa), the linear, branched, or cyclic alkylene group as L is preferably an alkylene group having 1 or more and 10 or less carbon atoms, and the arylene group as L is preferably an arylene group having 5 or more and 10 or less carbon atoms. In the formula (a1-IIa), L is preferably a linear alkylene group having 1 or more and 3 or less carbon atoms, a phenylene group, —O—, —C(=O)—, —NH—, and a combination thereof, and preferably at least one of a linear alkylene group having 1 or more and 3 or less carbon atoms such as a methylene group, and a phenylene group, or a group composed of a combination of these groups and at least one of —O—, —C(=O)— and NH—.

In the formula (a1-IIa), when L and $C^{\alpha}$ are combined with each other to form a cyclic structure, for example, when a branched alkylene group and an epoxy group are combined with each other to form a cyclic structure (structure having an alicyclic structure epoxy group), an organic group represented by the following formula (a1-IIb) or (a1-IIc) is exemplified.

[Chem. 27]

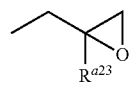

(a1-IIb)

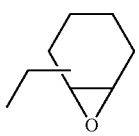

(a1-IIc)

In the formula (a1-IIb), $R^{a23}$ is a hydrogen atom or a methyl group.

Examples of the compound represented by the formula (a1-II) include, but are not limited to, examples of an epoxy compound having an oxyranyl group or an alicyclic epoxy group.

[Chem. 28]

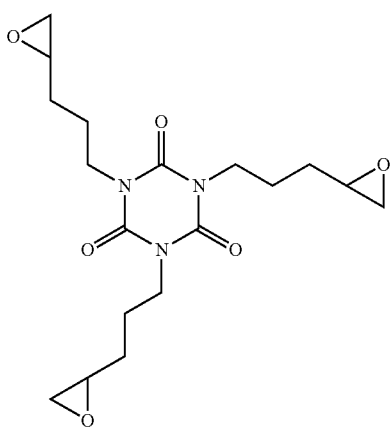

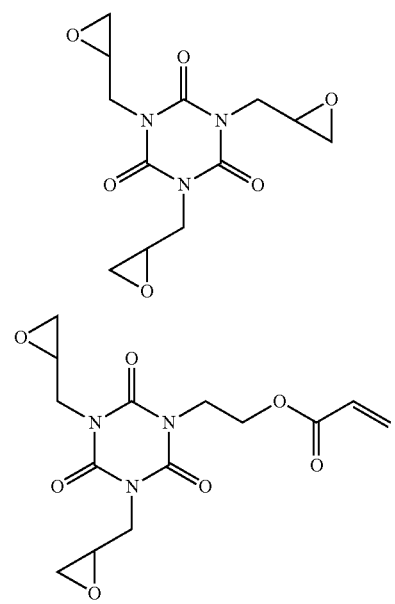
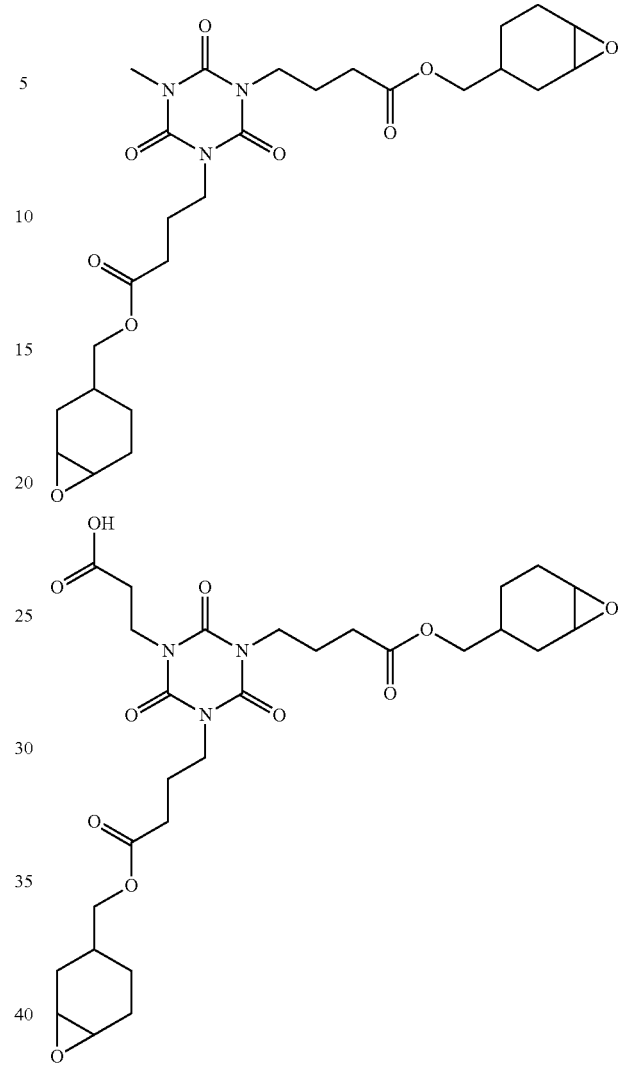
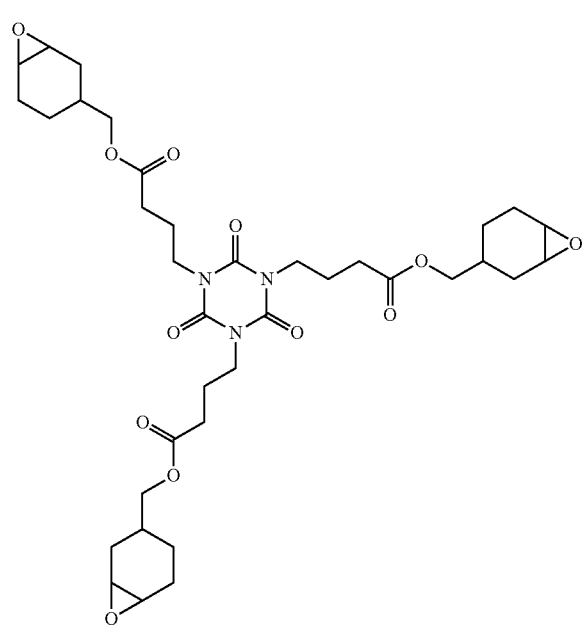

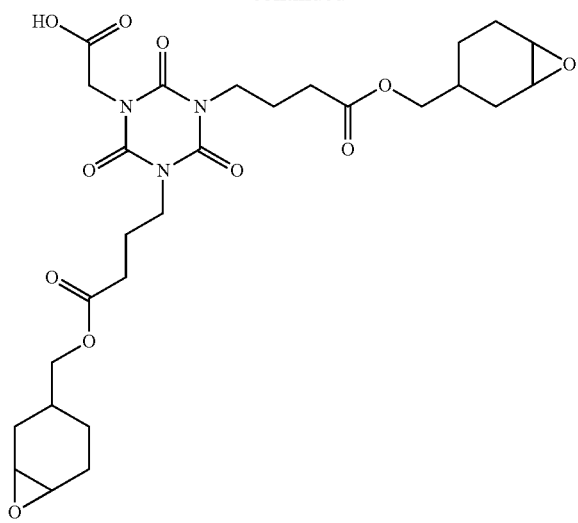

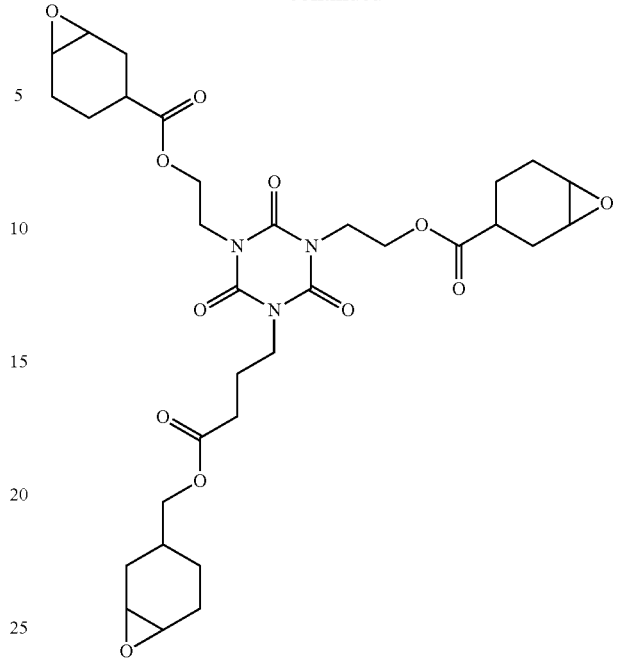

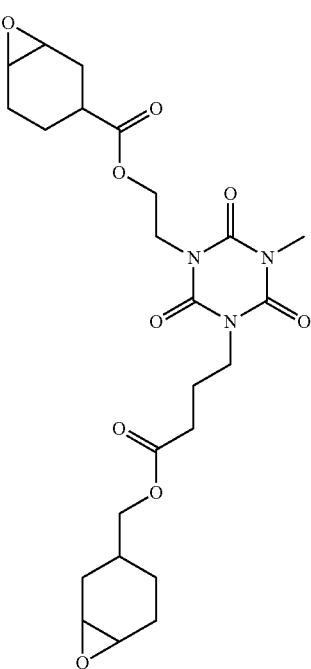

Examples of the compound usable suitably as an epoxy compound, which can be used in combination with the compound represented by the formula (a1-I), include a siloxane compound having two or more glycidyl groups in the molecule (hereinafter simply referred to as "siloxane compound").

The siloxane compound is a compound including a siloxane skeleton composed of a siloxane bond (Si—O—Si) and two or more glycidyl groups in the molecule. Examples of the siloxane skeleton in the siloxane compound include a cyclic siloxane skeleton, and a cage or ladder type polysilsesquioxane skeleton.

The siloxane compound is preferably a compound including a cyclic siloxane skeleton represented by the following formula (a1-III) (hereinafter sometimes referred to as "cyclic siloxane").

[Chem. 29]

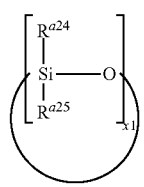

(a1-III)

In the formula (a1-III), $R^{a24}$ and $R^{a25}$ represent a monovalent group having a glycidyl group, or an alkyl group. Provided that, at least two of x1 $R^{a24}$ and x1 $R^{a25}$ in the compound represented by the formula (a1-III) is a monovalent group having a glycidyl group.

x1 in the formula (a1-III) represents an integer of 3 or more. $R^{a24}$ and $R^{a25}$ in the compound represented by the formula (a1-III) may be the same or different. Plural $R^{a24}$(s) may be the same or different. Plural $R^{a25}$(s) may also be the same or different.

The monovalent group having a glycidyl group is preferably a glycidyl ether group represented by -D-O—$R^{a26}$ [D represents an alkylene group and $R^{a26}$ represents a glycidyl group]. Examples of D (alkylene group) include linear or branched alkylene groups having 1 or more and 18 or less carbon atoms such as a methylene group, a methylmethylene group, a dimethylmethylene group, a dimethylene group, and a trimethylene group.

Examples of the alkyl group include linear or branched alkyl groups having 1 or more and 18 or less carbon atoms (preferably 1 or more and 6 or less carbon atoms, and particularly preferably 1 or more and 3 or less carbon atoms) such as a methyl group, an ethyl group, a propyl group, and an isopropyl group.

x1 in the formula (a1-III) represents an integer of 3 or more, and preferably an integer of 3 or more and 6 or less in view of excellent crosslinking reactivity in the case of forming a cured film.

The number of glycidyl groups in the molecule possessed by the siloxane compound is 2 or more, preferably 2 or more and 6 or less in view of excellent crosslinking reactivity in the case of forming a cured film, and particularly preferably 2 or more and 4 or less.

The curable composition may contain, in addition to the siloxane compound represented by the formula (a1-III), compounds including a siloxane skeleton, such as an alicyclic epoxy group-containing cyclic siloxane, an alicyclic epoxy group-containing silicone resin mentioned in Japanese Unexamined Patent Application, Publication No. 2008-248169, and an organopolysilsesquioxane resin having at least two epoxy functional groups in a molecule mentioned in Japanese Unexamined Patent Application, Publication No. 2008-19422.

More specific examples of the siloxane compound include cyclic siloxane having two or more glycidyl groups in the molecule represented by the following formula. It is possible to use, as the siloxane compound, commercially available products, for example, trade name "X-40-2670", "X-40-2701", "X-40-2728", "X-40-2738", and "X-40-2740" (which are manufactured by Shin-Etsu Chemical Co., Ltd.).

[Chem. 30]

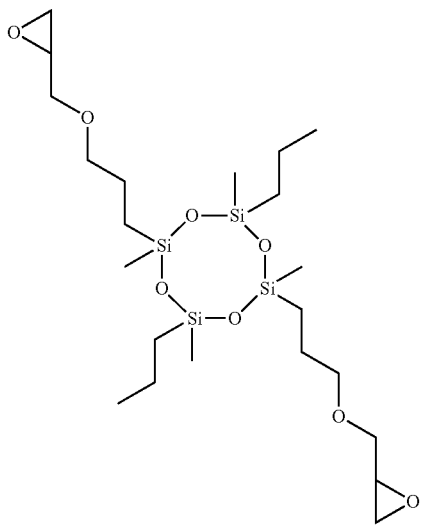

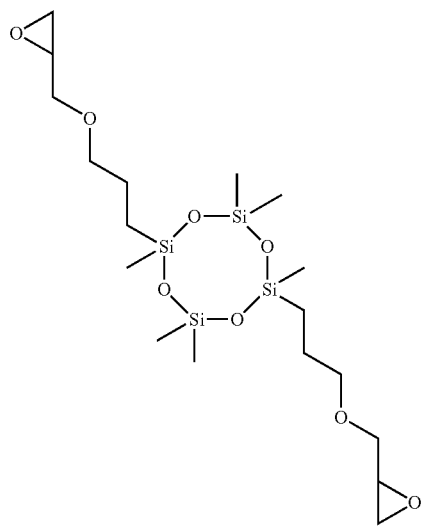

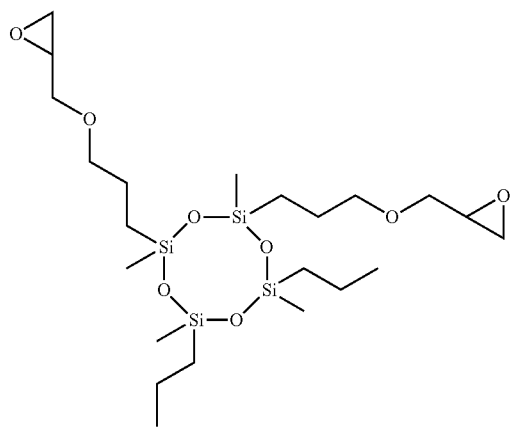

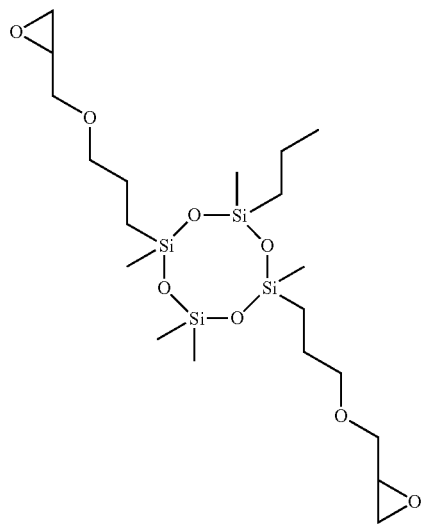

49
-continued
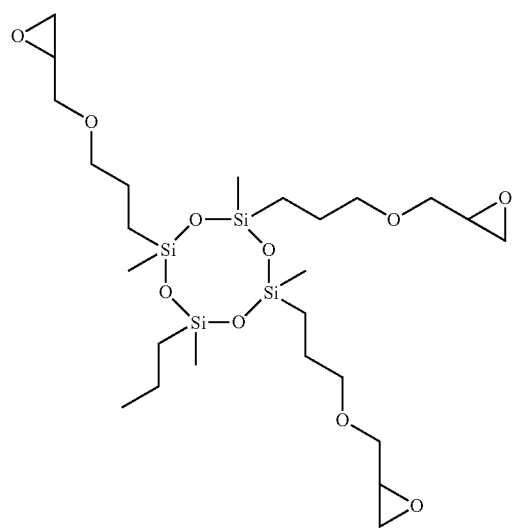
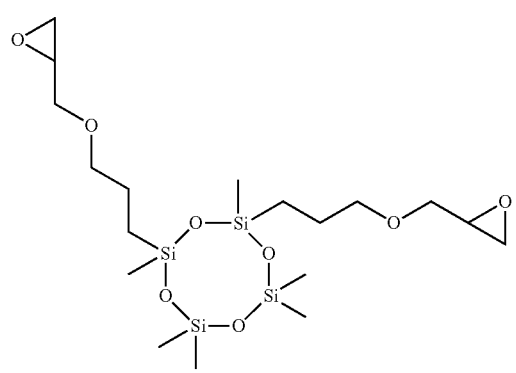
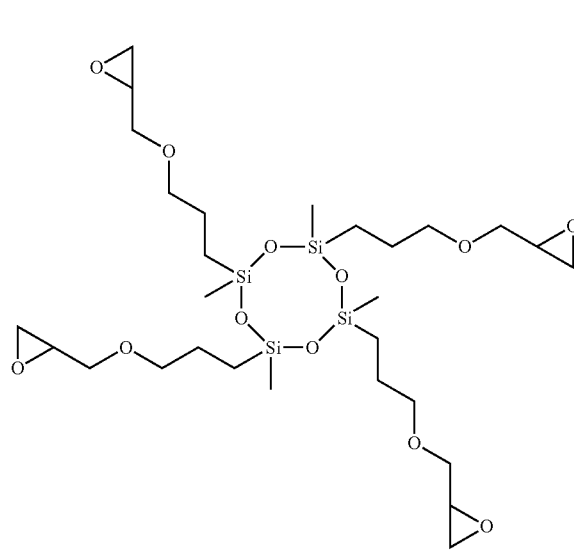
50
-continued
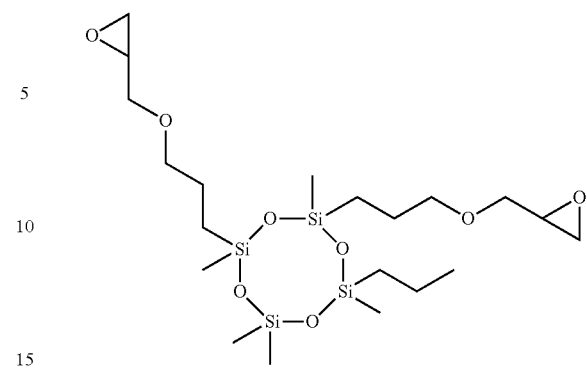
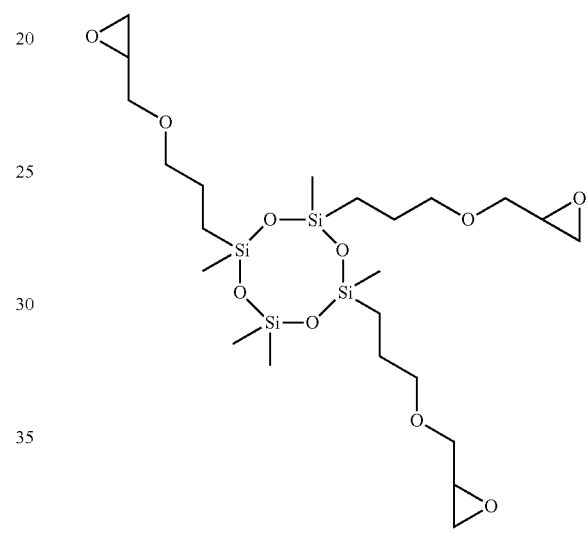
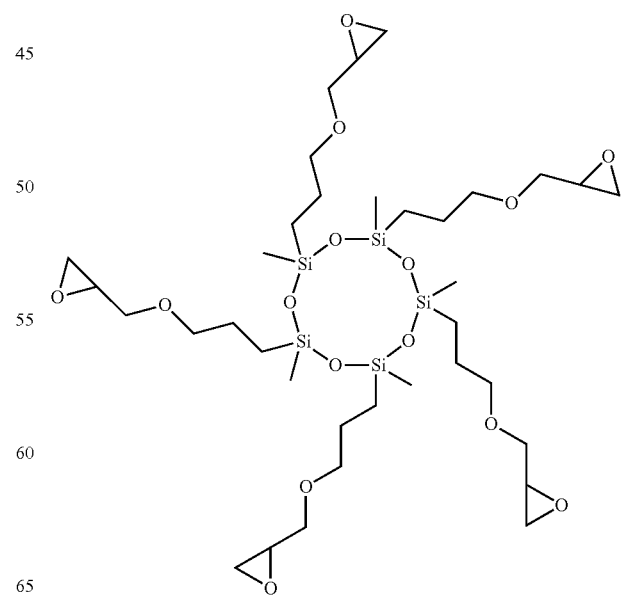

-continued

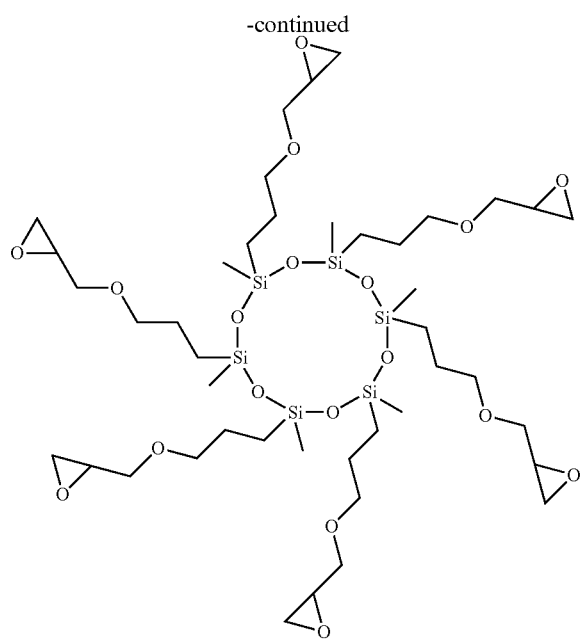

(Episulfide Compound)

There is no specific limitation on the type of the episulfide compound as long as it does not interfere with the object of the present invention. Examples of preferred episulfide compound include compounds in which the oxygen atom in the epoxy group of the epoxy compound is substituted with a sulfur atom.

(Radical Polymerizable Compound)

It is possible to use, as a radical polymerizable compound, a compound having an ethylenically unsaturated group. Examples of the compound having an ethylenically unsaturated group include a monofunctional compound and a polyfunctional compound.

Examples of the monofunctional compound include (meth)acrylamide, methylol (meth)acrylamide, methoxymethyl (meth)acrylamide, ethoxymethyl (meth)acrylamide, propoxymethyl (meth)acrylamide, butoxymethoxymethyl (meth)acrylamide, N-methylol (meth)acrylamide, N-hydroxymethyl (meth)acrylamide, (meth)acrylic acid, fumaric acid, maleic acid, maleic anhydride, itaconic acid, itaconic anhydride, citraconic acid, citraconic anhydride, crotonic acid, 2-acrylamide-2-methylpropanesulfonic acid, tert-butylacrylamidesulfonic acid, methyl (meth)acrylate, ethyl (meth)acrylate, butyl (meth)acrylate, 2-ethylhexyl (meth) acrylate, cyclohexyl (meth)acrylate, 2-hydroxyethyl (meth) acrylate, 2-hydroxypropyl (meth)acrylate, 2-hydroxybutyl (meth)acrylate, 2-phenoxy-2-hydroxypropyl (meth)acrylate, 2-(meth)acryloyloxy-2-hydroxypropyl phthalate, glycerin mono(meth)acrylate, tetrahydrofurfuryl (meth)acrylate, dimethylaminoethyl (meth)acrylate, glycidyl (meth)acrylate, 2,2,2-trifluoroethyl (meth)acrylate, 2,2,3,3-tetrafluoropropyl (meth)acrylate, a half (meth)acrylate of phthalic acid derivatives, and the like. These monofunctional compounds may be used alone, or in combination of two or more types thereof.

Meanwhile, examples of the polyfunctional compound include ethylene glycol di(meth)acrylate, diethylene glycol di(meth)acrylate, tetraethylene glycol di(meth)acrylate, propylene glycol di(meth)acrylate, polypropylene glycol di(meth)acrylate, butylene glycol di(meth)acrylate, neopentyl glycol di(meth)acrylate, 1,6-hexane glycol di(meth)acrylate, trimethylolpropane tri(meth)acrylate, glycerin di(meth)acrylate, pentaerythritol triacrylate, pentaerythritol tetraacrylate, dipentaerythritol pentaacrylate, dipentaerythritol hexaacrylate, pentaerythritol di(meth)acrylate, pentaerythritol tri (meth)acrylate, pentaerythritol tetra(meth)acrylate, dipentaerythritol penta(meth)acrylate, dipentaerythritol hexa (meth)acrylate, 2,2-bis(4-(meth)acryloxydiethoxyphenyl) propane, 2,2-bis(4-(meth)acryloxypolyethoxyphenyl) propane, 2-hydroxy-3-(meth)acryloyloxypropyl (meth) acrylate, ethylene glycol diglycidyl ether di(meth)acrylate, diethylene glycol diglycidyl ether di(meth)acrylate, phthalic acid diglycidyl ester di(meth)acrylate, glycerin triacrylate, glycerin polyglycidyl ether poly(meth)acrylate, urethane (meth)acrylate (i.e., tolylene diisocyanate, trimethylhexamethylene diisocyanate, or a reaction product of hexamethylene diisocyanate and 2-hydroxyethyl (meth)acrylate), methylenebis(meth)acrylamide, (meth)acrylamide methylene ether, a polyfunctional compound such as a fused product of polyhydric alcohol and N-methylol(meth)acrylamide, triacryl formal, and the like. These polyfunctional compounds may be used alone, or in combination of two or more types thereof.

Of these compounds having an ethylenically unsaturated group, trifunctional or higher polyfunctional compound is preferable, a tetrafunctional or higher polyfunctional compound is more preferable, and a pentafunctional or higher polyfunctional compound is still more preferable, in view of the fact that they tend to increase the adhesion of the cured product to the base material, and the strength of the curable composition after curing.

There is no particular limitation on the content of curable compound (A) in the curable composition as long as the object of the present invention is not impaired. The content of the curable compound (A) in the curable composition is preferably 3% by mass or more and 95% by mass or less, more preferably 5% by mass or more and 90% by mass or less, still more preferably 10% by mass or more and 85% by mass or less, and particularly preferably 20% by mass or more and 80% by mass or less, based on the mass of the entire components excluding the solvent.

<(B) Metal Oxide>

The curable composition contains: (B) a metal oxide. The metal oxide (B) contributes to the achievement of higher refractive index of the cured product of the curable composition. A capping agent is covalently bonded to a surface of the metal oxide (B). When a metal oxide such as $ZrO_2$ fine particles is mixed in the curable composition, it is expected to achieve higher refractive index. However, when mixing a metal oxide in which the capping agent is covalently bonded to the surface in the curable composition, even if higher refractive index of the cured product of the curable composition is achieved, the bending resistance of the cured product significantly deteriorates, thus easily causing cracking due to bending.

However, when using a metal oxide (B) in which the capping agent is bonded to the surface, it is possible to obtain the effect of achieving higher refractive index of the cured product than that in case when using the metal oxide in which the capping agent is not bonded to the surface, and also it is easy to form a cured product having excellent bending resistance.

The metal oxide (B) is usually in the form of fine particles. There is no particular limitation on the average particle diameter of fine particles of the metal oxide (B) (also including the covalently bonded capping agent moiety on the surface, the same shall apply hereinafter) as long as the object of the present invention is not impaired. The average particle diameter of fine particles of the metal oxide (B) is preferably, for example, 50 nm or less, more preferably 20 nm or less, still more preferably 10 nm or less, and particularly preferably 5 nm or less. The lower limit of the average particle diameter of fine particles of the metal oxide (B) may be, for example, 1 nm or more, or 2 nm or more. The average particle diameter of fine particles of the metal oxide (B) is a volume average particle diameter measured by a dynamic light scattering method. In cumulative particle size volume distribution of fine particles of the metal oxide (B), the particle diameter at the cumulative value of 99.99% is preferably, for example, 50 nm or less, more preferably 30 nm or less, and still more preferably 20 nm or less, in view of the achievement of higher refractive index. There is particularly no lower limit, and, for example, the particle diameter is 5 nm or more. Particle size distribution (cumulative particle size volume distribution) of fine particles of the metal oxide (B) is also measured by a dynamic light scattering method.

There is no particular limitation on types of the metal oxide (B) as long as the object of the present invention is not impaired. The fine particles of the metal oxide (B) may be fine particles made of a metal oxide alone, or fine particles made of metal oxide of two or more types thereof. The curable composition may contain a combination of the metal oxide (B) of two or more types thereof. Preferred examples of the metal oxide constituting fine particles of the metal oxide (B) include zinc oxide (ZnO), yttrium oxide ($Y_2O_3$), hafnium oxide ($HfO_2$), zirconium oxide ($ZrO_2$), and the like.

In the metal oxide (B), as mentioned above, the capping agent is bonded to the surface thereof. A hydroxyl group usually exists on the surface of the metal oxide (B) and, by reacting such hydroxyl group with a reactive group possessed by the capping agent, the capping agent is covalently bonded to the surface of the metal oxide (B). Preferred examples of the reactive group possessed by the capping agent include a trialkoxysilyl group such as a trimethoxysilyl group or a triethoxysilyl group; a dialkoxysilyl group such as a dimethoxysilyl group or a diethoxysilyl group; a monoalkoxysilyl group such as a monomethoxysilyl group or a monoethoxysilyl group; a trihalosilyl group such as a trichlorosilyl group; a dihalosilyl group such as a dichlorosilyl group; a monohalosilyl group such as a monochlorosilyl group; a carboxy group; a halocarbonyl group such as a chlorocarbonyl group; a hydroxyl group; a phosphono group (—P(=O)(OH)$_2$); and a phosphate group (—O—P(=O)(OH)$_2$).

A trialkoxysilyl group, a dialkoxysilyl group, a monoalkoxysilyl group, a trihalosilyl group, a dihalosilyl group, and a monohalosilyl group form a siloxane bond together with a surface of a metal oxide (B). A carboxy group and a halocarbonyl group forms a bond represented by (metal oxide-O—CO—) together with a surface of a metal oxide (B). A hydroxyl group forms a bond represented by (metal oxide —O—) together with a surface of a metal oxide (B). A phosphono group and a phosphate group forms a bond represented by metal oxide-O—P(=O)< together with a surface of a metal oxide (B).

In the capping agent, examples of the group to be bonded to the reactive group include a hydrogen atom and various organic groups. The organic group may contain heteroatoms such as O, N, S, P, B, Si, and a halogen atom. Examples of the group to be bonded to the reactive group include an alkyl group which may be linear or branched and may be interrupted with an oxygen atom (—O—), an alkenyl group which may be linear or branched and may be interrupted with an oxygen atom (—O—), an alkynyl group which may be linear or branched and may be interrupted with an oxygen atom (—O—), a cycloalkyl group, an aromatic hydrocarbon group, and a heterocyclic group. These groups may be substituted with substituents, for example, a halogen atom, an epoxy group-containing group such as a glycidyl group, a hydroxyl group, a mercapto group, an amino group, a (meth)acryloyl group, and an isocyanate group. There is no particular limitation on the number of substituents.

The group to be bonded to the reactive group is also preferably a group represented by —(SiR$^{b1}$R$^{b2}$—O—)$_r$—(SiR$^{b3}$R$^{b4}$—O—)$_s$—R$^{b5}$. R$^{b1}$, R$^{b2}$, R$^{b3}$, and R$^{b4}$ each are an organic group which may be the same or different. Suitable examples of the organic group include an alkyl group such as a methyl group or an ethyl group; an alkenyl group such as a vinyl group or an allyl group; an aromatic hydrocarbon group such as a phenyl group, a naphthyl group, or a tolyl group; an epoxy group-containing group such as a 3-glycidoxypropyl group; a (meth)acryloyloxy group, and the like. Examples of R$^{b5}$ in the above formula include terminal groups such as —Si(CH$_3$)$_3$, —Si(CH$_3$)$_2$H, —Si(CH$_3$)$_2$(CH=CH$_2$), and —Si(CH$_3$)$_2$(CH$_2$CH$_2$CH$_2$CH$_3$).

r and s in the above formula each independently is an integer of 0 to 60. Both r and s in the above formula are not 0.

Suitable specific examples of the capping agent include alkoxysilanes such as n-propyltrimethoxysilane, n-propyltriethoxysilane, n-octyltrimethoxysilane, n-octyltriethoxysilane, n-dodecyltrimethoxysilane, n-dodecyltriethoxysilane, n-hexadecyltrimethoxysilane, n-hexadecyltriethoxysilane, n-octadecyltrimethoxysilane, n-octadecyltriethoxysilane, phenyltrimethoxysilane, phenyltriethoxysilane, phenethylphenyltrimethoxysilane, phenethylethyltriethoxysilane, 3-{2-methoxy[poly(ethyleneoxy)]}propyltrimethoxysilane, 3-{2-methoxy[poly(ethyleneoxy)]}propyltriethoxysilane, 3-{2-methoxy[tri(ethyleneoxy)]}propyltrimethoxysilane, 3-{2-methoxy[tri(ethyleneoxy)]}propyltriethoxysilane, vinyltrimethoxirane, vinyltriethoxysilane, allyltrimethoxysilane, allyltriethoxysilane, 1-hexenyltrimethoxysilane, 1-hexenyltriethoxysilane, 1-octenyltrimethoxysilane, 1-octenyltriethoxysilane, 3-aminopropyltrimethoxysilane, 3-aminopropyltriethoxysilane, 3-mercaptopropyltrimethoxysilane, 3-mercaptopropyltriethoxysilane, 3-acryloyloxypropyltrimethoxysilane, 3-acryloylpropyltriethoxysilane, 3-methacryloyloxypropyltrimethoxysilane, 3-methacryloyloxypropyltriethoxysilane, 3-isocyanatopropyltrimethoxysilane, 3-isocyanatopropyltriethoxysilane, 3-glycidoxypropyltrimethoxysilane, and 3-glycidoxypropyltriethoxysilane; phenols or alcohols, such as ethanol, n-propanol, isopropanol, n-butanol, n-heptanol, n-hexanol, n-octanol, oleyl alcohol, n-dodecyl alcohol, n-octadecanol, benzyl alcohol, phenol, and triethylene glycol monomethyl ether; octanoic acid, acetic acid, propionic acid, 2-[2-(methoxyethoxy)ethoxy] acetic acid, oleic acid, lauric acid, benzoic acid, and acid halides (preferably acid chlorides) of these acids.

When the capping agent is covalently bonded to the surface of the metal oxide (B), the amount of the capping agent used is not particularly limited. Preferably, it is used to the capping agent in the amount enough to react with almost all of hydroxyl groups of the surface of the metal oxide (B).

When the capping agent has a vinyl group at the end, it is possible to graft a polymer having a hydrosilyl group to a terminal vinyl group derived from the capping agent on the surface of the metal oxide (B). In this case, a terminal vinyl group and a hydrosilyl group possessed by a polymer are bonded by a well-known hydrosilylation reaction. The hydrosilylation reaction proceeds by a well-known hydrosilylation catalyst. When the capping agent has a hydrosilyl group at the end, it is possible to graft a polymer having a vinyl group to a hydrosilyl group derived from the capping agent on the surface of the metal oxide (B). The hydrosilylation reaction is performed in the same manner as mentioned above. It is possible to use, as the polymer to be grafted to the surface of the metal oxide (B), polyorganosiloxane including a unit having a vinyl group and a unit having a hydrosilyl group. The polymer to be grafted to the surface of the metal oxide (B) may be linear or branched.

There is no particular limitation on the content of the metal oxide (B) in the curable composition as long as the object of the present invention is not impaired. In view of easily achieving both high refractive index and satisfactory flexibility with respect to the cured product, a mass ratio of the curable compound (A) to the metal oxide (B) is typically 1:99 to 95:5, preferably 5:95 to 90:10, more preferably 10:90 to 85:15, and particularly preferably 30:70 to 80:20. The mass ratio is preferably, for example, 5% by mass or more and 95% by mass or less, more preferably 10% by mass or more and 93% by mass or less, still more preferably 15% by mass or more and 90% by mass or less, and particularly preferably, 20% by mass or more and 80% by mass or less, based on the mass of the curable composition excluding the solvent.

<(C) Curing Agent>

The curable composition contains: (C) a curing agent for curing the above-mentioned curable compound (A). Types of the curing agent (C) are appropriately selected according to types of a polymerizable functional group possessed by the curable compound (A).

Specifically, when the curable compound (A) contains a compound having a cationic polymerizable functional group, the curable composition contains, as the curing agent (C), (C1) a cationic polymerization initiator. There has been known, as the cationic polymerization initiator (C1), (C1-1) a thermal cationic polymerization initiator and (C1-2) a photocationic polymerization initiator. Since the curable composition can be satisfactory cured in a short time, and only the exposed area can be selectively cured, the photocationic polymerization initiator (C1-2) is preferable.

When the curable compound (A) or the metal oxide (B) contains a compound having a radical polymerizable functional group such as a (meth)acryloyl group, the curable composition preferably contains, as the curing agent (C), (C2) a radical polymerization initiator.

When the curable compound (A) contains a compound having a cationic polymerizable functional group and a radical polymerizable functional group, a compound having a cationic polymerizable functional group, and a compound having a radical polymerizable functional group, the curable composition may contain only a cationic polymerization initiator (C1), or only a radical polymerizable (C2), and preferably both a cationic polymerization initiator (C1) and a radical polymerization initiator (C2).

Description will be made of the thermal cationic polymerization initiator (C1-1), the photocationic polymerization initiator (C1-2), and the radical polymerization initiator (C2).

[(C1-1) Thermal Cationic Polymerization Initiator]

It is possible to use, as the thermal cationic polymerization initiator (C1-1), a thermal cationic polymerization initiator, which has hitherto been mixed in various cationic polymerizable curable composition, without particular limitation. Suitable examples of the thermal cationic polymerization initiator (C1-1) include diphenyliodonium hexafluoroarsenate, diphenyliodonium hexafluorophosphate, diphenyliodonium trifluoromethanesulfonate, triphenylsulfonium tetrafluoroborate, tri-p-tolylsulfonium hexafluorophosphate, tri-p-tolylsulfonium trifluoromethanesulfonate, bis(cyclohexylsulfonyl)diazomethane, bis(tert-butylsulfonyl)diazomethane, bis(p-toluenesulfonyl)diazomethane, triphenylsulfonium trifluoromethanesulfonate, diphenyl-4-methylphenylsulfonium trifluoromethanesulfonate, diphenyl-2,4,6-trimethylphenylsulfonium-p-toluenesulfonate, and diphenyl-p-phenylthiophenylsulfonium-hexafluorophosphate. These thermal cationic polymerization initiators may be used in combination of two or more types thereof.

Examples of commercially available thermal cationic polymerization initiator (C1-1) include diazonium salt type initiators such as AMERICURE Series (manufactured by American Can Co.) and ULTRASET Series (manufactured by ADEKA CORPORATION), WPAG Series (manufactured by Wako Pure Chemical Industries, Ltd.); iodonium salt type initiators such as UVE Series (manufactured by General Electric Company), FC Series (manufactured by 3M Company), UV9310C (manufactured by GE Toshiba Silicones Co., Ltd.), and WPI Series (manufactured by Wako Pure Chemical Industries, Ltd.); and sulfonium salt type initiators such as CYRACURE Series (manufactured by Union Carbide Corporation), UVI Series (manufactured by General Electric Company), FC Series (manufactured by 3M Company), CD Series (manufactured by Sartomer Co.), Optomer SP Series (manufactured by ADEKA CORPORATION), Optomer CP Series (manufactured by ADEKA CORPORATION), SAN-AID SI Series (manufactured by Sanshin Chemical Industry Co., Ltd.), CI Series (manufactured by Nippon Soda Co., Ltd.), WPAG Series (manufactured by Wako Pure Chemical Industries, Ltd.), and CPI Series (manufactured by San-Apro Ltd.).

Examples of preferred other thermal cationic polymerization initiator (C1-1) include a compound composed of a cation moiety and an anion moiety, the cation moiety being a cation represented by the following formula (c1a). When using such thermal cationic polymerization initiator (C1-1), the above-mentioned curable compound (A) is satisfactory cured, thus enabling formation of a cured product having satisfactory heat resistance (pyrolysis resistance) and adhesion to the base material.

[Chem. 31]

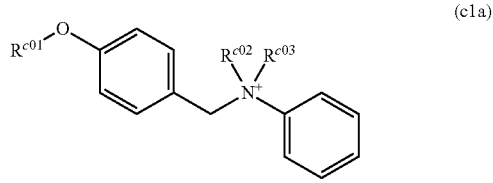

(c1a)

In the formula (c1a), $R^{c01}$, $R^{c02}$, and $R^{c03}$ each independently is an alkyl group having 1 or more and 6 or less carbon atoms.

In the formula (c1a), suitable examples of the alkyl group as $R^{c01}$, $R^{c02}$, and $R^{c03}$ include a methyl group, an ethyl group, an n-propyl group, an isopropyl group, an n-butyl group, an isobutyl group, a sec-butyl group, a tert-butyl group, an n-pentyl group, and an n-hexyl group. The alkyl group is preferably a methyl group or an ethyl group, and more preferably a methyl group. It is particularly preferred that all $R^{c01}$, $R^{c02}$, and $R^{c03}$ are methyl groups.

Namely, a cation represented by the formula (c1a) is preferably a cation represented by the following formula (c1b).

[Chem. 32]

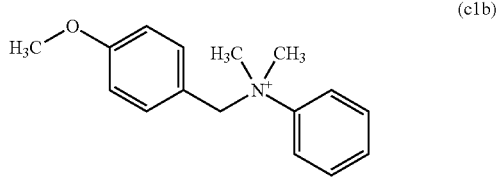

(c1b)

Examples of a counter anion to a cation represented by the formula (c1a) include $AsF_6^-$, $SbF_6^-$, $PF_6^-$, and $(C_6F_5)_4B^-$. Of these, $(C_6F_5)_4B^-$ is preferable.

"$C_6F_5$" represents a pentafluorophenyl group.

It is possible to use, as a compound composed of the cation moiety and the anion moiety represented by the formula (c1a), compounds which are available as commercially available products. Examples of the commercially available product include CXC-1821 (manufactured by King Industries, Inc.).

Suitable specific examples of the compound composed of the cation moiety of a cation represented by the formula (c1a) and the anion moiety include a quaternary ammonium salt composed of a cation represented by the formula (c1b) and $AsF_6^-$, a quaternary ammonium salt composed of a cation represented by the formula (c1b) and $SbF_6^-$, a quaternary ammonium salt composed of a cation represented by the formula (c1b) and $PF_6^-$, and a quaternary ammonium salt composed of a cation represented by the formula (c1b) and $(C_6F_5)_4B^-$. Of these, a quaternary ammonium salt composed of a cation represented by the formula (c1b) and $(C_6F_5)_4B^-$ is more preferable.

The compound composed of the cation moiety of a cation represented by the formula (c1a) and the anion moiety may be used alone or in combination of two or more types thereof.

The amount of the compound composed of the cation moiety represented by the formula (c1a) and the anion moiety in the thermal cationic polymerization initiator (C1-1) is preferably 50% by mass or more, more preferably 70% by mass or more, still more preferably 80% by mass or more, particularly preferably 90% by mass or more, and most preferably 100% by mass.

There is no particular limitation on the content of the thermal cationic polymerization initiator (C1-1) in the curable composition as long as the object of the present invention is not impaired. The content of the thermal cationic polymerization initiator (C1-1) in the curable composition is preferably 0.01 part by mass or more and 30 parts by mass or less, more preferably 0.1 part by mass or more and 10 parts by mass or less, and particularly preferably 0.3 part by mass or more and 5 parts by mass or less, based on 100 parts by mass of the curable compound (A). By using the thermal cationic polymerization initiator (C1-1) in the amount within the above range, it is possible to form a cured product having satisfactory heat resistance (pyrolysis resistance) and adhesion to the base material, thus easily obtaining a curable composition having satisfactory curability.

[(C1-2) Photocationic Polymerization Initiator]

It is possible to use, as the photocationic polymerization initiator (C1-2), a polymerization initiator used for photocuring a cationic polymerizable curable composition without particular limitation. Suitable examples of the photocationic polymerization initiator (C1-2) include an iodonium salt and a sulfonium salt.

Specific examples of the iodonium salt include diphenyliodonium tetrakis(pentafluorophenyl)borate, diphenyliodonium hexafluorophosphate, diphenyliodonium hexafluoroantimonate, di(4-nonylphenyl)iodonium hexafluorophosphate, and the like.

The photocationic polymerization initiator (C1-2) is preferably a sulfonium salt. Of these sulfonium salts, a sulfonium salt represented by the following formula (c1) (hereinafter also referred to as "sulfonium salt (Q)") is preferable. Since the curable composition contains the metal oxide (B), it may be slightly difficult for photocuring of the curable composition to proceed. However, when the curable composition contains a sulfonium salt (Q), it is easy for curing to satisfactory proceed even if the curable composition contains the metal oxide (B).

[Chem. 33]

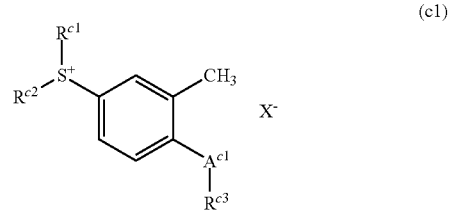

(c1)

In the formula (c1), $R^{c1}$ and $R^{c2}$ independently represent an alkyl group optionally substituted with a halogen atom, or a group represented by the following formula (c2), $R^{c1}$ and $R^{c2}$ may be combined with each other to form a ring together with a sulfur atom in the formula, $R^{c3}$ represents a group represented by the following formula (c3) or a group represented by the following formula (c4), $A^{c1}$ represents S, O, or Se, and $X^-$ represents a monovalent anion, provided that $R^{c1}$ and $R^{c2}$ are not simultaneously alkyl groups optionally substituted with a halogen atom.

[Chem. 34]

(c2)

In the formula (c2), a ring $Z^{c1}$ represents an aromatic hydrocarbon ring, $R^{c4}$ represents an alkyl group optionally substituted with a halogen atom, a hydroxy group, an alkoxy group, an alkylcarbonyl group, an alkoxycarbonyl group, an acyloxy group, an alkylthio group, a thienyl group, a thienylcarbonyl group, a furanyl group, a furanylcarbonyl group, a selenophenyl group, a selenophenylcarbonyl group, a heterocyclic aliphatic hydrocarbon group, an alkylsulfinyl group, an alkylsulfonyl group, a hydroxy(poly)alkyleneoxy group, an optionally substituted amino group, a cyano group, a nitro group, or a halogen atom, and m1 represents an integer of 0 or more.

[Chem. 35]

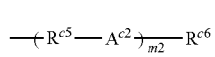
(c3)

In the formula (c3), $R^{c5}$ represents a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or an alkylene group optionally substituted with a halogen atom, or a group represented by the following formula (c5), $R^{c6}$ represents a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, an alkyl group optionally substituted with a halogen atom, or a group represented by the following formula (c6), $A^{c2}$ represents a single bond, S, O, a sulfinyl group, or a carbonyl group, and m2 represents 0 or 1.

[Chem. 36]

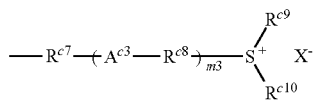
(c4)

In the formula (c4), $R^{c7}$ and $R^{c8}$ independently represent a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, an alkylene group optionally substituted with a halogen atom, or a group represented by the following formula (c5), $R^{c9}$ and $R^{c10}$ independently represent an alkyl group optionally substituted with a halogen atom, or a group represented by the formula (c2), $R^{c9}$ and $R^{c10}$ may be combined with each other to form a ring together with a sulfur atom in the formula, $A^{c3}$ represents a single bond, S, O, a sulfinyl group, or a carbonyl group, X— is as mentioned above, and m3 represents 0 or 1, provided that $R^{c9}$ and $R^{c10}$ are not simultaneously alkyl groups optionally substituted with a halogen atom.

[Chem. 37]

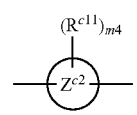
(c5)

In the formula (c5), a ring $Z^{c2}$ represents an aromatic hydrocarbon ring, $R^{c11}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, and m4 represents an integer of 0 or more.

[Chem. 38]

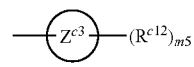
(c6)

In the formula (c6), a ring $Z^{c3}$ represents an aromatic hydrocarbon ring, $R^{c12}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, a thienylcarbonyl group, a furanylcarbonyl group, an selenophenylcarbonyl group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, and m5 represents an integer of 0 or more.

(Sulfonium Salt (Q))

A sulfonium salt (Q) will be described below. The sulfonium salt (Q) is characterized in that, in a benzene ring in the formula (c1), a methyl group is bonded to the carbon atom at the ortho-position with respect to the carbon atom to which $A^{c1}$ is bonded. Since the sulfonium salt (Q) has a methyl group at the above position, protons are easily generated as compared with a conventional sulfonium salt, leading to high sensitivity to active energy ray such as ultraviolet light.

In the formula (c1), both $R^{c1}$ and $R^{c2}$ are preferably groups represented by the formula (c2). $R^{c1}$ and $R^{c2}$ may be the same or different with each other. In the formula (c1), Rd and $R^{c2}$ are combined with each other to form a ring together with a sulfur atom in the formula, and the number of ring-constituting atoms of the ring to be formed is preferably 3 or more and 10 or less, and more preferably, 5 or more and 7 or less, including a sulfur atom. The ring to be formed may be polycyclic, and preferably those in which 5- to 7-membered rings are fused. In the formula (c1), both Rd and $R^{c2}$ are preferably phenyl groups. In the formula (c1), $R^{c3}$ is preferably a group represented by the formula (c3). In the formula (c1), $A^{c1}$ is preferably S or O, and more preferably S.

In the formula (c2), $R^{c4}$ is preferably an alkyl group optionally substituted with a halogen atom, a hydroxy group, an alkylcarbonyl group, a thienylcarbonyl group, a furanylcarbonyl group, a selenophenylcarbonyl group, an optionally substituted amino group, or a nitro group, and more preferably, an alkyl group optionally substituted with a halogen atom, an alkylcarbonyl group, or a thienylcarbonyl group. In the formula (c2), m1 can be selected according to types of the ring $Z^{c1}$ and may be, for example, an integer of 0 or more and 4 or less, preferably an integer of 0 or more and 3 or less, and more preferably an integer of 0 or more and 2 or less.

In the formula (c3), $R^{c5}$ is preferably an alkylene group; an alkylene group substituted with a hydroxy group, an optionally substituted amino group, or a nitro group; or a group represented by the formula (c5), and more preferably a group represented by the formula (c5). In the formula (c3), $R^{c6}$ is preferably an alkyl group; an alkyl group substituted with a hydroxy group, an optionally substituted amino group, or a nitro group; or a group represented by the formula (c6), and more preferably a group represented by the formula (c6). In the formula (c3), $A^{c2}$ is preferably S or O, and more preferably S. In the formula (c3), m2 is preferably 0.

In the formula (c4), $R^{c7}$ and $R^{c8}$ independently represent an alkylene group; an alkylene group substituted with a hydroxy group, an optionally substituted amino group, or a nitro group; or a group represented by the formula (a5), and more preferably, a group represented by the formula (c5). $R^{c7}$ and $R^{c8}$ may be the same or different with each other. In the formula (c4), both $R^{c9}$ and $R^{c10}$ are preferably groups represented by the formula (c2). $R^{c9}$ and $R^{c10}$ may be the same or different with each other. In the formula (c4), $R^{c9}$ and $R^{c10}$ are combined with each other to form a ring together with a sulfur atom in the formula, and the number of ring-constituting atoms of the ring to be formed is preferably 3 or more and 10 or less, and more preferably 5 or more and 7 or less, including a sulfur atom. The ring to be formed may be polycyclic, and preferably those in which 5- to 7-membered rings are fused. In the formula (c4), $A^{c3}$ is preferably S or O, and more preferably S. In the formula (c4), m3 is preferably 0.

In the formula (c5), $R^{c11}$ is preferably an alkyl group optionally substituted with a halogen atom, a hydroxy group, an optionally substituted amino group, or a nitro group, and more preferably, an alkyl group optionally substituted with a halogen atom. In the formula (c5), m4 can be selected according to types of the ring $Z^{c2}$ and may be, for example, an integer of 0 or more and 4 or less, preferably an integer of 0 or more and 3 or less, and more preferably an integer of 0 or more and 2 or less.

In the formula (c6), $R^{c12}$ is preferably an alkyl group optionally substituted with a halogen atom, a hydroxy group, an alkylcarbonyl group, a thienylcarbonyl group, a furanylcarbonyl group, a selenophenylcarbonyl group, an optionally substituted amino group, or a nitro group, and more preferably, an alkyl group optionally substituted with a halogen atom, an alkylcarbonyl group, or a thienylcarbonyl group. In the formula (c6), m5 can be selected according to types of the ring $Z^{c3}$ and may be, for example, an integer of 0 or more and 4 or less, preferably an integer of 0 or more and 3 or less, and more preferably an integer of 0 or more and 2 or less.

In the formula (c1), $X^-$ is a monovalent anion corresponding to an acid (HX) generated by irradiating a sulfonium salt (Q) with active energy (heat, visible light, ultraviolet light, electron beam, and X-ray). $X^-$ is suitably a monovalent polyatomic anion, and more preferably an anion represented by $MY_a^-$, $(Rf)_b PF_{6-b}^-$, $R^{x1}_c By_{4-c}^-$, $R^{x1}_c GaY_{4-c}^-$, $R^{x2}SO_3^-$, $(R^{x2}SO_2)_3 C^-$, or $(R^{x2}SO_2)_2 N^-$. $X^-$ may be a halogen anion and examples thereof include fluoride ion, chloride ion, bromide ion, iodide ion, and the like.

M represents a phosphorus atom, a boron atom, or an antimony atom. Y represents a halogen atom (preferably a fluorine atom).

Rf represents an alkyl group in which 80 mol % or more of hydrogen atoms are substituted with a fluorine atom (preferably an alkyl group having 1 or more and 8 or less carbon atoms). Examples of the alkyl group, which forms Rf by fluorine substitution, include a linear alkyl group (methyl, ethyl, propyl, butyl, pentyl, and octyl), a branched alkyl group (isopropyl, isobutyl, sec-butyl, and tert-butyl) and cycloalkyl group (cyclopropyl, cyclobutyl, cyclopentyl, and cyclohexyl), and the like. The proportion of the hydrogen atom of the alkyl group substituted with the fluorine atom in Rf is preferably 80 mol % or more, more preferably 90 mol % or more, and particularly preferably 100 mol %, based on the number of mols of the hydrogen atom originally possessed by the alkyl group. When the proportion of substitution with the fluorine atom is preferably within the above range, the photosensitivity of the sulfonium salt (Q) becomes more satisfactory. Particularly preferred Rf includes $CF_3^-$, $CF_3CF_2^-$, $(CF_3)_2CF^-$, $CF_3CF_2CF_2^-$, $CF_3CF_2CF_2CF_2^-$, $(CF_3)_2CFCF_2^-$, $CF_3CF_2(CF_3)CF^-$, and $(CF_3)_3C^-$.

b Rf(s) are mutually independent and may be the same or different with each other.

P represents a phosphorus atom and F represents a fluorine atom.

$R^{x1}$ represents a phenyl group in which hydrogen atoms are partially substituted with at least one element or electron withdrawing group. A halogen atom is included in examples of one element, and examples thereof include a fluorine atom, a chlorine atom, and a bromine atom. Examples of the electron withdrawing group include a trifluoromethyl group, a nitro group, and a cyano group. Of these groups, preferred is a phenyl group in which at least one hydrogen atom is substituted with a fluorine atom or a trifluoromethyl group.

c $R^{x1}$(s) are mutually independent and may be the same or different with each other.

B represents a boron atom and Ga represents a gallium atom.

$R^{x2}$ represents an alkyl group having 1 or more and 20 or less carbon atoms, a fluoroalkyl group having 1 or more and 20 or less carbon atoms, or an aryl group having 6 or more and 20 or less carbon atoms, the alkyl group and the fluoroalkyl group may be linear, branched, or cyclic, and the alkyl group, the fluoroalkyl group, or the aryl group is not optionally substituted or optionally substituted. Examples of the substituent include a hydroxy group, an optionally substituted amino group (e.g., including those exemplified in the below-mentioned description with respect to the formulas (c2) to (c6)), a nitro group, and the like. A carbon chain in the alkyl group, fluoroalkyl group, or aryl group represented by $R^{x2}$ may have a heteroatom such as an oxygen atom, a nitrogen atom, or a sulfur atom. Particularly, the carbon chain in the alkyl group or fluoroalkyl group represented by $R^{x2}$ may have a divalent functional group (e.g., an ether bond, a carbonyl bond, an ester bond, an amino bond, an amide bond, an imide bond, a sulfonyl bond, a sulfonylamide bond, a sulfonylimide bond, a urethane bond, etc.). When the alkyl group, fluoroalkyl group or aryl group represented by $R^{x2}$ has the substituent, heteroatom, or functional group, the number of the substituent, heteroatom, or functional group may be 1, or 2 or more.

S represents a sulfur atom, O represents an oxygen atom, C represents a carbon atom, and N represents a nitrogen atom.

a represents an integer of 4 or more and 6 or less.

b is preferably an integer of 1 or more and 5 or less, more preferably an integer of 2 or more and 4 or less, and particularly preferably 2 or 3.

c is preferably an integer of 1 or more and 4 or less, and more preferably 4.

Examples of the anion represented by $MY_a^-$ include an anion represented by $SbF_6^-$, $PF_6^-$, or $BF_4^-$.

Examples of the anion represented by $(Rf)_b PF_{6-b}^-$ include an anion represented by $(CF_3CF_2)_2PF_4^-$, $(CF_3CF_2)_3PF_3^-$, $((CF_3)_2CF)_2PF_4^-$, $((CF_3)_2CF)_3PF_3^-$, $(CF_3CF_2CF_2)_2PF_4^-$, $(CF_3CF_2CF_2)_3PF_3^-$, $((CF_3)_2CFCF_2)_2PF_4^-$, $((CF_3)_2CFCF_2)_3PF_3^-$, $(CF_3CF_2CF_2CF_2)_2PF_4^-$, or $(CF_3CF_2CF_2CF_2)_3PF_3^-$. Of these, an anion represented by $(CF_3CF_2)_3PF_3^-$, $(CF_3CF_2CF_2)_3PF_3^-$, $((CF_3)_2CF)_3PF_3^-$, $((CF_3)_2CF)_2PF_4^-$, $((CF_3)_2CFCF_2)_3PF_3^-$, or $((CF_3)_2CFCF_2)_2PF_4^-$ is preferable.

The anion represented by $R^{x1}_c BY_{4-c}^-$ is preferably an anion represented by:

wherein $R^{x1}$ represents a phenyl group in which at least a part of hydrogen atoms is/are substituted with a halogen atom or an electron withdrawing group, Y represents a halogen atom, and c represents an integer of 1 or more and 4 or less. Examples thereof include an anion represented by $(C_6F_5)_4B^-$, $((CF_3)_2C_6H_3)_4B^-$, $(CF_3C_6H_4)_4B^-$, $(C_6F_5)_2BF_2^-$, $C_6F_5BF_3^-$, or $C_6H_3F_2)_4B^-$. Of these, an anion represented by $(C_6F_5)_4B^-$ or $((CF_3)_2C_6H_3)_4B^-$ is preferable.

Examples of the anion represented by $R^{x1}_c GaY_{4-c}^-$ include an anion represented by $(C_6F_5)_4Ga^-$, $((CF_3)_2C_6H_3)_4Ga^-$, $(CF_3C_6H_4)_4Ga^-$, $(C_6F_5)_2GaF_2^-$, $C_6F_5GaF_3^-$, or $(C_6H_3F_2)_4Ga^-$. Of these, an anion represented by $(C_6F_5)_4Ga^-$ or $((CF_3)_2C_6H_3)_4Ga^-$ is preferable.

Examples of the anion represented by $R^{x2}SO_3^-$ include a trifluoromethanesulfonic acid anion, a pentafluoroethanesulfonic acid anion, a heptafluoropropanesulfonic acid anion, a nonafluorobutanesulfonic acid anion, a pentafluorophenylsulfonic acid anion, a p-toluenesulfonic acid anion, a benzenesulfonic acid anion, a camphorsulfonic acid anion, a methanesulfonic acid anion, a ethanesulfonic acid anion, a propanesulfonic acid anion, and a butanesulfonic acid anion. Of these, a trifluoromethanesulfonic acid anion, a nonafluorobutanesulfonic acid anion, a methanesulfonic acid anion, a butanesulfonic acid anion, a camphorsulfonic acid anion, a benzenesulfonic acid anion, or a p-toluenesulfonic acid anion is preferable.

Examples of the anion represented by $(R^{x2}SO_2)_3C^-$ include an anion represented by $(CF_3SO_2)_3C^-$, $(C_2F_5SO_2)_3C^-$, $(C_3F_7SO_2)_3C^-$, or $C_4F_9SO_2)_3C^-$.

Examples of the anion represented by $(R^{x2}SO_2)_2N^-$ include an anion represented by $(CF_3SO_2)_2N^-$, $(C_2F_5SO_2)_2N^-$, $(C_3F_7SO_2)_2N^-$, or $C_4F_9SO_2)_2N^-$.

It is possible to use, as the monovalent polyatomic anion, in addition to an anion represented by $MY_a^-$, $(Rf)_b PF_{6-b}^-$, $R^{x1}_c BY_{4-c}^-$, $R^{x1}_c GaY_{4-c}^-$, $R^{x2}SO_3^-$, $(R^{x2}SO_2)_3C^-$, or $(R^{x2}SO_2)_2N^-$, a perhalogen acid ion ($ClO_4^-$, $BrO_4^-$, etc.), a halogenated sulfonic acid ion ($FSO_3^-$, $ClSO_3^-$, etc.), a sulfuric acid ion ($CH_3SO_4^-$, $CF_3SO_4^-$, $HSO_4^-$, etc.), a carbonic acid ion ($HCO_3^-$, $CH_3CO_3^-$, etc.), an aluminic acid ion ($AlCl_4^-$, $AlF_4^-$, etc.), a hexafluorobismuthic acid ion ($BiF_6^-$, a carboxylic acid ion ($CH_3COO^-$, $CF_3COO^-$, $C_6H_5COO^-$, $CH_3C_6H_4COO^-$, $C_6F_5COO^-$, $CF_3C_6H_4COO^-$, etc.), an arylboric acid ion ($B(C_6H_5)_4^-$, $CH_3CH_2CH_2CH_2B(C_6H_5)_3^-$, etc.), a thiocyanic acid ion ($SCN^-$), and a nitric acid ion ($NO_3^-$).

Of these $X^-$(s), in view of the cationic polymerizability, the anion is preferably anions represented by $MY_a^-$, $(Rf)_b PF_{6-b}^-$, $R^{x1}_c BY_{4-c}^-$, $R^{x1}_c GaY_{4-c}^-$, and $(R^{x2}SO_2)_3C^-$, more preferably anions represented by $SbF_6^-$, $PF_6^-$, $(CF_3CF_2)_3PF_3^-$, $(C_6F_5)_4B^-$, $((CF_3)_2C_6H_3)_4B^-$, $(C_6F_5)_4Ga^-$, $((CF_3)_2C_6H_3)_4Ga^-$, and $(CF_3SO_2)_3C^-$, and still more preferably an anion represented by $R^{x1}_c BY_{4-c}^-$.

In the formulas (c2), (c5), and (c6), examples of the aromatic hydrocarbon ring include a benzene ring and a fused polycyclic aromatic hydrocarbon ring [fused di- to tetracyclic aromatic hydrocarbon rings, for example, a fused dicyclic hydrocarbon ring (e.g., a C8-20 fused dicyclic hydrocarbon ring such as a naphthalene ring, and preferably a $C_{10-16}$ fused dicyclic hydrocarbon ring), a fused tricyclic aromatic hydrocarbon ring (e.g., an anthracene ring, a phenanthrene ring, etc.). The aromatic hydrocarbon ring is preferably a benzene ring or a naphthalene ring, and more preferably a benzene ring.

In the formulas (c1) to (c6), examples of the halogen atom include a fluorine atom, a chlorine atom, a bromine atom, and an iodine atom.

In the formulas (c1) to (c6), examples of the alkyl group include a linear alkyl group having 1 or more and 18 or less carbon atoms (methyl, ethyl, n-propyl, n-butyl, n-pentyl, n-octyl, n-decyl, n-dodecyl, n-tetradecyl, n-hexadecyl, and n-octadecyl), a branched alkyl group having 3 or more and 18 or less carbon atoms (isopropyl, isobutyl, sec-butyl, tert-butyl, isopentyl, neopentyl, tert-pentyl, isohexyl, and isooctadecyl), and a cycloalkyl group having 3 or more and 18 or less carbon atoms (cyclopropyl, cyclobutyl, cyclopentyl, cyclohexyl, and 4-decylcyclohexy). Particularly, in the formulas (c1), (c2), and (c4) to (c6), the alkyl group optionally substituted with a halogen atom means an alkyl group substituted with an alkyl group and a halogen atom. Examples of the alkyl group substituted with a halogen atom include a group in which at least one hydrogen atom in the linear alkyl group, branched alkyl group, or cycloalkyl group is substituted with a halogen atom (monofluoromethyl, difluoromethyl, trifluoromethyl, etc.). Of the alkyl groups optionally substituted with a halogen atom, $R^{c1}$, $R^{c2}$, $R^{c9}$, or $R^{c10}$ is particularly preferably a trifluoromethyl group, and $R^{c4}$, $R^{c6}$, $R^{c11}$, or $R^{c12}$ is particularly preferably a methyl group.

In the formulas (c2) to (c6), examples of the alkoxy group include a linear or branched alkoxy group having 1 or more and 18 or less carbon atoms (methoxy, ethoxy, propoxy, isopropoxy, butoxy, isobutoxy, sec-butoxy, tert-butoxy, hexyloxy, decyloxy, dodecyloxy, and octadecyloxy), and the like.

In the formulas (c2) to (c6), examples of the alkyl group in the alkylcarbonyl group include the above-mentioned linear alkyl group having 1 or more and 18 or less carbon atoms, branched alkyl group having 3 or more and 18 or less carbon atoms, or cycloalkyl group having 3 or more and 18 or less carbon atoms, and examples of the alkylcarbonyl group include a linear, branched, or cyclic alkylcarbonyl group having 2 or more and 18 or less carbon atoms (acetyl, propionyl, butanoyl, 2-methylpropionyl, heptanoyl, 2-methylbutanoyl, 3-methylbutanoyl, octanoyl, decanoyl, dodecanoyl, octadecanoyl, cyclopentanoyl group, and cyclohexanoyl group), and the like.

In the formulas (c3) to (c6), examples of the arylcarbonyl group include an arylcarbonyl group having 7 or more and 11 or less carbon atoms (benzoyl and naphthoyl), and the like.

In the formulas (a2) to (a6), examples of the alkoxycarbonyl group include a linear or branched alkoxycarbonyl group having 2 or more and 19 or less carbon atoms (methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, octyloxycarbonyl, tetradecyloxycarbonyl, and octadecyloxycarbonyl), and the like.

In the formulas (c3) to (c6), examples of the aryloxycarbonyl group include an aryloxycarbonyl group having 7 or more and 11 or less carbon atoms (phenoxycarbonyl and naphthoxycarbonyl), and the like.

In the formulas (c3) to (c6), examples of the arylthiocarbonyl group include an arylthiocarbonyl group having 7 or more and 11 or less carbon atoms (phenylthiocarbonyl and naphthoxythiocarbonyl), and the like.

In the formulas (c2) to (c6), examples of the acyloxy group include a linear or branched acyloxy group having 2 or more and 19 or less carbon atoms (acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, octylcarbonyloxy, tetradecylcarbonyloxy, and octadecylcarbonyloxy), and the like.

In the formulas (c3) to (c6), examples of the arylthio group include an arylthio group having 6 or more and 20 or less carbon atoms (phenylthio, 2-methylphenylthio, 3-methylphenylthio, 4-methylphenylthio, 2-chlorophenylthio, 3-chlorophenylthio, 4-chlorophenylthio, 2-bromophenylthio, 3-bromophenylthio, 4-bromophenylthio, 2-fluorophenylthio, 3-fluorophenylthio, 4-fluorophenylthio, 2-hydroxyphenylthio, 4 hydroxyphenylthio, 2-methoxyphenylthio, 4-methoxyphenylthio, 1-naphthylthio, 2-naphthylthio, 4-[4-(phenylthio)benzoyl]phenylthio, 4-[4-(phenylthio)phenoxy]phenylthio, 4-[4-(phenylthio)phenyl]phenylthio, 4-(phenylthio)phenylthio, 4-benzoylphenylthio, 4-benzoyl-2-chlorophenylthio, 4-benzoyl-3-chlorophenylthio, 4-benzoyl-3-methylthiophenylthio, 4-benzoyl-2-methylthiophenylthio, 4-(4-methylthiobenzoyl)phenylthio, 4-(2-methylthiobenzoyl)phenylthio, 4-(p-methylbenzoyl)phenylthio, 4-(p-ethylbenzoyl)phenylthio 4-(p-isopropylbenzoyl)phenylthio, and 4-(p-tert-butylbenzoyl)phenylthio), and the like.

In the formulas (c2) to (c6), examples of the alkylthio group include a linear or branched alkylthio group having 1 or more and 18 or less carbon atoms (methylthio, ethylthio, propylthio, isopropylthio, butylthio, isobutylthio, sec-butylthio, tert-butylthio, pentylthio, isopentylthio, neopentylthio, tert-pentylthio, octylthio, decylthio, dodecylthio, and isooctadecylthio, and the like.

In the formulas (c3) to (c6), examples of the aryl group include an aryl group having 6 or more and 10 or less carbon atoms (phenyl, tolyl, dimethylphenyl, and naphthyl), and the like.

In the formula (c2), examples of the heterocyclic aliphatic hydrocarbon group include a heterocyclic hydrocarbon group having 2 or more and 20 or less carbon atoms (preferably 4 or more and 20 or less carbon atoms) (pyrrolidinyl, tetrahydrofuranyl, tetrahydrothienyl, piperidinyl, tetrahydropyranyl, tetrahydrothiopyranyl, morpholinyl), and the like.

In the formulas (c3) to (c6), examples of the heterocyclic hydrocarbon group include a heterocyclic hydrocarbon group having 4 or more and 20 or less carbon atoms (thienyl, furanyl, selenophenyl, pyranyl, pyrrolyl, oxazolyl, thiazolyl, pyridyl, pyrimidyl, pyrazinyl, indolyl, benzofuranyl, benzothienyl, quinolyl, isoquinolyl, quinoxalinyl, quinazolinyl, carbazolyl, acridinyl, phenothiazinyl, phenazinyl, xanthenyl, thianthrenyl, phenoxazinyl, phenoxathiinyl, chromanyl, isochromanyl, dibenzothienyl, xanthonyl, thioxanthonyl, and dibenzofuranyl), and the like.

In the formulas (c3) to (c6), examples of the aryloxy group include an aryloxy group having 6 or more and 10 or less carbon atoms (phenoxy and naphthyloxy), and the like.

In the formulas (c2) to (c6), examples of the alkylsulfinyl group include a linear or branched sulfinyl group having 1 or more and 18 or less carbon atoms (methylsulfinyl, ethylsulfinyl, propylsulfinyl, isopropylsulfinyl, butylsulfinyl, isobutylsulfinyl, sec-butylsulfinyl, tert-butylsulfinyl, pentylsulfinyl, isopentylsulfinyl, neopentylsulfinyl, tert-pentylsulfinyl, octylsulfinyl, and isooctadecylsulfinyl), and the like.

In the formulas (c3) to (c6), examples of the arylsulfinyl group include an arylsulfinyl group having 6 or more and 10 or less carbon atoms (phenylsulfinyl, tolylsulfinyl, and naphthylsulfinyl), and the like.

In the formulas (c2) to (c6), examples of the alkylsulfonyl group include a linear or branched alkylsulfonyl group having 1 or more and 18 or less carbon atoms (methylsulfonyl, ethylsulfonyl, propylsulfonyl, isopropylsulfonyl, butylsulfonyl, isobutylsulfonyl, sec-butylsulfonyl, tert-butylsulfonyl, pentylsulfonyl, isopentylsulfonyl, neopentylsulfonyl, tert-pentylsulfonyl, octylsulfonyl, and octadecylsulfonyl), and the like.

In the formulas (c3) to (c6), examples of the arylsulfonyl group include an arylsulfonyl group having 6 or more and 10 or less carbon atoms (phenylsulfonyl, tolylsulfonyl (tosyl group) and naphthylsulfonyl), and the like.

In the formulas (c2) to (c6), examples of the hydroxy (poly)alkyleneoxy group include a hydroxy(poly)alkyleneoxy group represented by $HO(AO)_q^-$ (wherein AO independently represents an ethyleneoxy group and/or a propyleneoxy group, and q represents an integer of 1 or more and 5 or less).

In the formulas (c2) to (c6), examples of the optionally substituted amino group include an amino group ($-NH_2$) and a substituted amino group having 1 or more and 15 or less carbon atoms (methylamino, dimethylamino, ethylamino, methylethylamino, diethylamino, n-propylamino, methyl-n-propylamino, ethyl-n-propylamino, n-propylamino, isopropylamino, isopropylmethylamino, isopropylethylamino, diisopropylamino, phenylamino, diphenylamino, methylphenylamino, ethylphenylamino, n-propylphenylamino, and isopropylphenylamino), and the like.

In the formulas (c3) and (c4), examples of the alkylene group include a linear or branched alkylene group having 1 or more and 18 or less carbon atoms (a methylene group, a 1,2-ethylene group, a 1,1-ethylene group, a propane-1,3-diyl group, a propane-1,2-diyl group, a propane-1,1-diyl group, a propane-2,2-diyl group, a butane-1,4-diyl group, a butane-1,3-diyl group, a butane-1,2-diyl group, a butane-1,1-diyl group, a butane-2,2-diyl group, a butane-2,3-diyl group, a pentane-1,5-diyl group, a pentane-1,4-diyl group, a hexane-1,6-diyl group, a heptane-1,7-diyl group, an octane-1,8-diyl group, a 2-ethylhexane-1,6-diyl group, a nonane-1,9-diyl group, a decane-1,10-diyl group, a undecane-1,11-diyl group, a dodecane-1,12-diyl group, a tridecane-1,13-diyl group, a tetradecane-1,14-diyl group, a pentadecane-1,15-diyl group, and a hexadecane-1,16-diyl group), and the like.

A sulfonium salt (Q) can be synthesized, for example, in accordance with the following scheme. Specifically, 1-fluoro-2-methyl-4-nitrobenzene represented by the following formula (c1-1) is reacted with a compound represented by the following formula (c1-2) in the presence of a base such as potassium hydroxide to obtain a nitro compound represented by the following formula (c1-3), followed by reduction in the presence of reduced iron to obtain an amine compound represented by the following formula (c1-4). The amine compound is reacted with a nitrite (e.g., sodium nitrite) represented by $MaNO_2$ (wherein Ma represents a metal atom, for example, an alkali metal atom such as a sodium atom) to obtain a diazo compound, and then the diazo compound is mixed with cuprous halide represented by CuX' (wherein X' represents a halogen atom such as a bromine atom, the same shall apply hereinafter) and hydrogen halide represented by HX', followed by proceeding of the reaction to obtain a halide represented by the following formula (c1-5). A Grignard reagent is prepared from the halide and magnesium, and then the Grignard reagent is reacted with a sulfoxide compound represented by the following formula (c1-6) in the presence of chlorotrimethylsilane, thus making it possible to obtain a sulfonium salt represented by the following formula (c1-7). Furthermore, the sulfonium salt is reacted with a salt represented by $Mb^+X''^-$ (wherein $Mb^+$ represents a metal cation, for example, an alkali metal cation such as a potassium ion, and $X''^-$ represents a monovalent anion represented by $X^-$ (provided that, a halogen anion is excluded)), thereby performing a salt exchange, thus making it possible to obtain a sulfonium salt represented by the following formula (c1-8). In the following formulas (c1-2) to (c-8), $R^{c1}$ to $R^{c3}$ and $A^{c1}$ are the same as those in the formula (c1).

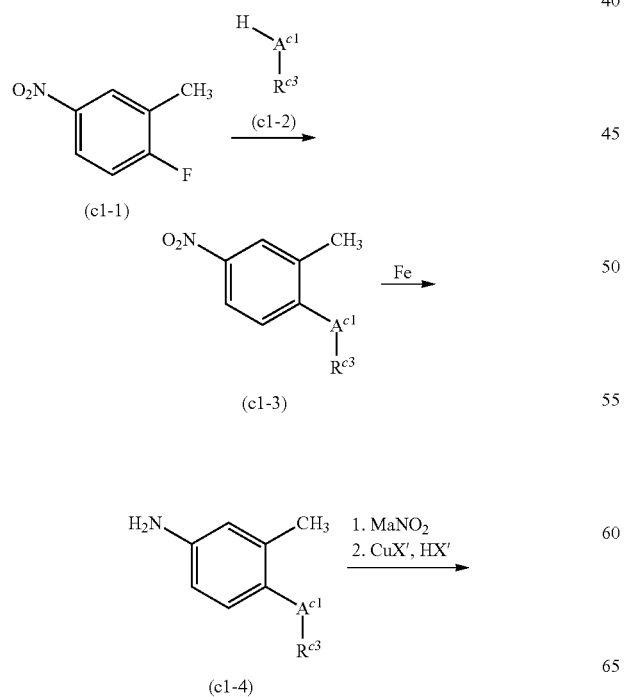

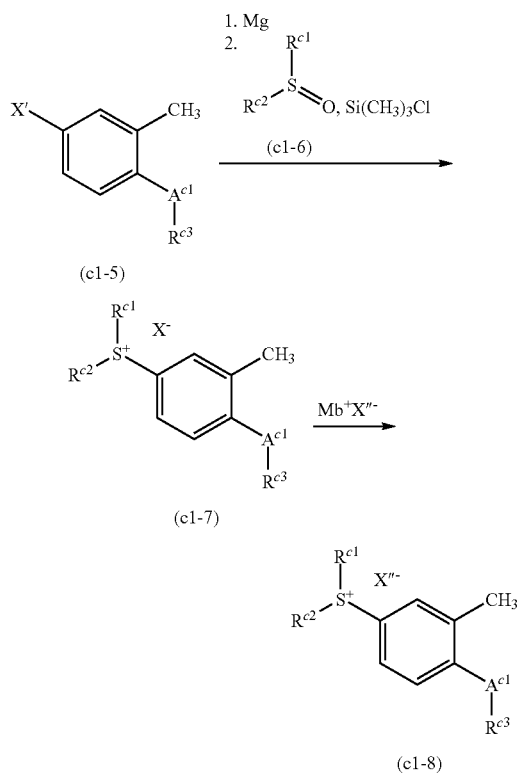

Specific examples of the cation moiety of the sulfonium salt (Q) represented by the formula (c1) include the followings. Specific examples of the anion moiety of the sulfonium salt (Q) represented by the formula (c1) include conventionally known anion moiety such as those exemplified in the description of $X^-$. The sulfonium salt (Q) represented by the formula (c1) can be synthesized in accordance with the scheme, and it is possible to use the cation moiety in combination with the desired anion moiety by optionally performing salt exchange, and particularly preferred is a combination with an anion represented by $R^{x1}{}_cBY_{4-c}^-$ (wherein $R^{x1}$ represents a phenyl group in which at least a part of hydrogen atoms is/are substituted with a halogen atom or an electron withdrawing group, Y represents a halogen atom, and c represents an integer of 1 or more and 4 or less).

[Chem. 40]

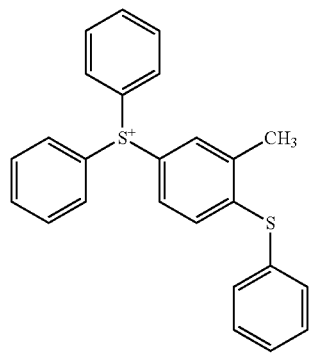

69
-continued
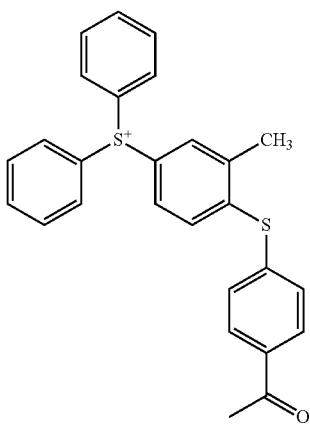
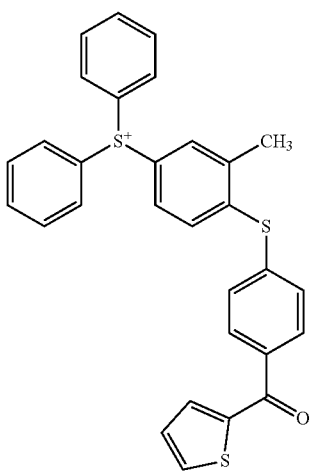
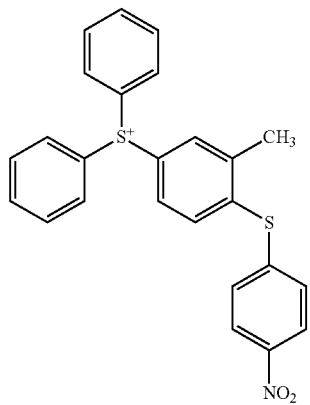
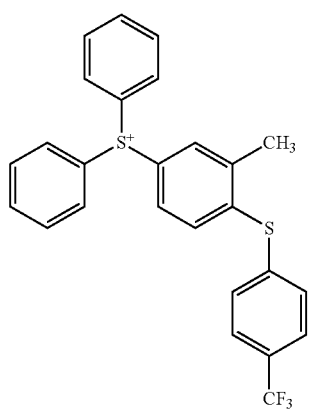
70
-continued
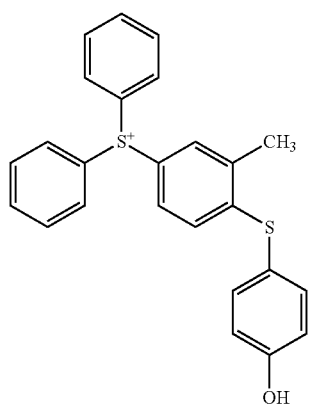
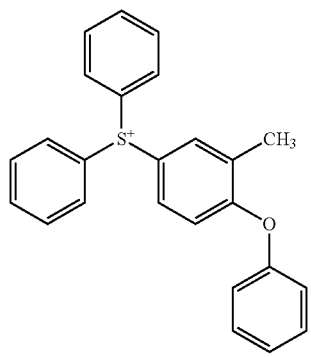
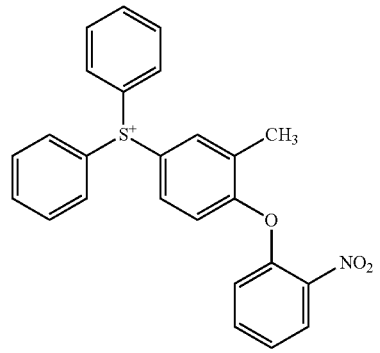
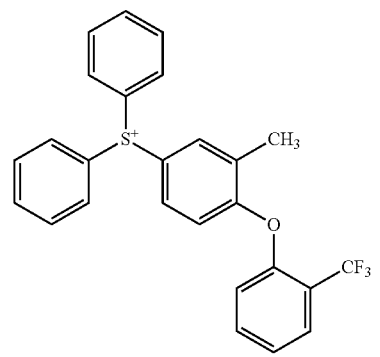

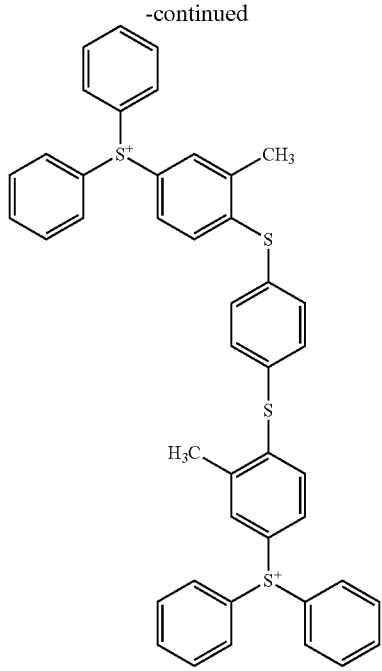

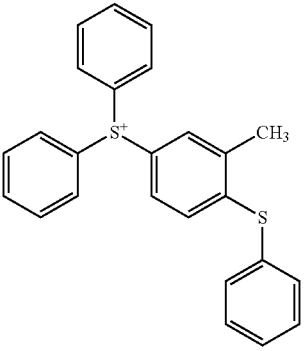

The photocationic polymerization initiator (C1-2) may contain a photocationic polymerization initiator other than the sulfonium salt (Q), together with the sulfonium salt (Q). The content of the sulfonium salt (Q) in the photocationic polymerization initiator (C1-2) is not particularly limited and, typically, the content is preferably 70% by mass or more, more preferably 80% by mass or more, particularly preferably 90% by mass or more, and most preferably 100% by mass.

(Other Cationic Polymerization Initiators)

It is possible to use, as the cationic polymerization initiator other than the sulfonium salt (Q), various cationic polymerization initiators, which have hitherto been used for cation polymerization, without particular limitation. As mentioned above, the other cationic polymerization initiator is preferably an onium salt such as an iodonium salt or a sulfonium salt, and more preferably a sulfonium salt other than the sulfonium salt (Q).

Hereinafter, the sulfonium salt other than the sulfonium salt (Q) is also referred to as "sulfonium salt (Q')". The other sulfonium salt (Q') preferably contains, as the monovalent anion $X^-$, the above-mentioned $R^{x1}{}_cBY_{4-c}{}^-$, just like the sulfonium salt (Q).

The sulfonium salt (Q') having a monovalent anion represented by $R^{x1}{}_cBY_{4-c}{}^-$ includes, for example, a sulfonium salt represented by the following formula (c1'):

[Chem. 42]

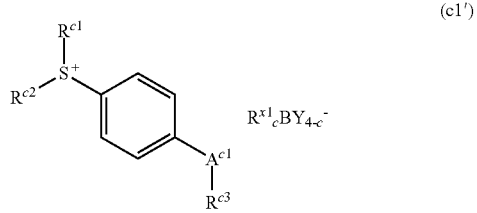

(c1')

wherein, $R^{c1}$, $R^{c2}$, $R^{c3}$, $A^{c1}$, $R^{x1}$, Y, and c are as mentioned above.

Specific examples of the cation moiety of the sulfonium salt (Q') represented by the formula (a1') include the followings.

In the group of preferred cation moiety, the cation moiety represented by the following formula is more preferable.

[Chem. 43]
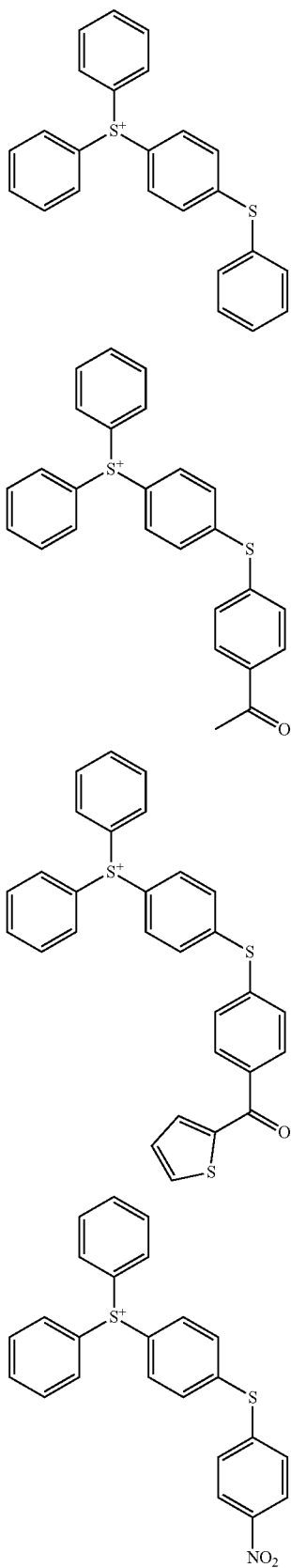
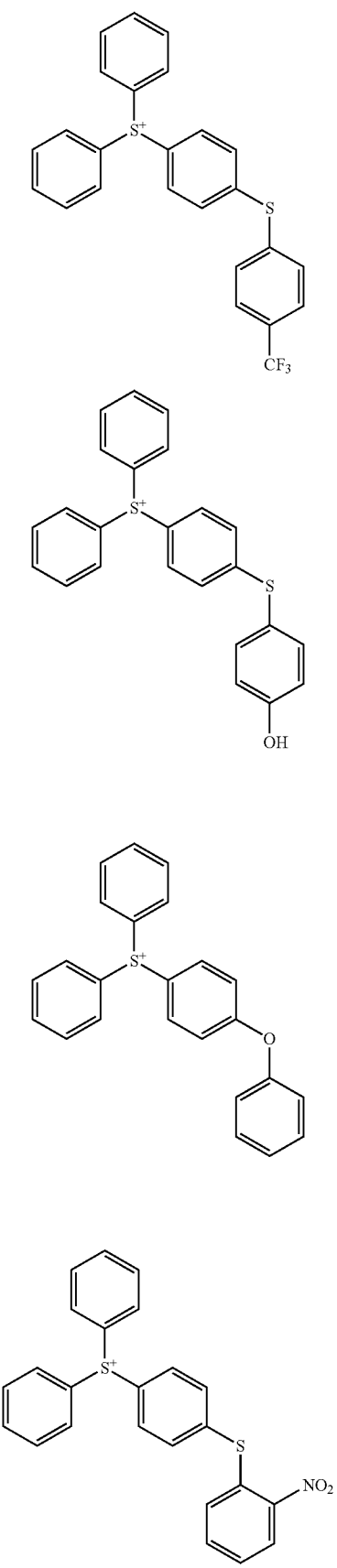

-continued

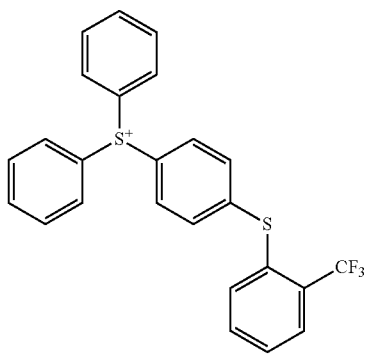

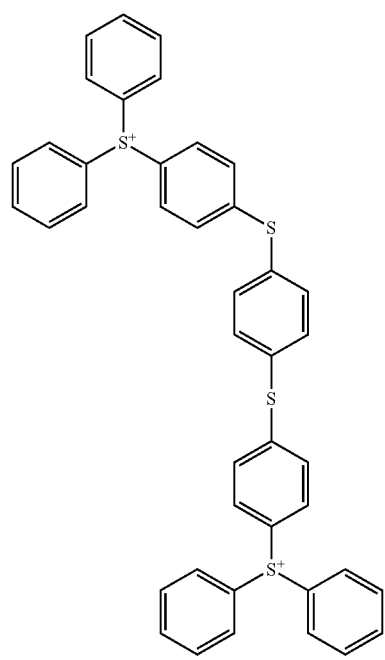

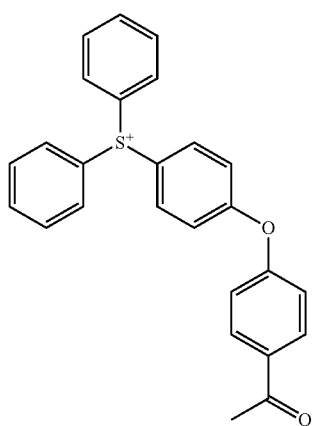

-continued

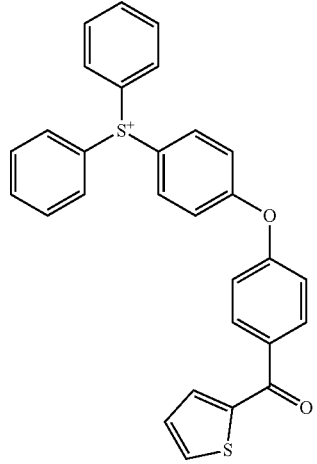 [SMILES: O=C(c1ccc(Oc2ccc([S+](c3ccccc3)c3ccccc3)cc2)cc1)c1cccs1]

Typical examples of the cation moiety of the sulfonium salt (Q') include the followings.

[Chem. 44]

There is no particular limitation on the content of the photocationic polymerization initiator (c1-2) in the curable composition, as long as curing of the curable composition satisfactory proceeds. In view of the fact that it is easy to satisfactorily cure the curable composition, typically, the content is preferably 0.001 part by mass or more and 30 parts by mass or less, more preferably 0.01 part by mass or more and 10 parts by mass or less, and particularly preferably 0.1 part by mass or more and 5 parts by mass or less, based on 100 parts by mass of the curable compound (A).

<(C2) Radical Polymerization Initiator>

There is no particular limitation on the radical polymerization initiator (C2), and it is possible to use conventionally known photopolymerization initiators, which have hitherto been used for polymerization of a radical polymerizable compound including an unsaturated double bond.

Examples of the radical polymerization initiator (C2) include 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 2,2-dimethoxy-1,2-diphenylethan-1-one, bis(4-dimethylaminophenyl)ketone, 2-methyl-1-[4-(methylthio)phenyl]-2-morpholinopropan-1-one, 2-benzyl-2-dimethylamino-1-(4-morpholinophenyl)-butan-1-one, ethanone, 1-[9-ethyl-6-(2-methylbenzoyl)-9H-carbazol-3-yl], 1-(O-acetyl oxime), (9-ethyl-6-nitro-9H-carbazol-3-yl) [4-(2-methoxy-1-methylethoxy)-2-methylphenyl]methanone O-acetyl oxime, 2-(benzoyloxyimino)-1-[4-(phenylthio)phenyl]-1-octanone, 2,4,6- trimethylbenzoyldiphenylphosphine oxide, 4-benzoyl-4'-methyldimethyl sulfide, 4-dimethylaminobenzoic acid, methyl 4-dimethylaminobenzoate, ethyl 4-dimethylaminobenzoate, butyl 4-dimethylaminobenzoate, 4-dimethylamino-2-ethylhexylbenzoic acid, 4-dimethylamino-2-isoamylbenzoic acid, benzyl-µ-methoxyethyl acetal, benzyl dimethyl ketal, 1-phenyl-1,2-propanedione-2-(O-ethoxycarbonyl) oxime, methyl o-benzoylbenzoate, 2,4-diethylthioxanthone, 2-chlorothioxanthone, 2,4-dimethylthioxanthone, 1-chloro-4-propoxythioxanthone, thioxanthene, 2-chlorothioxanthene, 2,4-diethylthioxanthene, 2-methylthioxanthene, 2-isopropylthioxanthene, 2-ethylanthraquinone, octamethylanthraquinone, 1,2-benzanthraquinone, 2,3-diphenylanthraquinone, azobisisobutyronitrile, benzoyl peroxide, cumene hydroperoxide, 2-mercaptobenzimidazole, 2-mercaptobenzoxazole, 2-mercaptobenzothiazole, 2-(o-chlorophenyl)-4,5-di(m-methoxyphenyl)-imidazolyl dimer, benzophenone, 2-chlorobenzophenone, p,p'-bisdimethylaminobenzophenone, 4,4'-bisdiethylaminobenzophenone, 4,4'-dichlorobenzophenone, 3,3-dimethyl-4-methoxybenzophenone, benzyl, benzoin, benzoin methyl ether, benzoin ethyl ether, benzoin isopropyl ether, benzoin-n-butyl ether, benzoin isobutyl ether, benzoin butyl ether, acetophenone, 2,2-diethoxyacetophenone, p-dimethylacetophenone, p-dimethylaminopropiophenone, dichloroacetophenone, trichloroacetophenone, p-tert-butylacetophenone, p-dimethylaminoacetophenone, p-tert-butyltrichloroacetophenone, p-tert-butyldichloroacetophenone, α,α-dichloro-4-phenoxyacetophenone, thioxanthone, 2-methylthioxanthone, 2-isopropylthioxanthone, dibenzosuberone, pentyl-4-dimethylaminobenzoate, 9-phenylacridine, 1,7-bis-(9-acridinyl)heptane, 1,5-bis-(9-acridinyl)pentane, 1,3-bis-(9-acridinyl)propane, p-methoxytriazine, 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl) ethenyl]-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, 2-(4-n-butoxyphenyl)-4,6-bis(trichloromethyl)-s-triazine, 2,4-bis-trichloromethyl-6-(3-bromo-4-methoxy)phenyl-s-triazine, 2,4-bis-trichloromethyl-6-(2-bromo-4-methoxy)phenyl-s-triazine, 2,4-bis-trichloromethyl-6-(3-bromo-4-methoxy)styrylphenyl-s-triazine, 2,4-bis-trichloromethyl-6-(2-bromo-4-methoxy)styrylphenyl-s-triazine, and the like. These radical polymerization initiators (C2) can be used alone or in combination of two or more types thereof.

The content of the radical polymerization initiator (C2) is preferably 0.01 part by mass or more and 50 parts by mass or less, more preferably, 0.1 part by mass or more and 30 parts by mass or less, and particularly preferably 0.3 part by mass or more and 10 parts by mass or less, based on 100 parts by mass of the curable compound (A). When the content of the radical polymerization initiator (C2) is set within the above range, it is easy to satisfactorily cure the curable composition.

The radical polymerization initiator (C2) may be used in combination with a photoinitiation auxiliary. Examples of the photoinitiation auxiliary include thiol compounds such as triethanolamine, methyldiethanolamine, triisopropanolamine, methyl 4-dimethylaminobenzoate, ethyl 4-dimethylaminobenzoate, isoamyl 4-dimethylaminobenzoate, 2-ethylhexyl 4-dimethylaminobenzoate, 2-dimethylaminoethyl benzoate, N,N-dimethylpara-toluidine, 4,4'-bis(dimethylamino)benzophenone, 9,10-dimethoxyanthracene, 2-ethyl-9,10-dimethoxyanthracene, 9,10-diethoxyanthracene, 2-ethyl-9,10-diethoxyanthracene, 2-mercaptobenzothiazole, 2-mercaptobenzoxazole, 2-mercaptobenzimidazole, 2-mercapto-5-methoxybenzothiazole, 3-mercaptopropionic acid, methyl 3-mercaptopropionate, pentaerythritoltetramercaptoacetate, and 3-mercaptpropionate. These photoinitiation auxiliaries can be used alone or in combination of two or more types thereof.

<(D) Curing Accelerator>

A curable composition may contain: (D) a curing accelerator. When the curable composition contains the curing accelerator (D), curability of the curable composition and properties after curing are satisfactory.

Examples of the curing accelerator (D) include a urea compound, a tertiary amine and salts thereof, imidazoles and salts thereof, phosphine-based compounds and derivatives thereof, carboxylic acid metal salts, Lewis acids, Bronsted acids and salts thereof, tetraphenylboronate, and the like.

Preferred specific examples of the curing accelerator (D) include tertiary amines such as 1,8-diazabicyclo(5,4,0)undecene-7, triethylenediamine, benzyldimethylamine, triethanolamine, dimethylaminoethanol, and tris(dimethylaminomethyl)phenol; imidazoles such as 2-methylimidazole, 2-phenylimidazole, 2-phenyl-4-methylimidazole, and 2-heptadecylimidazole; phosphine-based compounds such as tributylphosphine, methyldiphenylphosphine, triphenylphosphine, diphenylphosphine, and phenylphosphine; tetraphenylphosphonium tetraphenylborate, triphenylphosphinetetraphenylborate, 2-ethyl-4-methylimidazoletetraphenylborate, and a tetraphenylboron salt of N-methylmorpholine tetraphenylborate.

Of the above-described curing accelerators (D), phosphine-based compounds and derivatives thereof, and tetraphenylboron salts are preferable. Of the above specific examples, triphenylphosphine and triphenylphosphine triphenylborane are preferable.

There is no particular limitation on the amount of the curing accelerator (D) used as long as the object of the present invention is not impaired. The amount of the curing accelerator (D) used is preferably 0.5 part by mass or more and 8 parts by mass or less, more preferably 1.5 parts by mass or more and 6 parts by mass or less, and particularly preferably 3 parts by mass or more and 4.5 parts by mass or less, based on 1 part by mass of the mass of the curing agent (C).

<(E) Sensitizer>

The curable composition may contain: (E) a sensitizer. When the curable composition contains the photocationic polymerization initiator (C), the curable composition preferably contains the sensitizer (E). It is possible to use, as the sensitizer, known sensitizers, which have hitherto been used in combination with various cationic polymerization initiators, without particular limitation. Specific examples of the sensitizer include anthracene compounds such as anthracene, 9,10-dibutoxyanthracene, 9,10-dimethoxyanthracene, 9,10-diethoxyanthracene, 2-ethyl-9,10-dimethoxyanthracene, and 9,10-dipropoxyanthracene; pyrene; 1,2-benzanthracene; perylene; tetracene; coronene; thioxanthone compounds such as thioxanthone, 2-methylthioxanthone, 2-ethylthioxanthone, 2-chlorothioxanthone, 2-isopropylthioxanthone, and 2,4-diethylthioxanthone; phenothiazine compounds such as phenothiazine, N-methylphenothiazine, N-ethylphenothiazine, and N-phenylphenothiazine; xanthone; naphthalene compounds such as 1-naphthol, 2-naphthol, 1-methoxynaphthalene, 2-methoxynaphthalene, 1,4-dihydroxynaphthalene, and 4-methoxy-1-naphthol; ketones such as dimethoxyacetophenone, diethoxyacetophenone, 2-hydroxy-2-methyl-1-phenylpropan-1-one, 4'-isopropyl-2-hydroxy-2-methylpropiophenone, and 4-benzoyl-4'-methyldiphenyl sulfide; carbazole compounds such as N-phenylcarbazole, N-ethylcarbazole, poly-N-vinylcarbazole, and N-glycidylcarbazole; chrysene compounds such as 1,4-dimethoxychrysene and 1,4-di-α-methylbenzyloxychrysene; and phenanthrene compounds such as 9-hydroxyphenanthrene, 9-methoxyphenanthrene, 9-hydroxy-10-methoxyphenanthrene, and 9-hydroxy-10-ethoxyphenanthrene. These sensitizers may be used in combination of two or more types thereof.

The amount of the sensitizer (E) used is not particularly limited and is preferably 1% by mass or more and 300% by mass or less, and more preferably 5% by mass or more and 200% by mass or less, based on the mass of the photocationic polymerization initiator (C). When using the sensitizer (E) in the amount within the above range, it is easy to obtain the desired sensitization effect.

<Other Components>

The curable composition can optionally contain additives such as surfactants, thermal polymerization inhibitors, defoamers, silane coupling agents, colorants (pigments, dyes), resins (thermoplastic resins, alkali-soluble resins, etc.), inorganic fillers other than the metal oxide (B), and organic fillers. It is possible to use, as any additives, conventionally known ones. Examples of the surfactant include anionic, cationic, and nonionic compounds, examples of the thermal polymerization inhibitor include hydroquinone, hydroquinone monoethyl ether, and the like, and examples of the defoamer include silicone-based compounds, fluorine-based compounds, and the like.

<(S) Solvent>

The curable composition preferably contains: (S) a solvent for the purpose of adjusting the coatability and viscosity. As the solvent (S), an organic solvent is typically used. There is no particular limitation on types of the organic solvent as long as it can uniformly dissolve or disperse components contained in the curable composition.

Suitable examples of the organic solvent usable as the solvent (S) include (poly)alkylene glycol monoalkyl ethers such as ethylene glycol monomethyl ether, ethylene glycol monoethyl ether, ethylene glycol n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether; (poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate; other ethers such as diethylene glycol dimethyl ether, diethylene glycol methyl ethyl ether, diethylene glycol diethyl ether, and tetrahydrofuran; ketones such as methyl ethyl ketone, cyclohexanone, 2-heptanone, and 3-heptanone; lactic acid alkyl esters such as methyl 2-hydroxypropionate and ethyl 2-hydroxypropionate; other esters such as ethyl 2-hydroxy-2-methylpropionate, methyl 3-methoxypropionate, ethyl 3-methoxypropionate, methyl 3-ethoxypropionate, ethyl 3-ethoxypropionate, ethyl ethoxyacetate, ethyl hydroxyacetate, methyl 2-hydroxy-3-methylbutanoate, 3-methyl-3-methoxybutyl acetate, 3-methyl-3-methoxybutyl propionate, ethyl acetate, n-propyl acetate, isopropyl acetate, n-butyl acetate, isobutyl acetate, n-pentyl formate, isopentyl acetate, n-butyl propionate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, and ethyl 2-oxobutanoate; aromatic hydrocarbons such as toluene and xylene; and amides such as N-methylpyrrolidone, N,N-dimethylformamide, and N,N-dimethylacetamide. These organic solvents can be used alone or in combination of two or more types thereof.

There is no particular limitation on the amount of the solvent (S) in the curable composition. In view of the coatability of the curable composition, the amount of the solvent (S) used is, for example, 30 to 99.9% by mass, and preferably 50 to 98% by mass, based on the entire curable composition. The viscosity of the curable composition is preferably adjusted within a range of 300 mPa·s or less. The viscosity of the curable composition is more preferably 60 mPa·s or less, and particularly preferably 30 mPa·s or less. There is particularly no lower limit and, for example, the viscosity is 0.1 mPa·s or more. The viscosity is a viscosity measured at 25° C. using an E-type viscometer.

When using the curable composition containing essential or optional components described above, it is possible to form a cured product having high refractive index. Therefore, the curable composition can be used for formation of a high refractive index material and a high refractive index film, which have hitherto been used in various applications. For example, when using the curable composition, it is possible to form a cured product having a refractive index of 1.70 or more, preferably 1.72 or more, more preferably 1.75 or more, still more preferably 1.80 or more, and most preferably 1.80 or more. Use of the curable composition enables formation of a cured film having low permittivity and high insulating properties. Specifically, use of the curable composition enables formation of a cured product having a relative permittivity, which is measured by a mercury-probe type CV measuring device (SSM495, manufactured by SSM Japan Co.) using a 500 nm-thick film made of a cured product as a sample, of 4.5 or less, and preferably 4.0 or less. Therefore, the curable composition is used, particularly preferably, for formation of a transparent coating film which covers metal wiring in a display element such as a touch panel. When the curable composition is used to form such transparent coating film, high refractive index of the transparent coating film renders metal wiring hardly visible.

The cured film formed using the curable composition is suitably used in a flexible display panel since cracking hardly occurs even when bent because of excellent bending resistance. For example, when a 50 nm-thick film made of the cured product of the curable composition is wound around a cylindrical stainless bar having a radius of 6 mm, and preferably 2 mm, no cracking occurs.

«Method for Producing Curable Composition»

A curable composition can be produced by uniformly mixing each component described above in a predetermined ratio. Examples of the mixer usable in the production of the curable composition include a two-roll mill, a three-roll mill, and the like. When the curable composition has sufficiently low viscosity, if necessary, the curable composition may be filtered using a filter having a desired hole size so as to remove insoluble foreign substances.

<<Method for Producing Cured Product>>

There is no particular limitation on a method for producing a cured product as long as it is a method capable of curing a curable composition formed into a desired shape. Specific examples of the method for producing a cured product include the steps of:

forming the curable composition into a predetermined shape, and subjecting the thus formed curable composition to at least one of light exposure and heating.

The method of curing a molded body is appropriately selected by types of a curable compound (A) and types of a curing agent (C). When the curable composition contains a cationic polymerizable compound as the curable compound (A) and a thermal cationic polymerization initiator (C1-1) as the curing agent (C), the molded body of the curable composition is cured by heating, or light exposure and heating. When the curable composition contains a cationic polymerizable compound as the curable compound (A) and a photocationic polymerization initiator (C1-2) as the curing agent (C), the molded body of the curable composition is cured by light exposure, or light exposure and heating. When the curable composition contains a radical polymerizable compound as the curable compound (A) and a radical polymerization initiator (C1-2) as the curing agent (C), the molded body of the curable composition is cured by light exposure, or light exposure and heating.

The shape of the molded body is not particularly limited and is preferably film since it is easy to uniformly apply heat to the molded body, and to uniformly irradiate the molded body with exposure light.

Typical examples of the method for producing a cured product as a cured film will be described below. First, a curable composition is applied onto a substrate such as a glass substrate to form a coating film. Examples of the coating method include methods using a contact transfer-type coating apparatus such as a roll coater, a reverse coater, or a bar coater, or a non-contacting-type coater such as a spinner (rotary coating apparatus), a slit coater or a curtain flow coater. After adjusting the viscosity of the curable composition in an appropriate range, the curable composition may be applied by an inkjet method, or a printing method such as a screen printing method to form a coating film with a desired pattern shape.

Then, if necessary, a volatile component such as a solvent (S) is removed to dry the coating film. Examples of the drying method include, but are not particularly limited to, a method of drying under reduced pressure at room temperature using a vacuum drying device (VCD), followed by drying with a hot plate at a temperature in a range of 80° C. or higher and 120° C. or lower, and preferably 90° C. or higher and 100° C. or lower, for 60 seconds or more and 120 seconds or less. After forming the coating film in such a manner, the coating film is subjected to at least one of light exposure and heating. Light exposure is performed by irradiating with active energy ray such as excimer laser light. The energy line dose varies depending on the composition of the curable composition and is preferably, for example, 30 mJ/cm$^2$ or more and 2,000 mJ/cm$^2$ or less, and more preferably 50 mJ/cm$^2$ or more and 500 mJ/cm$^2$ or less. The temperature during heating is not particularly limited and is preferably 180° C. or higher and 280° C. or lower, more preferably 200° C. or higher and 260° C. or lower, and particularly preferably 220° C. or higher and 250° C. or lower. Typically, the heating time is preferably 1 minute or more and 60 minutes or less, more preferably 10 minutes or more and 50 minutes or less, and particularly preferably 20 minutes or more and 40 minutes or less.

The thus formed cured product, particularly cured film, is suitably used in a display panel for an image display device. The cured film is suitably used in a flexible display panel since cracking hardly occurs because of excellent flexibility. The cured film is also used, particularly preferably, as a transparent coating film which covers metal wiring in a display element such as a touch panel.

EXAMPLES

The present invention will be more specifically described below by way of Examples, but the scope of the present invention is not limited to these Examples.

Examples 1 to 3, and Comparative Examples 1 to 3

In Examples and Comparative Examples, a compound represented by the following formula was used as a curable compound (A) (component (A)).

[Chem. 45]

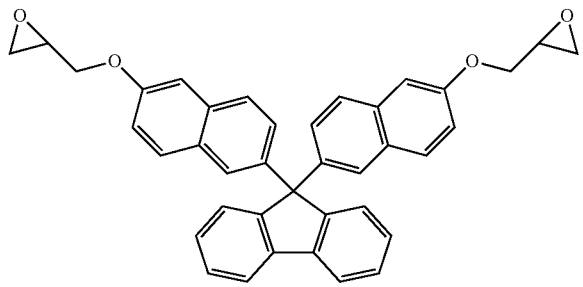

In Examples, when mixing a metal oxide in which a capping agent is covalently bonded to a surface of a metal oxide (B), a dispersion of $ZrO_2$ fine particles B1 in which a capping agent is covalently bonded to a surface thereof (an average particle diameter of B1: 8 nm, a particle diameter at the cumulative value of 99.99% in cumulative particle size volume distribution: 18 nm, a concentration: 50% by mass, a dispersion medium: propylene glycol monomethyl ether acetate (PGMEA)) was used. When a curable composition of Comparative Example is prepared, a dispersion of commercially available $ZrO_2$ fine particles B2 in which a capping agent is not covalently bonded to a surface thereof (an average particle diameter of $ZrO_2$ fine particles: 37 nm, a concentration of $ZrO_2$ fine particles: 25% by mass, a dispersion medium: PGMEA) was used. The amount (parts by mass) in Table 1 shows the amount of only respective fine particles of the component (B) (the amount (parts by mass) of the component (B) in Table 1 is not the amount in terms of a dispersion, or the total amount of a dispersing agent and fine particles). Details of the dispersion according to B1 are as follows. In a vial, 30 mL of benzyl alcohol and 0.08 mL of water (4.44 mmol) were stirred for 1 hour and, after transferring into a glove box, 4.49 mmol of zirconium(IV) isopropoxide isopropanol ($Zr(OCH(CH_3)_2)_4(HOCH(CH_3)_2)$) was stirred in the benzyl alcohol solution in the glove box for 4 hours. The reaction mixture was transferred to an autoclave and the reaction mixture was heated to 325° C. over 1 hour while stirring (heating to 250° C. over 15 minutes, heating to 265° C. over 3 minutes, heating to 280° C. over 3 minutes, heating to 295° C. over 3 minutes, heating to 310° C. over 3 minutes, and heating to 325° C. over 3 minutes), followed by cooling to room temperature to obtain a slurry of $ZrO_2$. To the thus obtained $ZrO_2$ slurry, water was added and hydrochloric acid was added while stirring, followed by stirring overnight at room temperature. An operation of adding the solution obtained by stirring to tetrahydrofuran and recovering the precipitate by centrifugal separation was repeated until reaching the pH within a range of 5 to 7. The thus recovered $ZrO_2$ was dispersed in PGMEA and 3-{2-methoxy[tri(ethyleneoxy)]}propyltrimethoxysilane as a capping agent was added at a mass ratio of the capping agent and $ZrO_2$ within a range of 1:5 to 3:2, followed by heating at 80° C. for 1 hour and further cooling to room temperature. The mixture thus formed was washed with heptane and then the precipitate was recovered. The precipitate thus recovered was dispersed in hexane and, after precipitation with ethanol, the obtained mixture was subjected to centrifugal separation, thereby recovering a nanocrystal. This purification process was repeated three times, followed by redispersion in PGMEA to obtain a $ZrO_2$ fine particle dispersion containing B1 as the metal oxide (B).

In Examples and Comparative Examples, a compound represented by the following formula as a photocationic polymerization initiator (C1-2) was used as a curing agent (C) (component (C)).

[Chem. 46]

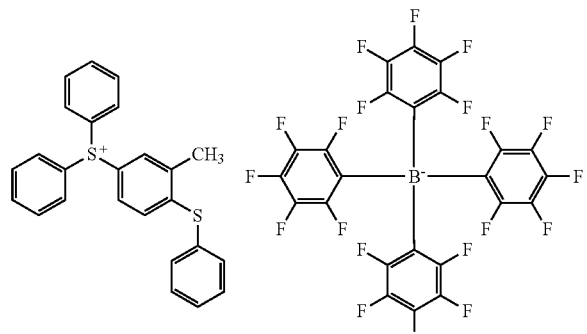

Components (A) and (C) in the amount shown in Table 1, and a component (B) of types shown in Table 1 in the amount shown in Table 1 were dissolved in propylene glycol monomethyl ether acetate such that the solid component concentration would be 20% by mass (provided that, the solid component concentration is 2.6% by mass in the composition for evaluation of flexibility) to obtain curable compositions of the respective Examples and Comparative Examples. In Comparative Example 1, the component (B) was not used.

A viscosity of a curable composition having the solid component concentration of 20% by mass using no component (B) of Comparative Example 1, measured at 25° C. using an E-type viscometer, was 4 mPa·s. Using the thus obtained curable composition, a cured film was formed, and then, in accordance with the following method, the measurement of a refractive index of the cured film, the evaluation of the flexibility of the cured film, and the measurement of the relative permittivity of the cured film were performed. These measurement results or evaluation results are shown in Table 1.

<Measurement of Refractive Index>

A curable composition was applied on a glass substrate using a spin coater and prebaked at 100° C. for 120 seconds, followed by light exposure (broadband) at an exposure dose of 100 mJ/cm² using an ultraviolet curing device. Thereafter, a postbaking treatment was performed at 230° C. for 20 minutes to obtain a cured film having a film thickness of about 1 μm. With respect to each cured film, a refractive index at a wavelength of 550 nm was measured. The results could reveal that the thickness of the coating film of Examples 1 to 3 exhibits smaller amount of change in thickness of the coating film from that in Comparative Example 1 as compared with Comparative Examples 2 to 3, and thus slight influence is exerted on the viscosity due to the addition of the component (B).

<Evaluation of Flexibility>

In the same manner as in the measurement of a refractive index, a cured film having a film thickness of 50 nm was formed on a glass substrate. After winding the thus obtained cured film around a cylindrical stainless bar whose bottom surface has a radius of 2 mm, the cured film was observed by a microscope to determine whether cracking occurs. The case where no cracking occurred after winding was rated "A", the case where cracking slightly occurred was rated "B", and the case where numerous cracking occurred was rated "C".

<Measurement of Relative Permittivity>

In the same manner as in the measurement of a refractive index, a cured film having a film thickness of 500 nm was formed on a glass substrate. Using the thus formed cured film as a sample, a relative permittivity was measured by a mercury-probe type CV measuring device (SSM495, manufactured by SSM Japan Co.).

TABLE 1

| | (A) Component (Parts by mass) | (B) Component (Parts by mass/ Type) | (C) Component (Parts by mass) | Refractive index | Flexibility | Relative permittivity |
|---|---|---|---|---|---|---|
| Example 1 | 69.65 | 30/B1 | 0.35 | 1.73 | A | 3.45 |
| Example 2 | 49.75 | 50/B1 | 0.25 | 1.76 | A | 3.80 |
| Example 3 | 19.9 | 80/B1 | 0.1 | 1.87 | A | 4.30 |
| Comparative Example 1 | 99.5 | — | 0.5 | 1.69 | A | 3.00 |
| Comparative Example 2 | 69.65 | 30/B2 | 0.35 | 1.70 | B | 3.36 |
| Comparative Example 3 | 49.75 | 50/B2 | 0.25 | 1.72 | C | 3.63 |

As is apparent from Examples 1 to 3, use of a curable composition including a curable compound (A) containing a compound having a predetermined structure and a metal oxide (B) in which a capping agent is covalently bonded to a surface thereof enables formation of a cured film which has high refractive index, satisfactory flexibility, and low relative permittivity.

As is apparent from Comparative Example 1, use of a curable composition including a curable compound (A) containing a compound having a predetermined structure, but including no metal oxide (B) enables formation of a cured film which has satisfactory flexibility and low relative permittivity, but has low refractive index.

As is apparent from Comparative Examples 2 and 3, when a curable composition includes a curable compound (A) containing a compound having a predetermined structure, while a capping agent is not covalently bonded to a surface of a metal oxide (B), it is difficult to form a cured film having satisfactory flexibility.

What is claimed is:

1. A curable composition comprising: (A) a curable compound, (B) a metal oxide, and (C) a curing agent, wherein the curable compound (A) comprises a compound represented by the following formula (a1), with the proviso that the compound represented by the formula (a1) is not a compound in which one $R^3$ represents a thiiran-2-ylmethyl group and the other $R^3$ represents a hydrogen atom or in which each $R^3$ represents a thiiran-2-ylmethyl group, and a capping agent is covalently bonded to a surface of the metal oxide (B):

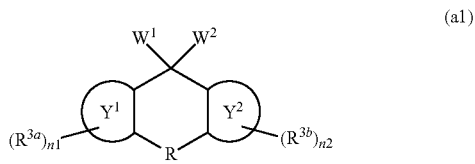

(a1)

wherein, in the formula (a1), $W^1$ and $W^2$ each independently represents a group represented by the following formula (a2):

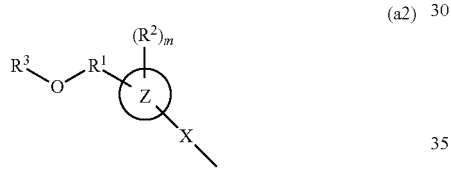

(a2)

wherein, in the formula (a2), a ring Z represents a fused polycyclic aromatic hydrocarbon ring, X represents a single bond or a group represented by —S—, $R^1$ represents a single bond, an alkylene group having 1 or more and 4 or less carbon atoms, or an alkyleneoxy group having 1 or more and 4 or less carbon atoms, and when $R^1$ is an alkyleneoxy group, the oxygen atom in the alkyleneoxy group is bonded with a ring Z, $R^2$ represents a monovalent hydrocarbon group, a hydroxyl group, a group represented by —$OR^{4a}$, a group represented by —$SR^{4b}$, an acyl group, an alkoxycarbonyl group, a halogen atom, a nitro group, a cyano group, a mercapto group, a carboxy group, an amino group, a carbamoyl group, a group represented by —$NHR^{4c}$, a group represented by —$N(R^{4d})_2$, a sulfo group, or a group in which at least a part of hydrogen atoms bonded to the carbon atom included in a monovalent hydrocarbon group, a group represented by —$OR^{4a}$, a group represented by —$SR^{4b}$, an acyl group, an alkoxycarbonyl group, a group represented by —$NHR^{4c}$, or a group represented by —$N(R^{4d})_2$ is/are substituted with a monovalent hydrocarbon group, a hydroxyl group, a group represented by —$OR^{4a}$, a group represented by —$SR^{4b}$, an acyl group, an alkoxycarbonyl group, a halogen atom, a nitro group, a cyano group, a mercapto group, a carboxyl group, an amino group, a carbamoyl group, a group represented by —$NHR^{4c}$, a group represented by —$N(R^{4d})_2$, a mesyloxy group, or a sulfo group, $R^{4a}$ to $R^{4d}$ independently represent a monovalent hydrocarbon group, m represents an integer of 0 or more, $R^3$ represents a hydrogen atom, a vinyl group, a thiiran-2-ylmethyl group, a glycidyl group, or a (meth)acryloyl group, both $W^1$ and $W^2$ do not have a hydrogen atom as $R^3$, a ring $Y^1$ and a ring $Y^2$ represent the same or different aromatic hydrocarbon ring, R represents a single bond, an optionally substituted methylene group, an ethylene group which is optionally substituent and contain a heteroatom between two carbon atoms, a group represented by —O—, a group represented by —NH—, or a group represented by —S—, $R^{3a}$ and $R^{3b}$ independently represent a cyano group, a halogen atom, or a monovalent hydrocarbon group, and n1 and n2 independently represent an integer of 0 or more and 4 or less.

2. The curable composition according to claim 1, wherein R is a single bond, and the rings $Y^1$ and $Y^2$ are benzene rings.

3. The curable composition according to claim 1, wherein $W^1$ and $W^2$ each has, as $R^3$, a vinyl group, a thiiran-2-ylmethyl group, or a glycidyl group.

4. The curable composition according to claim 3, wherein the curing agent (C) comprises a sulfonium salt represented by the following formula (c1):

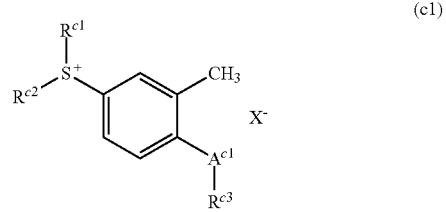

(c1)

wherein, in the formula (c1), $R^{c1}$ and $R^{c2}$ independently represent an alkyl group optionally substituted with a halogen atom, or a group represented by the following formula (c2), $R^{c1}$ and $R^{c2}$ may be combined with each other to form a ring together with a sulfur atom in the formula, $R^{c3}$ represents a group represented by the following formula (c3), or a group represented by the following formula (c4), $A^{c1}$ represents S, O, or Se, and X— represents a monovalent anion, provided that $R^{c1}$ and $R^{c2}$ are not simultaneously alkyl groups optionally substituted with a halogen atom:

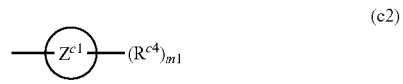

(c2)

wherein, in the formula (c2), a ring $Z^{c1}$ represents an aromatic hydrocarbon ring, $R^{c4}$ represents an alkyl group optionally substituted with a halogen atom, a hydroxy group, an alkoxy group, an alkylcarbonyl group, an alkoxycarbonyl group, an acyloxy group, an alkylthio group, a thienyl group, a thienylcarbonyl group, a furanyl group, a furanylcarbonyl group, a selenophenyl group, a selenophenylcarbonyl group, a heterocyclic aliphatic hydrocarbon group, an alkylsulfinyl group, an alkylsulfonyl group, a hydroxy(poly)alkyleneoxy group, an optionally substituted amino group, a cyano group, a nitro group, or a halogen atom, and m1 represents an integer of 0 or more:

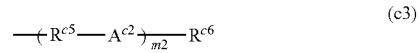

(c3)

wherein, in the formula (c3), $R^{c5}$ represents an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, or a group represented by the following formula (c5), $R^{c6}$ represents an alkyl group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, or a group represented by the following formula (b6), $A^{c2}$ represents a single bond, S, O, a sulfinyl group, or a carbonyl group, and m2 represents 0 or 1:

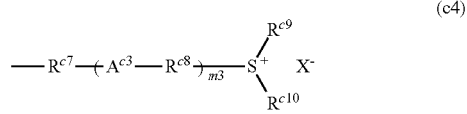

(c4)

wherein, in the formula (c4), $R^{c7}$ and $R^{c8}$ independently represent an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, or a group represented by the following formula (c5), $R^{c9}$ and $R^{c10}$ independently represent an alkyl group optionally substituted with a halogen atom or a group represented by the formula (c2), $R^{c9}$ and $R^{c10}$ may be combined with each other to form a ring together with a sulfur atom in the formula, $A^{c3}$ represents a single bond, S, O, a sulfinyl group, or a carbonyl group, X— is as mentioned above, and m3 represents 0 or 1, provided that $R^{c9}$ and $R^{c10}$ are not simultaneously alkyl groups optionally substituted with a halogen atom:

(c5)

wherein, in the formula (c5), a ring $Z^{c2}$ represents an aromatic hydrocarbon ring, $R^{c11}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, and m4 represents an integer of 0 or more:

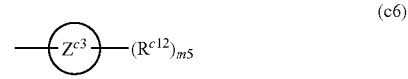

(c6)

wherein, in the (c6), a ring $Z^{c3}$ represents an aromatic hydrocarbon ring, $R^{c12}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, a thienylcarbonyl group, a furanylcarbonyl group, a selenophenylcarbonyl group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, and m5 represents an integer of 0 or more.

5. The curable composition according to claim 4, wherein both $R^{c1}$ and $R^{c2}$ in the formula (c1) are phenyl groups.

6. A cured product obtained by curing the curable composition according to claim 1.

7. A cured film comprising the cured product according to claim 6.

8. A display panel for an image display device, provided with the cured film according to claim 7.

9. The display panel according to claim 8, which is a flexible display panel.

10. A method for producing a cured product, comprising:
forming the curable composition according to claim 1 into a predetermined shape; and subjecting the resulting curable composition to at least one of light exposure and heating.

11. The method for producing a cured product according to claim 10, wherein forming the curable composition is formation of a coating film, and the coating film is subjected to at least one of light exposure and heating.

12. An image display device, provided with the display panel according to claim 8.

13. A method for producing a cured product, comprising:
forming the curable composition according to claim 2 into a predetermined shape; and
subjecting the resulting curable composition to at least one of light exposure and heating.

14. A method for producing a cured product, comprising:
forming the curable composition according to claim 3 into a predetermined shape; and
subjecting the resulting curable composition to at least one of light exposure and heating.

15. A method for producing a cured product, comprising:
forming the curable composition according to claim 4 into a predetermined shape; and
subjecting the resulting curable composition to at least one of light exposure and heating.

* * * * *